US012591135B2

(12) United States Patent
Rivera Cintron et al.

(10) Patent No.: US 12,591,135 B2
(45) Date of Patent: Mar. 31, 2026

(54) HEAD-MOUNTED DISPLAY SYSTEMS WITH POWER SAVING FUNCTIONALITY

(71) Applicant: Magic Leap, Inc., Plantation, FL (US)

(72) Inventors: Carlos A Rivera Cintron, Lake Worth, FL (US); Gregory Link, Charlotte, NC (US); Jeffrey Scott Sommers, Mountain View, CA (US); Matthew Thomas Hull, Parkland, FL (US); Jose Felix Rodriguez, Hialeah, FL (US); Ricardo Martinez Perez, Plantation, FL (US)

(73) Assignee: MAGIC LEAP, INC., Plantation, FL (US)

( * ) Notice: Subject to any disclaimer, the term of this patent is extended or adjusted under 35 U.S.C. 154(b) by 0 days.

(21) Appl. No.: 18/952,446

(22) Filed: Nov. 19, 2024

(65) Prior Publication Data

US 2025/0076643 A1 Mar. 6, 2025

Related U.S. Application Data

(63) Continuation of application No. 18/413,714, filed on Jan. 16, 2024, now Pat. No. 12,189,122, which is a
(Continued)

(51) Int. Cl.
*G02B 27/00* (2006.01)
*G02B 27/01* (2006.01)
(Continued)

(52) U.S. Cl.
CPC ....... *G02B 27/0093* (2013.01); *G02B 27/017* (2013.01); *G06F 1/3218* (2013.01); *G06F 1/3231* (2013.01); *G06F 1/3265* (2013.01)

(58) Field of Classification Search
CPC ............ G02B 27/017; G02B 2027/014; G02B 2027/0174; G02B 2027/0187;
(Continued)

(56) References Cited

U.S. PATENT DOCUMENTS 6,850,221 B1 2/2005 Tickle
D514,570 S 2/2006 Ohta
(Continued)

FOREIGN PATENT DOCUMENTS

JP 2017102946 A 6/2017
WO WO 2016073734 A1 5/2016
(Continued)

OTHER PUBLICATIONS

ARToolKit: htpps://web.archive.org/web/20051013062315/http://www.hitl.washington.edu:80/artoolkit/documentation/hardware.htm, archived Oct. 13, 2005.
(Continued)

*Primary Examiner* — Nelson M Rosario
(74) *Attorney, Agent, or Firm* — Seed Intellectual Property Law Group LLP

(57) ABSTRACT

Head-mounted display systems with power saving functionality are disclosed. The systems can include a frame configured to be supported on the head of the user. The systems can also include a head-mounted display disposed on the frame, one or more sensors, and processing electronics in communication with the display and the one or more sensors. In some implementations, the processing electronics can be configured to cause the system to reduce power of one or more components in response to at least in part on a determination that the frame is in a certain position (e.g., upside-down or on top of the head of the user). In some implementations, the processing electronics can be configured to cause the system to reduce power of one or more
(Continued)

components in response to at least in part on a determination that the frame has been stationary for at least a threshold period of time.

16 Claims, 25 Drawing Sheets

Related U.S. Application Data continuation of application No. 18/176,333, filed on Feb. 28, 2023, now Pat. No. 11,906,732, which is a continuation of application No. 17/252,099, filed as application No. PCT/US2019/037661 on Jun. 18, 2019, now Pat. No. 11,624,909.

(60) Provisional application No. 62/686,586, filed on Jun. 18, 2018.

(51) Int. Cl.
  *G06F 1/3218* (2019.01)
  *G06F 1/3231* (2019.01)
  *G06F 1/3234* (2019.01)

(58) Field of Classification Search
  CPC ... G02B 27/0093; G06F 1/3215; G06F 1/325;
    G06F 1/3265; G06F 3/013; G06F 1/3287;
    Y02D 10/00; G01V 8/10; G09F 9/30;
    G09F 9/33; G09G 3/3233; G09G
    2300/0426; G09G 2310/0202; G09G
    2310/0254; G09G 2310/08; G09G
    2320/02; G09G 2360/14; H04M 1/0266;
    H04M 2250/12
  See application file for complete search history.

(56) References Cited

U.S. PATENT DOCUMENTS

| | | | |
|---|---|---|---|
| 9,081,177 B2 | 7/2015 | Wong et al. |
| 9,081,426 B2 | 7/2015 | Armstrong |
| 9,185,062 B1 | 11/2015 | Yang et al. |
| 9,215,293 B2 | 12/2015 | Miller |
| D752,529 S | 3/2016 | Loretan et al. |
| 9,310,559 B2 | 4/2016 | Macnamara |
| 9,348,143 B2 | 5/2016 | Gao et al. |
| 9,355,315 B2 | 5/2016 | Vugdelija et al. |
| D759,657 S | 6/2016 | Kujawski et al. |
| 9,417,452 B2 | 8/2016 | Schowengerdt et al. |
| 9,470,906 B2 | 10/2016 | Kaji et al. |
| 9,547,174 B2 | 1/2017 | Gao et al. |
| 9,671,566 B2 | 6/2017 | Abovitz et al. |
| D794,288 S | 8/2017 | Beers et al. |
| 9,740,006 B2 | 8/2017 | Gao |
| 9,791,700 B2 | 10/2017 | Schowengerdt |
| D805,734 S | 12/2017 | Fisher et al. |
| 9,851,563 B2 | 12/2017 | Gao et al. |
| 9,857,591 B2 | 1/2018 | Welch et al. |
| 9,874,749 B2 | 1/2018 | Bradski et al. |
| 10,163,011 B2 | 12/2018 | Kaehler et al. |
| 10,187,607 B1 | 1/2019 | Delachanal |
| 10,262,462 B2 | 4/2019 | Miller et al. |
| 10,986,270 B2 | 4/2021 | Smith et al. |
| 11,237,409 B2 | 2/2022 | Lore et al. |
| 11,694,435 B2 | 7/2023 | Pedroza et al. |
| 12,189,122 B2 | 1/2025 | Rivera Cintron et al. |
| 2004/0104864 A1 | 6/2004 | Nakada |
| 2005/0237230 A1 | 10/2005 | Bejean |
| 2006/0028436 A1 | 2/2006 | Armstrong |
| 2007/0081123 A1 | 4/2007 | Lewis |
| 2008/0125288 A1 | 5/2008 | Case |
| 2011/0221913 A1 | 9/2011 | Nagai et al. |
| 2012/0062445 A1 | 3/2012 | Haddick et al. |
| 2012/0127062 A1 | 5/2012 | Bar-Zeev et al. |

| | | | |
|---|---|---|---|
| 2012/0162549 A1 | 6/2012 | Gao et al. |
| 2012/0206443 A1 | 8/2012 | Kimura |
| 2013/0082922 A1 | 4/2013 | Miller |
| 2013/0100601 A1 | 4/2013 | Griffin et al. |
| 2013/0117377 A1 | 5/2013 | Miller |
| 2013/0119255 A1 | 5/2013 | Dickinson et al. |
| 2013/0125027 A1 | 5/2013 | Abovitz |
| 2013/0208234 A1 | 8/2013 | Lewis |
| 2013/0242262 A1 | 9/2013 | Lewis |
| 2013/0293447 A1 | 11/2013 | Bickerstaff et al. |
| 2013/0335301 A1 | 12/2013 | Wong et al. |
| 2014/0003762 A1 | 1/2014 | Macnamara |
| 2014/0071539 A1 | 3/2014 | Gao |
| 2014/0104143 A1* | 4/2014 | Benson ................ G02B 27/017 345/8 |
| 2014/0145914 A1 | 5/2014 | Latta et al. |
| 2014/0177023 A1 | 6/2014 | Gao et al. |
| 2014/0218468 A1 | 8/2014 | Gao et al. |
| 2014/0256303 A1 | 9/2014 | Jones |
| 2014/0267420 A1 | 9/2014 | Schowengerdt et al. |
| 2014/0306866 A1 | 10/2014 | Miller et al. |
| 2015/0016777 A1 | 1/2015 | Abovitz et al. |
| 2015/0084857 A1 | 3/2015 | Kimura |
| 2015/0103306 A1 | 4/2015 | Kaji |
| 2015/0116453 A1 | 4/2015 | Hirata et al. |
| 2015/0178939 A1 | 6/2015 | Bradski et al. |
| 2015/0190052 A1 | 7/2015 | Vaitaitis |
| 2015/0205126 A1 | 7/2015 | Schowengerdt |
| 2015/0222883 A1 | 8/2015 | Welch |
| 2015/0222884 A1 | 8/2015 | Cheng |
| 2015/0268415 A1 | 9/2015 | Schowengerdt et al. |
| 2015/0277121 A1 | 10/2015 | Fridental |
| 2015/0302652 A1 | 10/2015 | Miller et al. |
| 2015/0309263 A2 | 10/2015 | Abovitz et al. |
| 2015/0326570 A1 | 11/2015 | Publicover et al. |
| 2015/0346490 A1 | 12/2015 | Tekolste et al. |
| 2015/0346495 A1 | 12/2015 | Welch et al. |
| 2016/0011419 A1 | 1/2016 | Gao |
| 2016/0025971 A1 | 1/2016 | Crow et al. |
| 2016/0026253 A1 | 1/2016 | Bradski et al. |
| 2016/0072540 A1 | 3/2016 | Davis et al. |
| 2016/0249864 A1 | 9/2016 | Kang et al. |
| 2016/0270656 A1 | 9/2016 | Samec et al. |
| 2017/0109984 A1 | 4/2017 | Child et al. |
| 2017/0255259 A1 | 9/2017 | Mor |
| 2018/0005034 A1 | 1/2018 | Kaehler et al. |
| 2018/0053284 A1 | 2/2018 | Rodriguez et al. |
| 2018/0088340 A1 | 3/2018 | Amayeh et al. |
| 2018/0096503 A1 | 4/2018 | Kaehler et al. |
| 2018/0196934 A1 | 7/2018 | Löthgren et al. |
| 2018/0199039 A1 | 7/2018 | Trepte |
| 2018/0205773 A1 | 7/2018 | Miller |
| 2018/0206062 A1 | 7/2018 | Jain et al. |
| 2018/0239413 A1 | 8/2018 | Ishikawa |
| 2018/0341811 A1 | 11/2018 | Bendale et al. |
| 2018/0376045 A1 | 12/2018 | Weckel et al. |
| 2019/0004325 A1 | 1/2019 | Connor |
| 2019/0121522 A1 | 4/2019 | Davis et al. |
| 2019/0243472 A1 | 8/2019 | Stafford et al. |
| 2019/0365285 A1 | 12/2019 | Kashimoto et al. |
| 2019/0387168 A1 | 12/2019 | Smith et al. |
| 2021/0263309 A1 | 8/2021 | Rivera Cintron et al. |
| 2022/0254117 A1 | 8/2022 | Liu |

FOREIGN PATENT DOCUMENTS

| | | |
|---|---|---|
| WO | WO 2016107963 A1 | 7/2016 |
| WO | WO 2017031246 A1 | 2/2017 |
| WO | WO 2017153772 A1 | 9/2017 |
| WO | WO 2017153778 A1 | 9/2017 |
| WO | WO 2018104732 A1 | 6/2018 |
| WO | WO 2018217008 A1 | 11/2018 |
| WO | WO 2019246044 A1 | 12/2019 |

(56) References Cited

FOREIGN PATENT DOCUMENTS

WO      WO 2019246058 A1    12/2019
WO      WO 2019246129 A2    12/2019

OTHER PUBLICATIONS

Azuma, "A Survey of Augmented Reality," *Presence: Teleoperators and Virtual Environments* 6(4): 355-385, Aug. 1997.

Azuma, "Predictive Tracking for Augmented Reality," TR95-007, Dissertation, Doctor of Philosophy, UNC-Chapel Hill, North Carolina, Department of Computer Science, Feb. 1995. (262 pages).

Bimber et al., "Spatial Augmented Reality—Merging Real and Virtual Worlds," 2005. (393 pages).

International Preliminary Report on Patentability, dated Dec. 22, 2020 for International Application No. PCT/US2019/037773. (7 pages).

International Preliminary Report on Patentability, dated Dec. 22, 2020, for International Application No. PCT/US2019/037661. (6 pages).

International Search Report and Written Opinion, dated Oct. 17, 2019 for PCT Application No. PCT/US2019/037676. (15 pages).

International Search Report and Written Opinion, dated Sep. 4, 2019 for PCT Application No. PCT/US2019/037773. (9 pages).

International Search Report and Written Opinion, dated Sep. 4, 2019, for International Application No. PCT/US2019/037661. (13 pages).

Jacob, "Eye Tracking in Advance Interface Design," *Virtual Environments and Advanced Interface Design*, ed. by W. Barfield and T.A. Furness, Oxford University Press, New York, Human-Computer Interaction Lab Naval Research Laboratory, Washington, D.C., 1995, pp. 258-288.

Office Action, dated Jan. 5, 2022, for U.S. Appl. No. 16/973,004, Pedroza et al., "Systems and Methods for Temporarily Disabling User Control Interfaces During Attachment of an Electronic Device". (25 pages).

Office Action, dated Jun. 8, 2022, for U.S. Appl. No. 16/973,004, Pedroza et al., "Systems and Methods for Temporarily Disabling User Control Interfaces During Attachment of an Electronic Device". (28 pages).

Office Action, dated Oct. 27, 2022, for U.S. Appl. No. 16/973,004, Pedroza et al., "Systems and Methods for Temporarily Disabling User Control Interfaces During Attachment of an Electronic Device". (26 pages).

Tanriverdi et al., "Interacting with Eye Movements in Virtual Environments," Department of Electrical Engineering and Computer Science, Tufts University, Medford, MA, *ACM CHI 2000 Human Factors in Computing Systems Conference*, The Hague, The Netherlands, Apr. 1-6, 2000, Association for Computing Machinery Press, pp. 265-272.

* cited by examiner

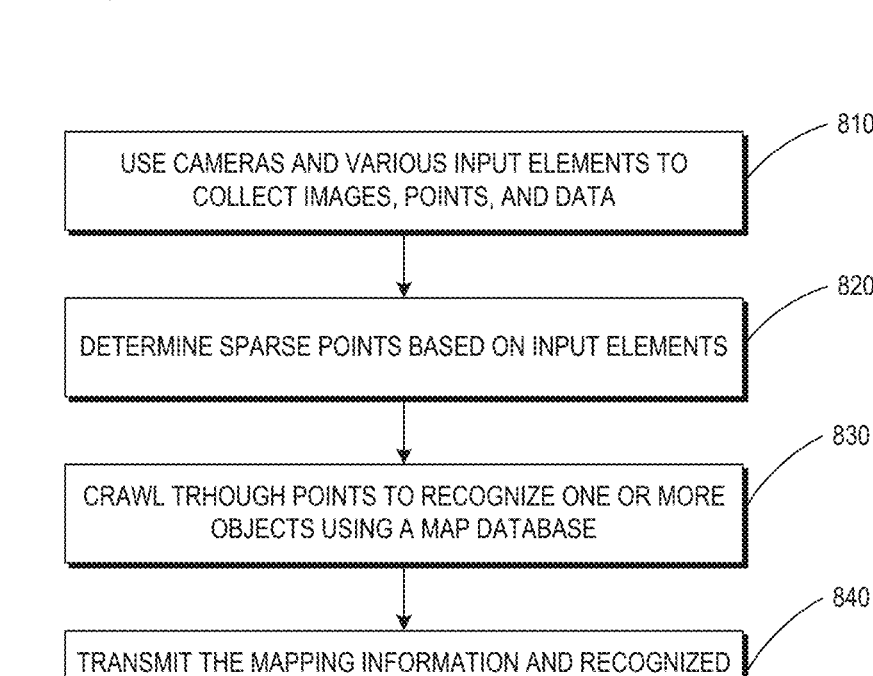

800

810
USE CAMERAS AND VARIOUS INPUT ELEMENTS TO
COLLECT IMAGES, POINTS, AND DATA

820
DETERMINE SPARSE POINTS BASED ON INPUT ELEMENTS

830
CRAWL TRHOUGH POINTS TO RECOGNIZE ONE OR MORE
OBJECTS USING A MAP DATABASE

840
TRANSMIT THE MAPPING INFORMATION AND RECOGNIZED
OBJECTS TO THE LOCAL WEARABLE SYSTEM

850
DISPLAY A DESIRED VIRTUAL SCENE TO THE USER IN
RELATION TO RECOGNIZED OBJECTS

IDENTIFY A VIRTUAL UI

1020

GENERATE DATA FOR THE VIRTUAL UI

1030

SEND THE DATA TO A USER DEVICE

1040

DISPLAY THE VIRTUAL UI BASED ON THE
SENT DATA

1050

WAIT FOR A COMMAND FROM A USER

1060

RECOGNIZE GESTURE
OR OTHER COMMAND?

NO

YES

1070

GENERATE VIRTUAL CONTENT/PERFORM
ACTION BASED ON THE COMMAND

1310

1314

1318b

1318a

1500a

1502

RECEIVE AN IMAGE FROM AN INWARD-FACING
IMAGING SYSTEM OF A HEAD-MOUNTED DEVICE (HMD)

1504

ANALYZE THE IMAGE TO IDENTIFY PERIOCULAR
FEATURES

1506

DETERMINE A RELATIVE POSITION BETWEEN THE HMD
AND THE HEAD OF THE USER BASED AT LEAST PARTLY
ON AN ANALYSIS OF THE IMAGE

1508

DETERMINE A FIT CATEGORY OF THE HMD BASED AT
LEAST PARTLY ON THE RELATIVE POSITION

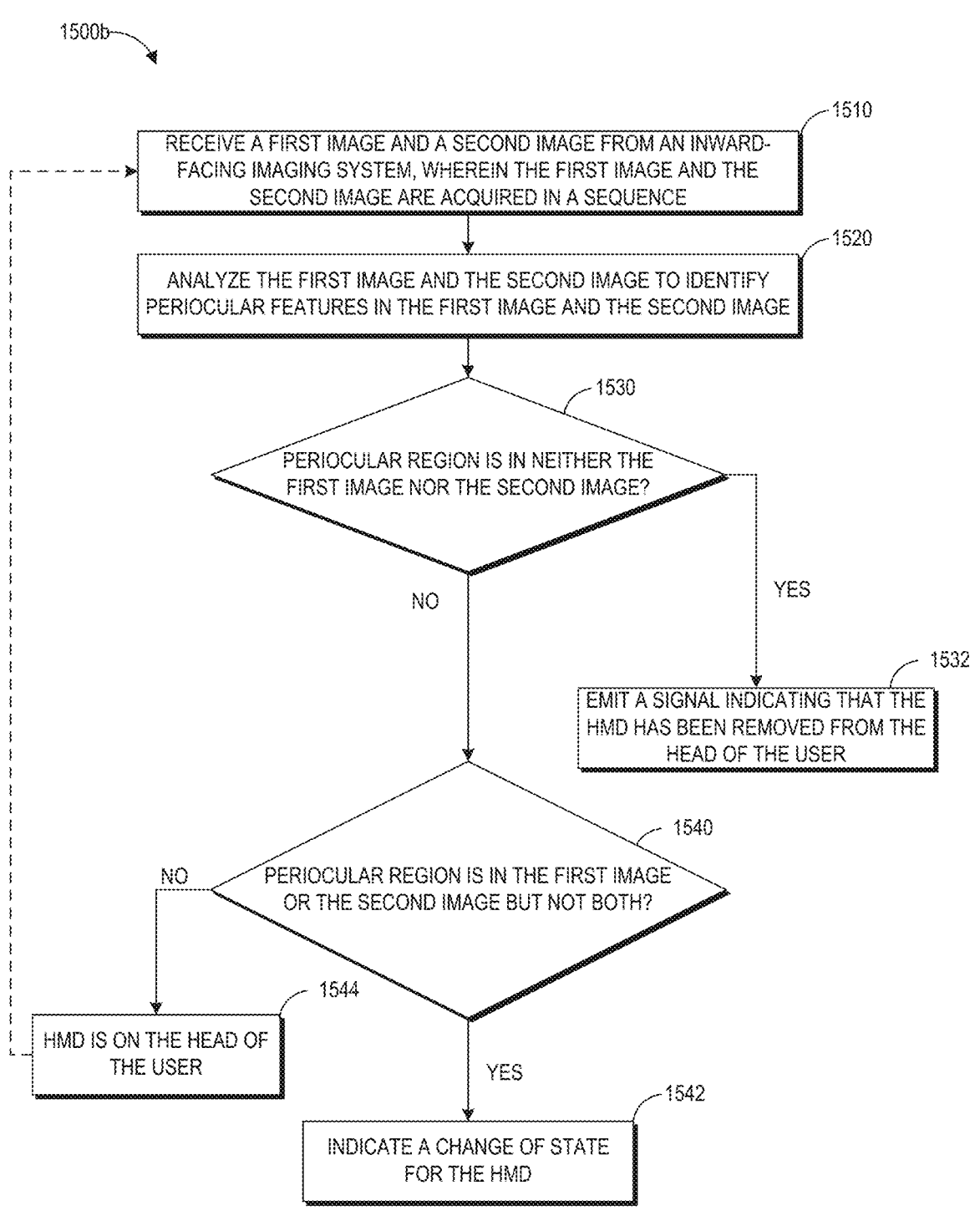

1500b

1510
RECEIVE A FIRST IMAGE AND A SECOND IMAGE FROM AN INWARD-FACING IMAGING SYSTEM, WHEREIN THE FIRST IMAGE AND THE SECOND IMAGE ARE ACQUIRED IN A SEQUENCE

1520
ANALYZE THE FIRST IMAGE AND THE SECOND IMAGE TO IDENTIFY PERIOCULAR FEATURES IN THE FIRST IMAGE AND THE SECOND IMAGE

1530
PERIOCULAR REGION IS IN NEITHER THE FIRST IMAGE NOR THE SECOND IMAGE?

NO

YES

1532
EMIT A SIGNAL INDICATING THAT THE HMD HAS BEEN REMOVED FROM THE HEAD OF THE USER

1540
PERIOCULAR REGION IS IN THE FIRST IMAGE OR THE SECOND IMAGE BUT NOT BOTH?

NO

1544
HMD IS ON THE HEAD OF THE USER

YES

1542
INDICATE A CHANGE OF STATE FOR THE HMD

ACCESS EYE IMAGES

1554

ANALYZE THE EYE IMAGES USING A
MACHINE LEARNING TECHNIQUE

1556

OUTPUT A MAPPING FOR QUALITY OF FIT OR
REMOVAL CATEGORIZATION

1562

ACCESS ADDITIONAL EYE IMAGES

1564

UPDATE THE MAPPING TO REFLECT
INDIVIDUAL PREFERENCES OF A USER

1566

PROVIDE INFORMATION FOR THE USER TO
UPDATE QUALITY OF FIT OF THE HMD ON
THE USER'S HEAD

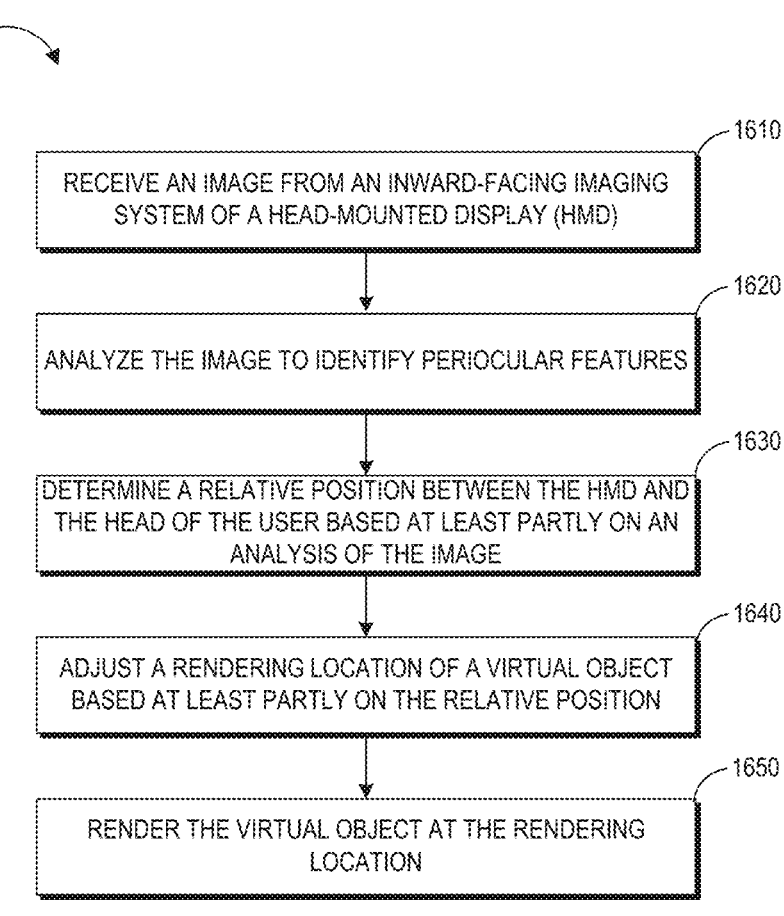

1600

1610
RECEIVE AN IMAGE FROM AN INWARD-FACING IMAGING SYSTEM OF A HEAD-MOUNTED DISPLAY (HMD)

1620
ANALYZE THE IMAGE TO IDENTIFY PERIOCULAR FEATURES

1630
DETERMINE A RELATIVE POSITION BETWEEN THE HMD AND THE HEAD OF THE USER BASED AT LEAST PARTLY ON AN ANALYSIS OF THE IMAGE

1640
ADJUST A RENDERING LOCATION OF A VIRTUAL OBJECT BASED AT LEAST PARTLY ON THE RELATIVE POSITION

1650
RENDER THE VIRTUAL OBJECT AT THE RENDERING LOCATION

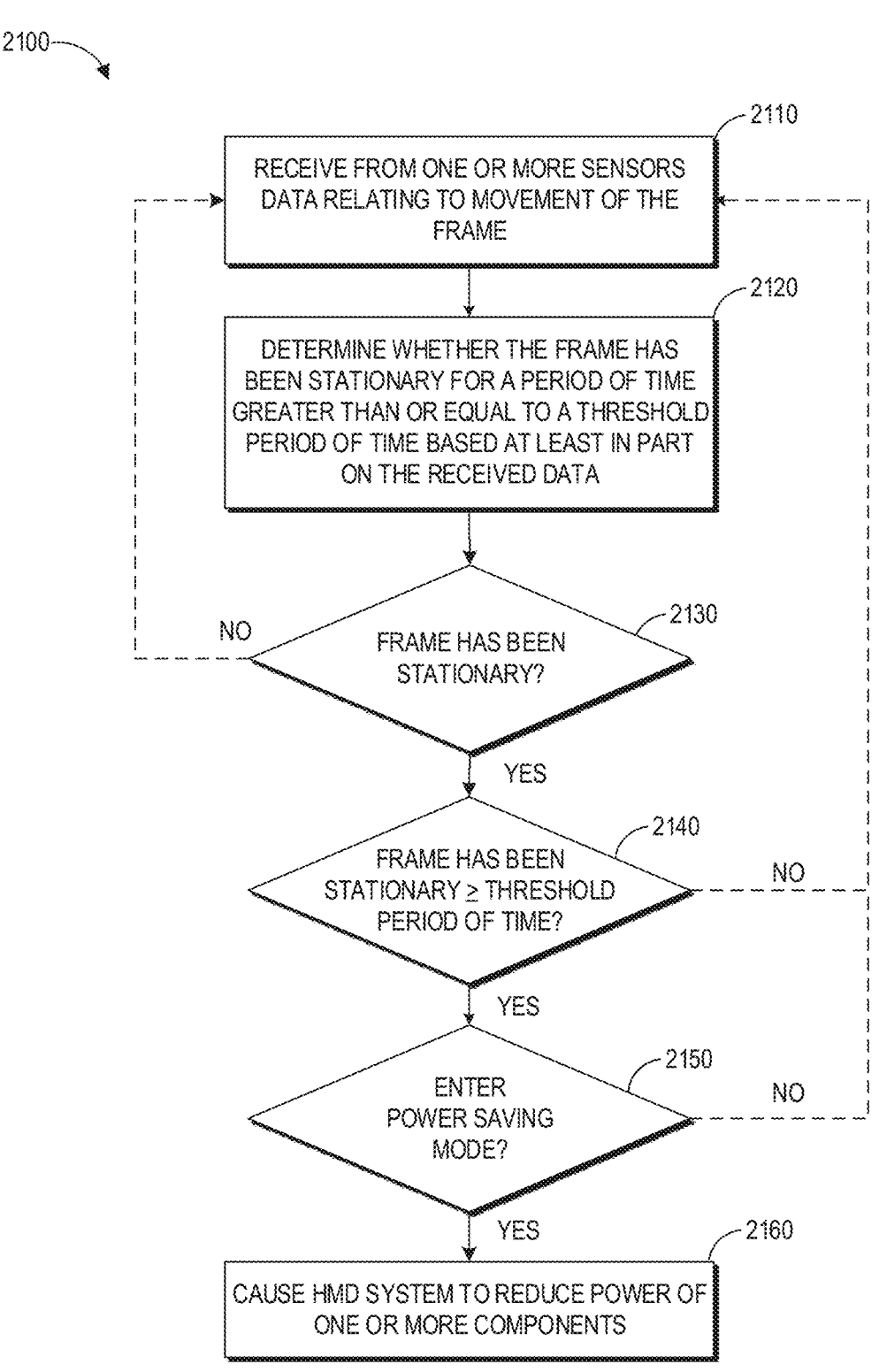

2110

RECEIVE FROM ONE OR MORE SENSORS DATA RELATING TO MOVEMENT OF THE FRAME

2120

DETERMINE WHETHER THE FRAME HAS BEEN STATIONARY FOR A PERIOD OF TIME GREATER THAN OR EQUAL TO A THRESHOLD PERIOD OF TIME BASED AT LEAST IN PART ON THE RECEIVED DATA

2130

FRAME HAS BEEN STATIONARY?

NO

YES

2140

FRAME HAS BEEN STATIONARY ≥ THRESHOLD PERIOD OF TIME?

NO

YES

2150

ENTER POWER SAVING MODE?

NO

YES

2160

CAUSE HMD SYSTEM TO REDUCE POWER OF ONE OR MORE COMPONENTS

FIG. 19

HEAD-MOUNTED DISPLAY SYSTEMS WITH POWER SAVING FUNCTIONALITY

REFERENCE TO RELATED APPLICATIONS

This application is a continuation of U.S. patent application Ser. No. 18/413,714, filed Jan. 16, 2024, which is a continuation of U.S. patent application Ser. No. 18/176,333, filed Feb. 28, 2023, now U.S. Pat. No. 11,906,732, which is a continuation of U.S. patent application Ser. No. 17/252, 099, filed Dec. 14, 2020, now U.S. Pat. No. 11,624,909, which is a 371 of PCT/US2019/037661, filed Jun. 18, 2019, which claims the benefit of priority under 35 U.S.C. 119(e) of U.S. Provisional Application No. 62/686,586 filed on Jun. 18, 2018, the entire disclosure of which is expressly incorporated herein by reference. This application also relates to U.S. Provisional Application No. 62/404,419, filed on Oct. 5, 2016, entitled "PERIOCULAR TEST FOR GLASSES REMOVAL", U.S. Provisional Application No. 62/404,493, filed on Oct. 5, 2016, entitled "PERIOCULAR TEST FOR GLASSES FIT", U.S. Provisional Application No. 62/416, 341, filed on Nov. 2, 2016, entitled "DYNAMIC DISPLAY CORRECTION BASED ON DISPLAY POSITION TRACKING", U.S. application Ser. No. 15/717,747, filed on Sep. 27, 2017, entitled "PERIOCULAR TEST FOR MIXED REALITY CALIBRATION", and to U.S. application Ser. No. 15/448,402, filed on Mar. 2, 2017, entitled "CURRENT DRAIN REDUCTION IN AR/VR DISPLAY SYSTEMS, the disclosures of all which are hereby incorporated by reference herein in their entireties. This application also relates to U.S. application Ser. No. 14/555,585 filed on Nov. 27, 2014, now U.S. Pat. No. 9,791,700 issued on Oct. 17, 2017; U.S. application Ser. No. 14/690,401 filed on Apr. 18, 2015, now U.S. Pat. No. 10,262,462 issued on Apr. 16, 2019; U.S. application Ser. No. 14/212,961 filed on Mar. 14, 2014, now U.S. Pat. No. 9,417,452 issued on Aug. 16, 2016; and U.S. application Ser. No. 14/331,218 filed on Jul. 14, 2014, now U.S. Pat. No. 9,671,566 issued on Jun. 6, 2017, the disclosures of all which are hereby incorporated by reference herein in their entireties.

FIELD

The present disclosure relates to virtual reality and augmented reality imaging and visualization systems and more particularly to tuning operational parameters and/or reducing power consumption of a virtual or augmented reality wearable display device.

BACKGROUND

Modern computing and display technologies have facilitated the development of systems for so called "virtual reality", "augmented reality", or "mixed reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user; a mixed reality, or "MR", related to merging real and virtual worlds to produce new environments where physical and virtual objects co-exist and interact in real time. As it turns out, the human visual perception system is very complex, and producing a VR, AR, or MR technology that facilitates a comfortable, natural-feeling, rich presentation of virtual image elements amongst other virtual or real-world imagery elements is challenging. Systems and methods disclosed herein address various challenges related to VR, AR and MR technology.

SUMMARY

A wearable device can include an inward-facing imaging system configured to acquire images of a user's periocular region. The wearable device can determine a relative position between the wearable device and the user's face based on the images acquired by the inward-facing imaging system. The relative position may be used to determine whether the user is wearing the wearable device, whether the wearable device fits the user, or whether an adjustment to a rendering location of virtual object should be made to compensate for a deviation of the wearable device from its normal resting position.

In some implementations, a head-mounted display system can be configured to project light to an eye of a user to display augmented reality image content in a vision field of the user. The head-mounted display system can include a frame, a head-mounted display disposed on the frame, and one or more sensors. The frame can be configured to be supported on a head of the user in an upright position. The display can be configured to project light into the user's eye to display augmented reality image content to the user's vision field. At least a portion of the display can be transparent and disposed at a location in front of the user's eye when the user wears the frame in the upright position such that the transparent portion transmits light from a portion of the environment in front of the user and the head-mounted display to the user's eye to provide a view of the portion of the environment in front of the user and the head-mounted display. The system can also include processing electronics in communication with the display and the one or more sensors. The processing electronics can be configured to receive a signal from the one or more sensors, determine whether the frame is in an upside-down position based at least in part on the signal received from the one or more sensors, and cause the head-mounted display system to reduce power of one or more components of the head-mounted display system in response to at least in part on a determination that the frame is in the upside-down position.

In some implementations, a head-mounted display system can be configured to project light to an eye of a user to display augmented reality image content in a vision field of the user. The head-mounted display system can include a frame, a head-mounted display disposed on the frame, and one or more sensors. The frame can be configured to be supported on a head of the user. The display can be configured to project light into the user's eye to display augmented reality image content to the user's vision field. At least a portion of the display can be transparent and disposed at a location in front of the user's eye when the user wears the frame such that the transparent portion transmits light from a portion of the environment in front of the user and the head-mounted display to the user's eye to provide a view of the portion of the environment in front of the user and the head-mounted display. The system can also include processing electronics in communication with the display and the one or more sensors. The processing electronics can be configured to receive from the one or more sensors data relating to movement of the frame, determine whether the frame has been stationary for a period of time greater than or equal to a threshold period of time based at least in part on the received data, and cause the head-mounted display system to reduce power of one or more components of the head-mounted display system in response to at least in part on a determination that the frame has been stationary for the period of time greater than or equal to the threshold period of time.

In some implementations, a head-mounted display system can be configured to project light to an eye of a user to display augmented reality image content in a vision field of the user. The head-mounted display system can include a frame, a head-mounted display disposed on the frame, and one or more sensors. The frame can be configured to be supported on a head of the user in an upright position. The display can be configured to project light into the user's eye to display augmented reality image content to the user's vision field. At least a portion of the display can be transparent and disposed at a location in front of the user's eye when the user wears the frame in the upright position such that the transparent portion transmits light from a portion of the environment in front of the user and the head-mounted display to the user's eye to provide a view of the portion of the environment in front of the user and the head-mounted display. The system can also include processing electronics in communication with the display and the one or more sensors. The processing electronics can be configured to receive a signal from the one or more sensors, determine whether the frame is on top of the head of the user based at least in part on the signal received from the one or more sensors, and cause the head-mounted display system to reduce power of one or more components of the head-mounted display system in response to at least in part on a determination that the frame is on the top of the head of the user.

Example Set I

1. A head-mounted display system configured to project light to an eye of a user to display augmented reality image content in a vision field of said user, said head-mounted display system comprising:
  a frame configured to be supported on a head of the user in an upright position;
  a head-mounted display disposed on the frame, said display configured to project light into said user's eye to display augmented reality image content to the user's vision field, at least a portion of said display being transparent and disposed at a location in front of the user's eye when the user wears the frame in the upright position such that said transparent portion transmits light from a portion of the environment in front of the user and said head-mounted display to the user's eye to provide a view of said portion of the environment in front of the user and said head-mounted display;
  one or more sensors; and
  processing electronics in communication with the display and the one or more sensors, the processing electronics configured to:
    receive a signal from the one or more sensors;
    determine whether the frame is in an upside-down position based at least in part on the signal received from the one or more sensors; and
    cause the head-mounted display system to reduce power of one or more components of the head-mounted display system in response to at least in part on a determination that the frame is in the upside-down position.

2. The display system of Example 1, wherein the one or more sensors comprise one or more inertial measurement units (IMUs) configured to measure change in the orientation of the frame.

3. The display system of Example 2, wherein the one or more IMUs comprise at least one gyroscope and/or accelerometer.

4. The display system of Example 2 or 3, wherein the processing electronics is configured to determine whether the frame is in the upside-down position by:
  receiving measurements from the one or more IMUs; and
  analyzing the received measurements to determine whether the frame has been flipped over with respect to the upright position based at least in part on the measurements from the one or more IMUs, wherein the frame is in the upside-down position if the frame has been flipped over with respect to the upright position.

5. The display system of Example 4, wherein the frame has been flipped over when the frame has been rotated from 160 degrees to 200 degrees with respect to the upright position.

6. The display system of any of the preceding examples, wherein the one or more sensors comprise an inward-facing imaging system and/or an outward-facing imaging system.

7. The display system of Example 6, wherein the processing electronics is configured to determine whether the frame is in the upside-down position by:
  receiving images from the inward-facing imaging system and/or the outward-facing imaging system; and
  analyzing the images to determine whether the frame has been flipped over with respect to the upright position, wherein the frame is in the upside-down position if the images comprise image content oriented as if the frame has been flipped over with respect to the upright position.

8. The display system of Example 7, wherein the frame has been flipped over when the frame has been rotated from 160 degrees to 200 degrees with respect to the upright position.

9. The display system of any of the preceding examples, wherein the one or more sensors comprise one or more pressure sensors configured to sense pressure exerted on at least a portion of a top edge of the frame.

10. The display system of any of the preceding examples, wherein the processing electronics is further configured to:
  determine whether the frame is not supported on the head of the user; and
  cause the head-mounted display system to reduce the power of the one or more components of the head-mounted display system in response to at least in part on a determination that the frame is not supported on the head of the user.

11. The display system of Example 10, wherein the one or more sensors comprise an inward-facing imaging system configured to sense one or more facial features of the user.

12. The display system of Example 11, wherein the facial features include periocular features.

13. The display system of Example 12, wherein the processing electronics is configured to determine whether the frame is not supported on the head of the user by:
  receiving images from the inward-facing imaging system; and
  analyzing the images to identify one or more periocular features, wherein the frame is not supported on the head of the user if the one or more periocular features are not identified in the images.

14. The display system of Example 12, wherein the processing electronics is configured to determine whether the frame has been removed from the head of the user by:

receiving from the inward-facing imaging system a first image;

receiving from the inward-facing imaging system a second image after the first image; and analyzing the first image and the second image to identify one or more periocular features, wherein the frame has been removed from the head of the user if the one or more periocular features are identified in the first image and not identified in the second image.

15. The display system of any of Examples 10-14, wherein the one or more sensors comprise one or more pressure sensors configured to sense pressure exerted by a portion of the user's head on the frame.

16. The display system of Example 15, wherein the one or more pressure sensors are configured to sense pressure on a temple, band, or nose pad of the frame.

17. The display system of Example 15 or 16, wherein the one or more pressure sensors comprise at least one strain gauge.

18. The display system of any of Examples 15-17, wherein the processing electronics is configured to determine whether the frame is not supported on the head of the user by:

receiving sensed pressures from the one or more pressure sensors; and analyzing the sensed pressures to indicate whether the frame is not in physical contact with the user's head, wherein the frame is not supported on the head of the user if the sensed pressures indicate non-contact with the user's head.

19. The display system of any of Examples 15-17, wherein the processing electronics is configured to determine whether the frame has been removed from the head of the user by:

receiving from the one or more pressure sensors a first sensed pressure;

receiving from the one or more pressure sensors a second sensed pressure after the first sensed pressure; and analyzing the first sensed pressure and the second sensed pressure to indicate whether the frame is in physical contact with the user's head, wherein the frame has been removed from the head of the user if the first sensed pressure indicates contact with the user's head and the second sensed pressure does not indicate contact with the user's head.

20. The display system of any of the preceding examples, wherein the processing electronics is further configured to:

determine whether the frame has been stationary for a period of time greater than or equal to a threshold period of time; and cause the head-mounted display system to reduce the power of the one or more components of the head-mounted display system in response to at least in part on a determination that the frame has been stationary for the period of time greater than or equal to the threshold period of time.

21. The display system of Example 20, wherein the one or more sensors comprise one or more motion sensors configured to measure change in position of the frame.

22. The display system of Example 21, wherein the processing electronics is configured to determine whether the frame has been stationary for the period of time greater than or equal to the threshold period of time by:

receiving measurements from the one or more motion sensors; and analyzing the received measurements to determine whether the frame has not moved for the period of time greater than or equal to the threshold period of time, wherein the frame has been stationary for the period of time greater than or equal to the threshold period of time if the frame has not changed position for at least the threshold period of time.

23. The display system of any of Examples 20-22, wherein the one or more sensors comprise an inward-facing imaging system and/or an outward-facing imaging system.

24. The display system of Example 23, wherein the processing electronics is configured to determine whether the frame has been stationary for the period of time greater than or equal to the threshold period of time by:

receiving images in sequence from the inward-facing imaging system and/or the outward-facing imaging system; and analyzing the received images to determine whether the frame has not moved for the period of time greater than or equal to the threshold period of time, wherein the frame has been stationary for the period of time greater than or equal to the threshold period of time if the images have not changed for at least the threshold period of time.

25. The display system of any of Examples 20-24, further comprising one or more clocks on a chip to monitor the period of time.

26. The display system of any of the preceding examples, wherein processing electronics is configured to cause the display system to reduce the power of the one or more components by dimming or turning off a light source of the display.

27. The display system of any of the preceding examples, wherein processing electronics is configured to cause the display system to reduce the power of the one or more components by reducing a refresh rate associated with the display.

28. The display system of any of the preceding examples, wherein processing electronics is configured to cause the display system to reduce the power of the one or more components by reducing the power of the one or more sensors.

29. The display system of any of the preceding examples, wherein processing electronics is configured to cause the display system to reduce the power of the one or more components by causing the display system to enter a sleep mode.

30. The display system of any of the preceding examples, wherein the display system is configured to provide an alert to the user indicating that the display system is reducing the power of the one or more components of the display system.

31. The display system of Example 30, wherein the alert is an audible or visible alert.

32. The display system of any of the preceding examples, wherein the processor is further configured to cause the display system to increase the power of the one or more components in response to at least in part on a determination that the frame is no longer in the upside-down position.

33. The display system of Example 32, where the processor is configured to cause the display system to increase the power of the one or more components in response to at least in part on a determination that the frame is supported on the head of the user such that said display is configured to project light into said user's eye to display augmented reality image content to the user's vision field.

34. The display system of any of the preceding examples, comprising one or more inward-facing cameras and/or one or more outward-facing cameras, said one or more inward-facing cameras and/or one or more outward-facing cameras being configured to sense the user and/or the surroundings of the user even when the power of the one or more components has been reduced.

35. The display system of any of the preceding examples, wherein the display is configured to project light into said user's eye to display augmented reality image content to the user's vision field at different amounts of divergences as if projected from different distances from the user's eye.

36. The display system of any of the preceding examples, wherein the one or more sensors comprise one or more proximity sensors configured to sense the device approach or contact a surface 37. The display system of any of the preceding examples, wherein the one or more sensors comprise one or more light sensors configured to sense the device approach or contact a surface 38. The display system of any of the preceding examples, wherein the one or more sensors comprise multiple sensors on different portions of the frame 39. The display system of any of Examples 10-38, wherein the one or more sensors comprise:

a light source configured to project light into the user's eye; and a light-monitoring device configured to measure reflected light.

40. The display system of Example 39, wherein the processing electronics is configured to determine whether the frame is not supported on the head of the user by:

receiving measurements of reflected light from the light-monitoring device; and analyzing the measurements of reflected light to identify a signal reflected from the user, wherein the frame is not supported on the head of the user if the signal is not identified from the measurements.

41. The display system of Example 39, wherein the processing electronics is configured to determine whether the frame has been removed from the head of the user by:

receiving from the light-monitoring device a first measurement of reflected light;

receiving from the light-monitoring device a second measurement of reflected light after the first measurement; and analyzing the first measurement of reflected light and the second measurement of reflected light to identify a signal reflected from the user, wherein the frame has been removed from the head of the user if the signal is identified from the first measurement and not identified from the second measurement.

42. The display system of Example 40 or 41, wherein the signal is a heartbeat.

Example Set II

1. A head-mounted display system configured to project light to an eye of a user to display augmented reality image content in a vision field of said user, said head-mounted display system comprising:

a frame configured to be supported on a head of the user;

a head-mounted display disposed on the frame, said display configured to project light into said user's eye to display augmented reality image content to the user's vision field, at least a portion of said display being transparent and disposed at a location in front of the user's eye when the user wears said frame such that said transparent portion transmits light from a portion of the environment in front of the user and said head-mounted display to the user's eye to provide a view of said portion of the environment in front of the user and said head-mounted display;

one or more sensors; and processing electronics in communication with the display and the one or more sensors, the processing electronics configured to:

receive from the one or more sensors data relating to movement of the frame;

determine whether the frame has been stationary for a period of time greater than or equal to a threshold period of time based at least in part on the received data; and cause the head-mounted display system to reduce power of one or more components of the head-mounted display system in response to at least in part on a determination that the frame has been stationary for the period of time greater than or equal to the threshold period of time.

2. The display system of Example 1, wherein the one or more sensors comprise one or more motion sensors configured to measure change in position of the frame.

3. The display system of Example 2, wherein the one or more motion sensors comprise one or more inertial measurement units (IMUs).

4. The display system of Example 2 or 3, wherein the processing electronics is configured to determine whether the frame has been stationary for the period of time greater than or equal to the threshold period of time by:

receiving measurements from the one or more motion sensors; and analyzing the received measurements to determine whether the frame has not moved for the period of time greater than or equal to the threshold period of time, wherein the frame has been stationary for the period of time greater than or equal to the threshold period of time if the frame has not changed position for at least the threshold period of time.

5. The display system of any of Examples 1-4, wherein the one or more sensors comprise an inward-facing imaging system and/or an outward facing imaging system.

6. The display system of Example 5, wherein the processing electronics is configured to determine whether the frame has been stationary for the period of time greater than or equal to the threshold period of time by:

receiving images in sequence from the inward-facing imaging system and/or the outward-facing imaging system; and analyzing the received images to determine whether the frame has not moved for the period of time greater than or equal to the threshold period of time, wherein the frame has been stationary for the period of time greater than or equal to the threshold period of time if the images have not changed for at least the threshold period of time.

7. The display system of any of the preceding examples, further comprising one or more clocks on a chip to monitor the period of time.

8. The display system of any of the preceding examples, wherein the processing electronics is further configured to:

determine whether the frame is not supported on the head of the user; and cause the head-mounted display system to reduce the power of the one or more components of the head-mounted display system in response to at least in part on a determination that the frame is not supported on the head of the user.

9. The display system of Example 8, wherein the one or more sensors comprise an inward-facing imaging system configured to sense one or more facial features of the user.

10. The display system of Example 9, wherein the facial features include periocular features.

11. The display system of Example 10, wherein the processing electronics is configured to determine whether the frame is not supported on the head of the user by:

receiving images from the inward-facing imaging system; and analyzing the images to identify one or more periocular features, wherein the frame is not supported on the head of the user if the one or more periocular features are not identified in the images.

12. The display system of Example 10, wherein the processing electronics is configured to determine whether the frame has been removed from the head of the user by:

receiving from the inward-facing imaging system a first image;

receiving from the inward-facing imaging system a second image after the first image; and analyzing the first image and the second image to identify one or more periocular features, wherein the frame has been removed from the head of the user if the one or more periocular features are identified in the first image and not identified in the second image.

13. The display system of any of Examples 8-12, wherein the one or more sensors comprise one or more pressure sensors configured to sense pressure exerted by a portion of the user's head on the frame.

14. The display system of Example 13, wherein the one or more pressure sensors are configured to sense pressure on a temple, band, or nose pad of the frame.

15. The display system of Example 13 or 14, wherein the one or more pressure sensors comprise at least one strain gauge.

16. The display system of any of Examples 13-15, wherein the processing electronics is configured to determine whether the frame is not supported the head of the user by:

receiving sensed pressures from the one or more pressure sensors; and analyzing the sensed pressures to indicate whether the frame is not in physical contact with the user's head, wherein the frame is not supported on the head of the user if the sensed pressures indicate non-contact with the user's head.

17. The display system of any of Examples 13-15, wherein the processing electronics is configured to determine whether the frame has been removed from the head of the user by:

receiving from the one or more pressure sensors a first sensed pressure;

receiving from the one or more pressure sensors a second sensed pressure after the first sensed pressure; and analyzing the first sensed pressure and the second sensed pressure to indicate whether the frame is in physical contact with the user's head, wherein the frame has been removed from the head of the user if the first sensed pressure indicates contact with the user's head and the second sensed pressure does not indicate contact with the user's head.

18. The display system of any of the preceding examples, wherein processing electronics is configured to cause the display system to reduce the power of the one or more components by dimming or turning off a light source of the display.

19. The display system of any of the preceding examples, wherein processing electronics is configured to cause the display system to reduce the power of the one or more components by reducing a refresh rate associated with the display.

20. The display system of any of the preceding examples, wherein processing electronics is configured to cause the display system to reduce the power of the one or more components by reducing the power of the one or more sensors.

21. The display system of any of the preceding examples, wherein processing electronics is configured to cause the display system to reduce the power of the one or more components by causing the display system to enter a sleep mode.

22. The display system of any of the preceding examples, wherein the display system is configured to provide an alert to the user indicating that the display system is reducing the power of the one or more components of the display system.

23. The display system of Example 22, wherein the alert is an audible or visible alert.

24. The display system of any of the preceding examples, wherein the processor is further configured to cause the display system to increase the power of the one or more components in response to at least in part on a determination that the frame is no longer stationary.

25. The display system of Example 24, where the processor is configured to cause the display system to increase the power of the one or more components in response to at least in part on a determination that the frame is supported on the head of the user such that said display is configured to project light into said user's eye to display augmented reality image content to the user's vision field.

26. The display system of any of the preceding examples, comprising one or more inward-facing cameras or one or more outward-facing cameras, said one or more inward-facing cameras or one or more outward-facing cameras being configured to sense the user and/or the surroundings of the user even when the power of the one or more components has been reduced.

27. The display system of any of the preceding examples, wherein the display is configured to project light into said user's eye to display augmented reality image content to the user's vision field at different amounts of divergences as if projected from different distances from the user's eye.

28. The display system of any of Examples 8-27, wherein the one or more sensors comprise:

a light source configured to project light into the user's eye; and a light-monitoring device configured to measure reflected light.

29. The display system of Example 28, wherein the processing electronics is configured to determine whether the frame is not supported on the head of the user by:

receiving measurements of reflected light from the light-monitoring device; and analyzing the measurements of reflected light to identify a signal reflected from the user, wherein the frame is not supported on the head of the user if the signal is not identified from the measurements.

30. The display system of Example 28, wherein the processing electronics is configured to determine whether the frame has been removed from the head of the user by:

receiving from the light-monitoring device a first measurement of reflected light;

receiving from the light-monitoring device a second measurement of reflected light after the first measurement; and analyzing the first measurement of reflected light and the second measurement of reflected light to identify a signal reflected from the user, wherein the frame has been removed from the head of the user if the signal is identified from the first measurement and not identified from the second measurement.

31. The display system of Example 29 or 30, wherein the signal is a heartbeat.

Example Set III

1. A head-mounted display system configured to project light to an eye of a user to display augmented reality image content in a vision field of said user, said head-mounted display system comprising:

a frame configured to be supported on a head of the user in an upright position;

a head-mounted display disposed on the frame, said display configured to project light into said user's eye to display augmented reality image content to the user's vision field, at least a portion of said display being transparent and disposed at a location in front of the user's eye when the user wears the frame in the upright position such that said transparent portion transmits light from a portion of the environment in front of the user and said head-mounted display to the user's eye to provide a view of said portion of the environment in front of the user and said head-mounted display;

one or more sensors; and processing electronics in communication with the display and the one or more sensors, the processing electronics configured to:

receive a signal from the one or more sensors;

determine whether the frame is on top of the head of the user based at least in part on the signal received from the one or more sensors; and cause the head-mounted display system to reduce power of one or more components of the head-mounted display system in response to at least in part on a determination that the frame is on the top of the head of the user.

2. The display system of Example 1, wherein the one or more sensors comprise one or more inertial measurement units (IMUs) configured to measure change in the orientation of the frame.

3. The display system of Example 2, wherein the one or more IMUs comprise at least one gyroscope and/or accelerometer.

4. The display system of Example 2 or 3, wherein the processing electronics is configured to determine whether the frame is on the top of the head of the user by:

receiving measurements from the one or more IMUs; and analyzing the received measurements to determine whether the frame is on top of the head of the user.

5. The display system of any of Examples 1-4, wherein the one or more sensors comprise an inward-facing imaging system and/or an outward-facing imaging system.

6. The display system of Example 5, wherein the processing electronics is configured to determine whether the frame is on the top of the head of the user by:

receiving images from the inward-facing imaging system and/or the outward-facing imaging system; and analyzing the images to determine whether the frame is on top of the head of the user.

7. The display system of any of Examples 5-6, wherein the one or more sensors comprise an inward-facing imaging system configured to sense one or more facial features of the user.

8. The display system of Example 7, wherein the facial features include periocular features.

9. The display system of Example 8, wherein the processing electronics is configured to determine whether the frame is on the top of the head of the user at least in part by:

receiving images from the inward-facing imaging system; and analyzing the images to identify one or more periocular features, wherein the frame is not on the top of the head of the user if the one or more periocular features are identified in the images.

10. The display system of any of Examples 1-9, wherein the processing electronics is further configured to:

determine whether the frame has been stationary for a period of time greater than or equal to a threshold period of time; and cause the head-mounted display system to reduce the power of the one or more components of the head-mounted display system in response to at least in part on a determination that the frame has been stationary for the period of time greater than or equal to the threshold period of time.

11. The display system of Example 10, wherein the one or more sensors comprise one or more motion sensors configured to measure change in position of the frame.

12. The display system of Example 11, wherein the processing electronics is configured to determine whether the frame has been stationary for the period of time greater than or equal to the threshold period of time by:

receiving measurements from the one or more motion sensors; and analyzing the received measurements to determine whether the frame has not moved for the period of time greater than or equal to the threshold period of time, wherein the frame has been stationary for the period of time greater than or equal to the threshold period of time if the frame has not changed position for at least the threshold period of time.

13. The display system of any of Examples 10-12, wherein the one or more sensors comprise an inward-facing imaging system and/or an outward-facing imaging system.

14. The display system of Example 13, wherein the processing electronics is configured to determine whether the frame has been stationary for the period of time greater than or equal to the threshold period of time by:

receiving images in sequence from the inward-facing imaging system and/or the outward-facing imaging system; and analyzing the received images to determine whether the frame has not moved for the period of time greater than or equal to the threshold period of time, wherein the frame has been stationary for the period of time greater than or equal to the threshold period of time if the images have not changed for at least the threshold period of time.

15. The display system of any of Examples 10-14, further comprising one or more clocks on a chip to monitor the period of time.

16. The display system of any of Examples 1-15, wherein processing electronics is configured to cause the display system to reduce the power of the one or more components by dimming or turning off a light source of the display.

17. The display system of any of Examples 1-16, wherein processing electronics is configured to cause the display system to reduce the power of the one or more components by reducing a refresh rate associated with the display.

18. The display system of any of Examples 1-17, wherein processing electronics is configured to cause the display system to reduce the power of the one or more components by reducing the power of the one or more sensors.

19. The display system of any of Examples 1-18, wherein processing electronics is configured to cause the display system to reduce the power of the one or more components by causing the display system to enter a sleep mode.

20. The display system of any of Examples 1-19, wherein the display system is configured to provide an alert to the user indicating that the display system is reducing the power of the one or more components of the display system.

21. The display system of Example 20, wherein the alert is an audible or visible alert.

22. The display system of any of Examples 1-21, wherein the processor is further configured to cause the display system to increase the power of the one or more components in response to at least in part on a determination that the frame is no longer on top of the head of the user.

23. The display system of Example 22, where the processor is configured to cause the display system to increase the power of the one or more components in response to at least in part on a determination that the frame is supported on the head of the user such that said display is configured to project light into said user's eye to display augmented reality image content to the user's vision field.

24. The display system of any of Examples 1-23, comprising one or more inward-facing cameras and/or one or more outward-facing cameras, said one or more inward-facing cameras and/or one or more outward-facing cameras being configured to sense the user and/or the surroundings of the user even when the power of the one or more components has been reduced.

25. The display system of any of Examples 1-24, wherein the display is configured to project light into said user's eye to display augmented reality image content to the user's vision field at different amounts of divergences as if projected from different distances from the user's eye.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

BRIEF DESCRIPTION OF THE DRAWINGS

FIG. 8 is a process flow diagram of an example of a method of rendering virtual content in relation to recognized objects.

FIG. 15B illustrates an example method for determining removal of the wearable device from a user's head.

FIG. 16 illustrates an example process for adjusting a rendering location of a virtual object.

FIG. 19 illustrates another example method that may be implemented by a wearable device to save power by determining that the device has been stationary for a threshold period of time.

Figure 1:
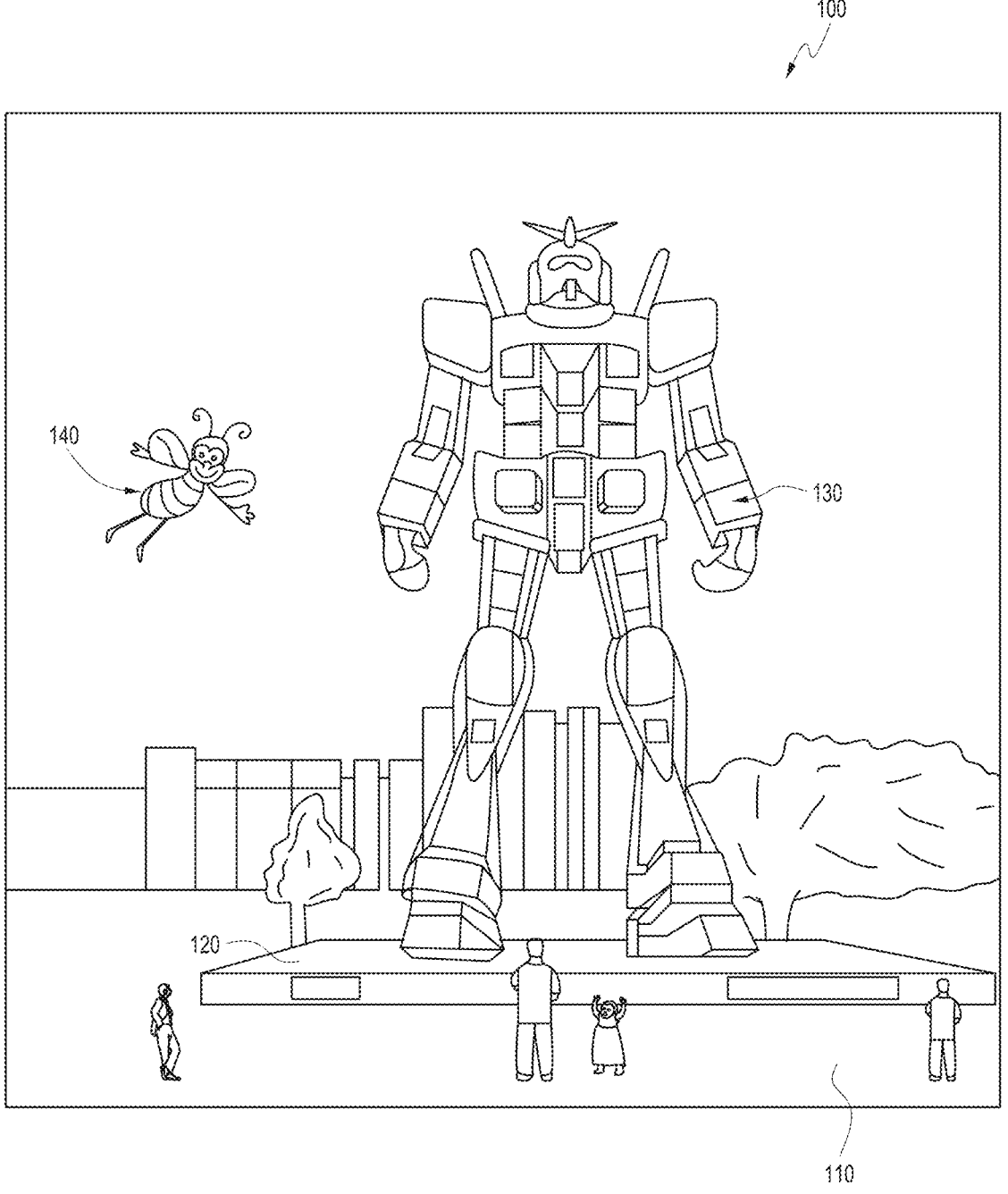
FIG. 1 depicts an illustration of a mixed reality scenario with certain virtual reality objects, and certain physical objects viewed by a person.

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

A wearable device for an AR/VR/MR system can be a head-mounted device (HMD) for presenting three-dimensional (3D) images to a user. An HMD may include a head-mounted display which can render a three-dimensional (3D) virtual object into the user's environment from the perspective of the user's eyes. As a result, the 3D virtual object may be perceived by the user in a similar manner as the real world objects. The HMD can render the 3D virtual object based on a world map which indicates the objects (including virtual objects) in the user's environment. The HMD can illuminate pixels on the display with a color and intensity corresponding to the world map. However, a point in the world map may not have a predetermined rendering location on an HMD since the user's eyes move around. Although the display may be calibrated relative to the user's eyes, such as when the device is first used by the user, such calibration may not always be reliable because the display will not be strongly affixed to the user's head. For example, the display can move when the user is interacting with it, such as when a user is playing a video game that requires user movement. Further, the display may slip slightly down the user's nose or tilt relative to a line between the user's ears. As a result, the HMD may not be able to provide a realistic presentation of the virtual object due to the shift (such as tilting forward or to one side) of the display.

The techniques described herein are at least in part directed to solving this problem. The inward-facing imaging system of the wearable device can acquire images of the periocular region of the user's face. The wearable device can analyze the periocular images to identify periocular features (e.g., position of the user's eyes). The wearable device can track the periocular features to determine the relative position between the user's eyes and the HMD. Based on this information, the wearable device can dynamically adjust the rendering location of a virtual object (to be displayed by the HMD) to reflect the perspectives of the user's eyes. Accordingly, such embodiments of the HMD can accurately display images to the user even when the HMD slips, moves, or tilts slightly relative to the user's head.

The relative position between the HMD and the user's head can also be used to determine a fit of HMD. The fit may provide an indication on whether to adjust certain parameters of the HMD (e.g., rendering parameters or the position of the frame (e.g., by increasing or decreasing the distances between the left and right ear stems to accommodate a larger or smaller head)) to provide a realistic and immersive visual experience. The HMD can use a mapping from an eye-image space of the periocular region to a fit space for the device to determine goodness of fit. The eye-image space may be determined based on images acquired by the inward-facing imaging system, such as for example, images of periocular regions or features. The fit space can include a collection of qualitative or quantities indications for degrees of fit. The mapping may be learned by a machine learning technique such as, e.g., a deep neural network, to identify features in the user's periocular region and use the identified features to determine relative positions between the HMD and the user's face or to classify goodness of fit. The HMD can provide an indication on whether the HMD fits the user's face based on the relative position or other features learned by the machine learning technique. The HMD can also adjust the projection of light from the 3D display based on the relative position of the HMD with respect to the user's head so that the light (e.g., a light field) is accurately projected into each of the user's eyes.

The HMD can also use the mapping to determine whether the user is wearing the HMD. For example, when the HMD determines that the periocular features do not appear in the images acquired by the inward-facing imaging system (or are too small, indicating the HMD is off the user's face), the HMD may send a signal indicating that the user has taken off the device. The signal may cause the device to change from one mode to another. For example, the signal may cause the HMD to change from an active mode to a powered off mode or a sleep mode. As another example, the HMD can use the images to calculate the distance between the user's face and the device; and if the HMD determines that the distance is greater than a threshold distance, the HMD may send a signal indicating that the user has taken off the HMD.

Various head-mounted display systems described herein can also be configured to provide power saving functionality. For example, some wearable devices can be configured to reduce power of one or more components based at least in part on a determination that the HMD is in a certain position (e.g., an upside-down position) and/or has been stationary for at least a threshold period of time.

Examples of 3D Display of a Wearable System

A wearable system (also referred to herein as an augmented reality (AR) system) can be configured to present 2D or 3D virtual images to a user. The images may be still images, frames of a video, or a video, in combination or the like. At least a portion of the wearable system can be implemented on a wearable device that can present a VR, AR, or MR environment, alone or in combination, for user interaction. The wearable device can be a head-mounted device (HMD) which is used interchangeably as an AR device (ARD). Further, for the purpose of the present disclosure, the term "AR" is used interchangeably with the term "MR".

FIG. 1 depicts an illustration of a mixed reality scenario with certain virtual reality objects, and certain physical objects viewed by a person. In FIG. 1, an MR scene 100 is depicted wherein a user of an MR technology sees a real-world park-like setting 110 featuring people, trees, buildings in the background, and a concrete platform 120. In addition to these items, the user of the MR technology also perceives that he "sees" a robot statue 130 standing upon the real-world platform 120, and a cartoon-like avatar character 140 flying by which seems to be a personification of a bumble bee, even though these elements do not exist in the real world.

In order for the 3D display to produce a true sensation of depth, and more specifically, a simulated sensation of surface depth, it may be desirable for each point in the display's visual field to generate an accommodative response corresponding to its virtual depth. If the accommodative response to a display point does not correspond to the virtual depth of that point, as determined by the binocular depth cues of convergence and stereopsis, the human eye may experience an accommodation conflict, resulting in unstable imaging, harmful eye strain, headaches, and, in the absence of accommodation information, almost a complete lack of surface depth.

VR, AR, and MR experiences can be provided by display systems having displays in which images corresponding to a plurality of depth planes are provided to a viewer. The images may be different for each depth plane (e.g., provide slightly different presentations of a scene or object) and may be separately focused by the viewer's eyes, thereby helping to provide the user with depth cues based on the accommodation of the eye required to bring into focus different image features for the scene located on different depth plane or based on observing different image features on different depth planes being out of focus. As discussed elsewhere herein, such depth cues provide credible perceptions of depth.

Figure 2:
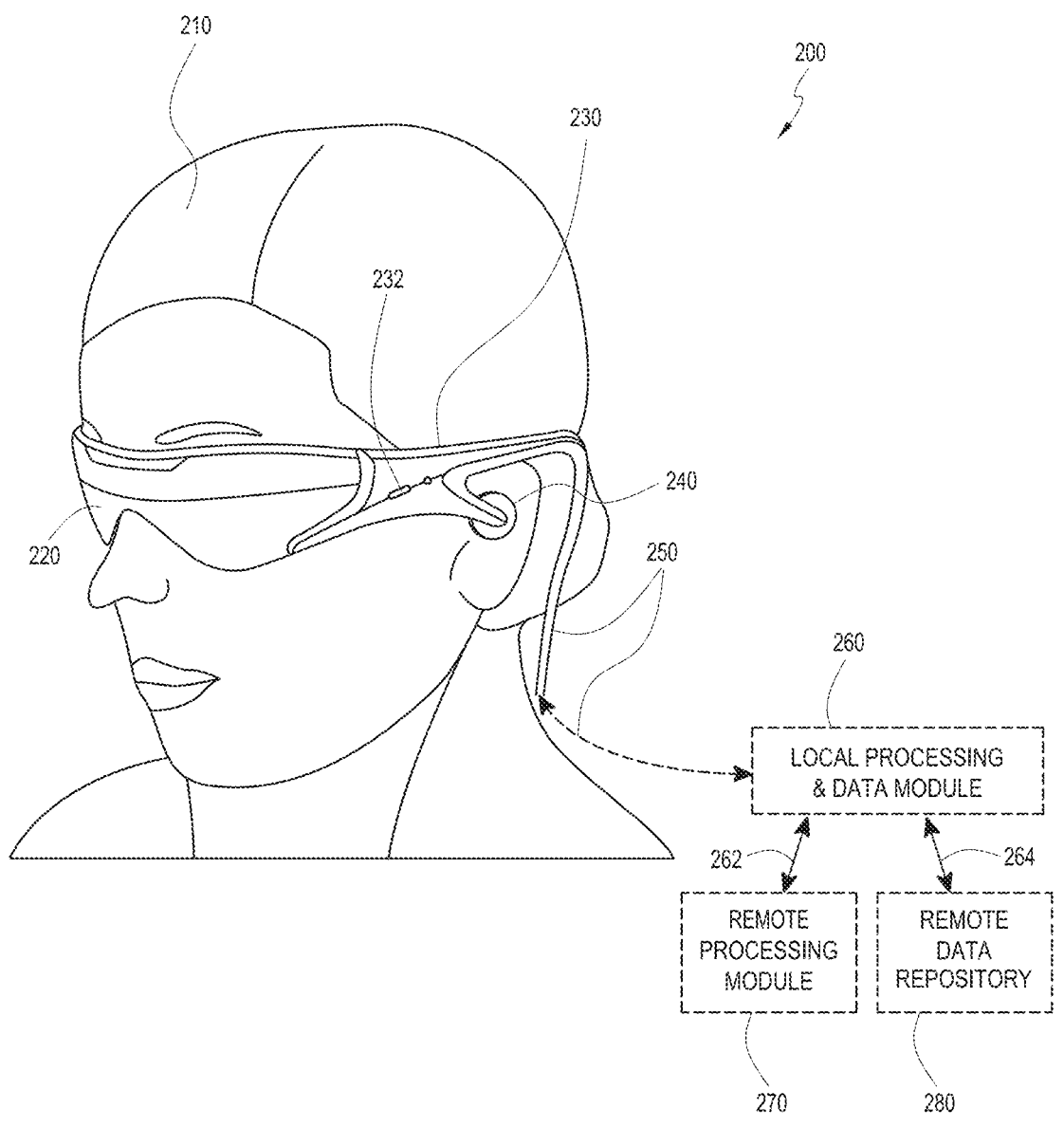
FIG. 2 schematically illustrates an example of a wearable system.

FIG. 2 illustrates an example of wearable system 200 which can be configured to provide an AR/VR/MR scene. The wearable system 200 can also be referred to as the AR system 200. The wearable system 200 includes a display 220, and various mechanical and electronic modules and systems to support the functioning of display 220. The display 220 may be coupled to a frame 230, which is wearable by a user, wearer, or viewer 210. The display 220 can be positioned in front of the eyes of the user 210. The display 220 can present AR/VR/MR content to a user. The display 220 can comprise a head mounted display that is worn on the head of the user. The head mounted display may be a heads-up display (HUD) which can display virtual information in pre-determined locations within a field of view of the user (as perceived through the HUD). The head-mounted display may also be a spatial augmented reality (SAR) display which can render 3D objects into the user's environment in a perspective correct manner (e.g., from the perspective of the user) such that the virtual objects appear similar to the real world objects. The perspective used for rendering the virtual objects may also be referred to as rendering viewpoint.

In some embodiments, a speaker 240 is coupled to the frame 230 and positioned adjacent the ear canal of the user (in some embodiments, another speaker, not shown, is positioned adjacent the other ear canal of the user to provide for stereo/shapeable sound control). The display 220 can include an audio sensor (e.g., a microphone) 232 for detecting an audio stream from the environment and capture ambient sound. In some embodiments, one or more other audio sensors, not shown, are positioned to provide stereo sound reception. Stereo sound reception can be used to determine the location of a sound source. The wearable system 200 can perform voice or speech recognition on the audio stream.

The wearable system 200 can include an outward-facing imaging system 464 (shown in FIG. 4) which observes the world in the environment around the user. The wearable system 200 can also include an inward-facing imaging system 462 (shown in FIG. 4) which can track the eye movements of the user. The inward-facing imaging system may track either one eye's movements or both eyes' movements. The inward-facing imaging system 462 may be attached to the frame 230 and may be in electrical communication with the processing modules 260 or 270, which may process image information acquired by the inward-facing imaging system to determine, e.g., the pupil diameters or orientations of the eyes, eye movements or eye pose of the user 210. The inward-facing imaging system 462 may include one or more cameras. For example, at least one camera may be used to image each eye. The images acquired by the cameras may be used to determine pupil size or eye pose for each eye separately, thereby allowing presentation of image information to each eye to be dynamically tailored to that eye. As another example, the pupil diameter or orientation of only one eye is determined (e.g., based on images acquired for a camera configured to acquire the images of that eye) and the eye features determined for this eye are assumed to be similar for the other eye of the user 210.

As an example, the wearable system 200 can use the outward-facing imaging system 464 or the inward-facing imaging system 462 to acquire images of a pose of the user. The images may be still images, frames of a video, or a video.

The display 220 can be operatively coupled 250, such as by a wired lead or wireless connectivity, to a local data processing module 260 which may be mounted in a variety of configurations, such as fixedly attached to the frame 230, fixedly attached to a helmet or hat worn by the user, embedded in headphones, or otherwise removably attached to the user 210 (e.g., in a backpack-style configuration, in a belt-coupling style configuration).

The local processing and data module 260 may comprise a hardware processor, as well as digital memory, such as non-volatile memory (e.g., flash memory), both of which may be utilized to assist in the processing, caching, and storage of data. The data may include data a) captured from sensors (which may be, e.g., operatively coupled to the frame 230 or otherwise attached to the user 210), such as image capture devices (e.g., cameras in the inward-facing imaging system or the outward-facing imaging system), audio sensors (e.g., microphones), inertial measurement units (IMUs), accelerometers, compasses, global positioning system (GPS) units, radio devices, or gyroscopes; or b) acquired or processed using remote processing module 270 or remote data repository 280, possibly for passage to the display 220 after such processing or retrieval. The local processing and data module 260 may be operatively coupled by communication links 262 or 264, such as via wired or wireless communication links, to the remote processing module 270 or remote data repository 280 such that these remote modules are available as resources to the local processing and data module 260. In addition, remote processing module 280 and remote data repository 280 may be operatively coupled to each other.

In some embodiments, the remote processing module 270 may comprise one or more processors configured to analyze and process data or image information. In some embodiments, the remote data repository 280 may comprise a digital data storage facility, which may be available through the internet or other networking configuration in a "cloud" resource configuration. In some embodiments, all data is stored and all computations are performed in the local processing and data module, allowing fully autonomous use from a remote module.

The human visual system is complicated and providing a realistic perception of depth is challenging. Without being limited by theory, it is believed that viewers of an object may perceive the object as being three-dimensional due to a combination of vergence and accommodation. Vergence movements (i.e., rolling movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex." Likewise, a change in vergence will trigger a matching change in accommodation, under normal conditions. Display systems that provide a better match between accommodation and vergence may form more realistic and comfortable simulations of three-dimensional imagery.

Figure 3:
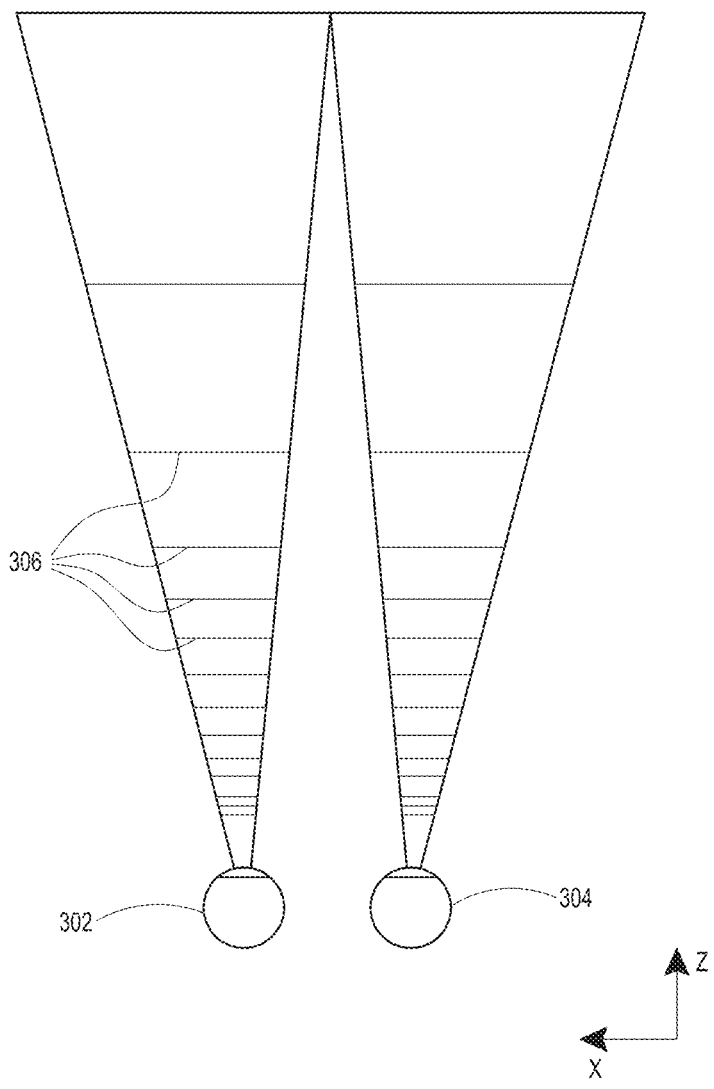
FIG. 3 schematically illustrates aspects of an approach for simulating three-dimensional imagery using multiple depth planes.

FIG. 3 illustrates aspects of an approach for simulating a three-dimensional imagery using multiple depth planes. With reference to FIG. 3, objects at various distances from eyes 302 and 304 on the z-axis are accommodated by the eyes 302 and 304 so that those objects are in focus. The eyes 302 and 304 assume particular accommodated states to bring into focus objects at different distances along the z-axis. Consequently, a particular accommodated state may be said to be associated with a particular one of depth planes 306, which has an associated focal distance, such that objects or parts of objects in a particular depth plane are in focus when the eye is in the accommodated state for that depth plane. In some embodiments, three-dimensional imagery may be simulated by providing different presentations of an image for each of the eyes 302 and 304, and also by providing different presentations of the image corresponding to each of the depth planes. While shown as being separate for clarity of illustration, it will be appreciated that the fields of view of the eyes 302 and 304 may overlap, for example, as distance along the z-axis increases. In addition, while shown as flat for the ease of illustration, it will be appreciated that the contours of a depth plane may be curved in physical space, such that all features in a depth plane are in focus with the eye in a particular accommodated state. Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes.

Waveguide Stack Assembly

Figure 4:
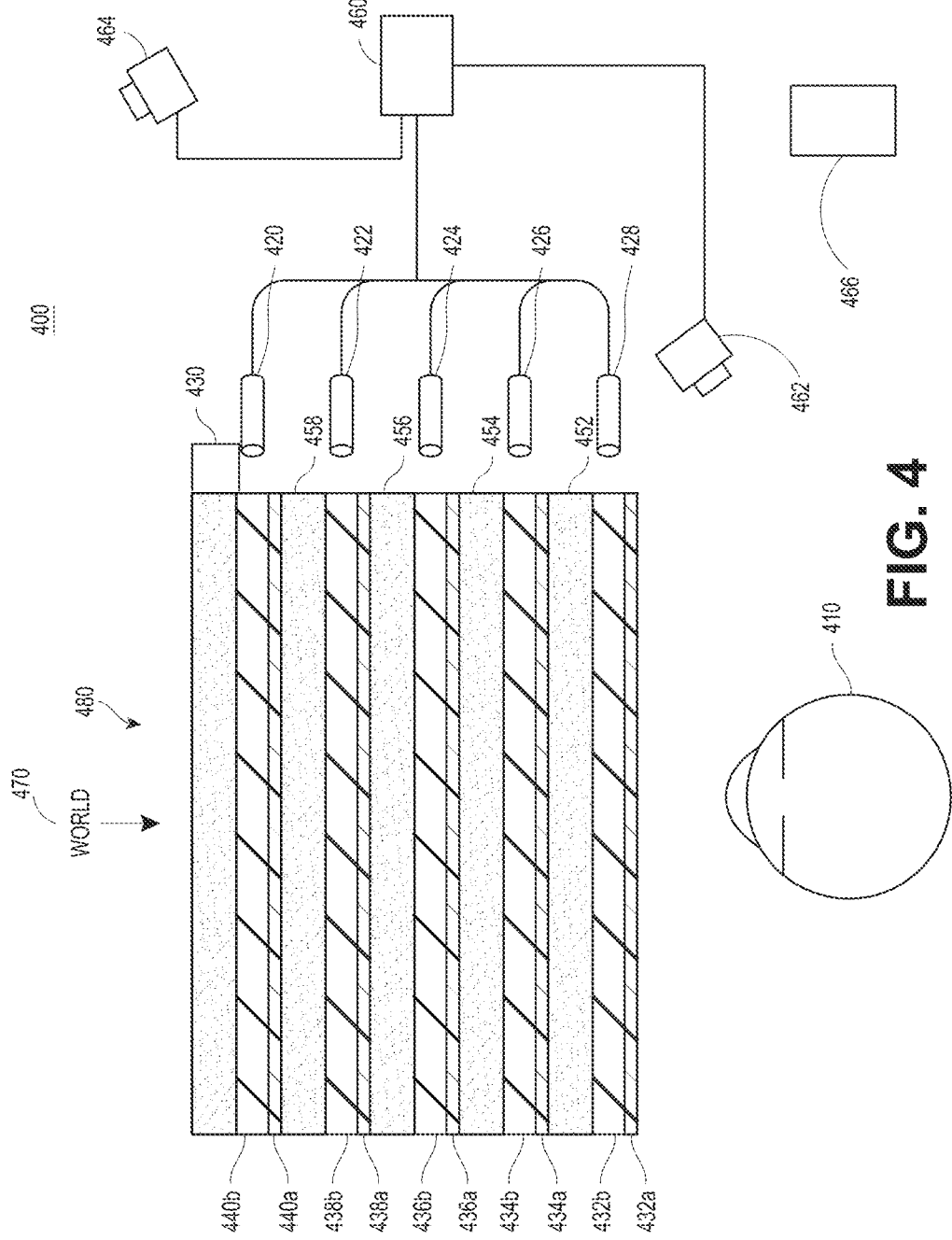
FIG. 4 schematically illustrates an example of a waveguide stack for outputting image information to a user.

FIG. 4 illustrates an example of a waveguide stack for outputting image information to a user. A wearable system 400 includes a stack of waveguides, or stacked waveguide assembly 480 that may be utilized to provide three-dimensional perception to the eye/brain using a plurality of waveguides 432b, 434b, 436b, 438b, 4400b. In some embodiments, the wearable system 400 may correspond to wearable system 200 of FIG. 2, with FIG. 4 schematically showing some parts of that wearable system 200 in greater detail. For example, in some embodiments, the waveguide assembly 480 may be integrated into the display 220 of FIG. 2.

With continued reference to FIG. 4, the waveguide assembly 480 may also include a plurality of features 458, 456, 454, 452 between the waveguides. In some embodiments, the features 458, 456, 454, 452 may be lenses. In other embodiments, the features 458, 456, 454, 452 may not be lenses. Rather, they may simply be spacers (e.g., cladding layers or structures for forming air gaps).

The waveguides 432b, 434b, 436b, 438b, 440b or the plurality of lenses 458, 456, 454, 452 may be configured to send image information to the eye with various levels of wavefront curvature or light ray divergence. Each waveguide level may be associated with a particular depth plane and may be configured to output image information corresponding to that depth plane. Image injection devices 420, 422, 424, 426, 428 may be utilized to inject image information into the waveguides 440b, 438b, 436b, 434b, 432b, each of which may be configured to distribute incoming light across each respective waveguide, for output toward the eye 410 (which may correspond to the eye 304 in FIG. 3). Light exits an output surface of the image injection devices 420, 422, 424, 426, 428 and is injected into a corresponding input edge of the waveguides 440b, 438b, 436b, 434b, 432b. In some embodiments, a single beam of light (e.g., a collimated beam) may be injected into each waveguide to output an entire field of cloned collimated beams that are directed toward the eye 410 at particular angles (and amounts of divergence) corresponding to the depth plane associated with a particular waveguide.

In some embodiments, the image injection devices 420, 422, 424, 426, 428 are discrete displays that each produce image information for injection into a corresponding waveguide 440b, 438b, 436b, 434b, 432b, respectively. In some other embodiments, the image injection devices 420, 422, 424, 426, 428 are the output ends of a single multiplexed display which may, e.g., pipe image information via one or more optical conduits (such as fiber optic cables) to each of the image injection devices 420, 422, 424, 426, 428.

A controller 460 controls the operation of the stacked waveguide assembly 480 and the image injection devices 420, 422, 424, 426, 428. The controller 460 includes programming (e.g., instructions in a non-transitory computer-readable medium) that regulates the timing and provision of image information to the waveguides 440b, 438b, 436b, 434b, 432b. In some embodiments, the controller 460 may be a single integral device, or a distributed system connected by wired or wireless communication channels. The controller 460 may be part of the processing modules 260 or 270 (illustrated in FIG. 2) in some embodiments.

The waveguides 440b, 438b, 436b, 434b, 432b may be configured to propagate light within each respective waveguide by total internal reflection (TIR). The waveguides 440b, 438b, 436b, 434b, 432b may each be planar or have another shape (e.g., curved), with major top and bottom surfaces and edges extending between those major top and bottom surfaces. In the illustrated configuration, the waveguides 440b, 438b, 436b, 434b, 432b may each include light extracting optical elements 440a, 438a, 436a, 434a, 432a that are configured to extract light out of a waveguide by redirecting the light, propagating within each respective waveguide, out of the waveguide to output image information to the eye 410. Extracted light may also be referred to as outcoupled light, and light extracting optical elements may also be referred to as outcoupling optical elements. An extracted beam of light is outputted by the waveguide at locations at which the light propagating in the waveguide strikes a light redirecting element. The light extracting optical elements (440a, 438a, 436a, 434a, 432a) may, for example, be reflective or diffractive optical features. While illustrated disposed at the bottom major surfaces of the waveguides 440b, 438b, 436b, 434b, 432b for ease of description and drawing clarity, in some embodiments, the light extracting optical elements 440a, 438a, 436a, 434a, 432a may be disposed at the top or bottom major surfaces, or may be disposed directly in the volume of the waveguides 440b, 438b, 436b, 434b, 432b. In some embodiments, the light extracting optical elements 440a, 438a, 436a, 434a, 432a may be formed in a layer of material that is attached to a transparent substrate to form the waveguides 440b, 438b, 436b, 434b, 432b. In some other embodiments, the waveguides 440b, 438b, 436b, 434b, 432b may be a monolithic piece of material and the light extracting optical elements 440a, 438a, 436a, 434a, 432a may be formed on a surface or in the interior of that piece of material.

With continued reference to FIG. 4, as discussed herein, each waveguide 440b, 438b, 436b, 434b, 432b is configured to output light to form an image corresponding to a particular depth plane. For example, the waveguide 432b nearest the eye may be configured to deliver collimated light, as injected into such waveguide 432b, to the eye 410. The collimated light may be representative of the optical infinity focal plane. The next waveguide up 434b may be configured to send out collimated light which passes through the first lens 452 (e.g., a negative lens) before it can reach the eye 410. First lens 452 may be configured to create a slight convex wavefront curvature so that the eye/brain interprets light coming from that next waveguide up 434b as coming from a first focal plane closer inward toward the eye 410 from optical infinity. Similarly, the third up waveguide 436b passes its output light through both the first lens 452 and second lens 454 before reaching the eye 410. The combined optical power of the first and second lenses 452 and 454 may be configured to create another incremental amount of wavefront curvature so that the eye/brain interprets light coming from the third waveguide 436*b* as coming from a second focal plane that is even closer inward toward the person from optical infinity than was light from the next waveguide up 434*b*.

The other waveguide layers (e.g., waveguides 438*b*, 440*b*) and lenses (e.g., lenses 456, 458) are similarly configured, with the highest waveguide 440*b* in the stack sending its output through all of the lenses between it and the eye for an aggregate focal power representative of the closest focal plane to the person. To compensate for the stack of lenses 458, 456, 454, 452 when viewing/interpreting light coming from the world 470 on the other side of the stacked waveguide assembly 480, a compensating lens layer 430 may be disposed at the top of the stack to compensate for the aggregate power of the lens stack 458, 456, 454, 452 below. Such a configuration provides as many perceived focal planes as there are available waveguide/lens pairings. Both the light extracting optical elements of the waveguides and the focusing aspects of the lenses may be static (e.g., not dynamic or electro-active). In some alternative embodiments, either or both may be dynamic using electro-active features.

With continued reference to FIG. 4, the light extracting optical elements 440*a*, 438*a*, 436*a*, 434*a*, 432*a* may be configured to both redirect light out of their respective waveguides and to output this light with the appropriate amount of divergence or collimation for a particular depth plane associated with the waveguide. As a result, waveguides having different associated depth planes may have different configurations of light extracting optical elements, which output light with a different amount of divergence depending on the associated depth plane. In some embodiments, as discussed herein, the light extracting optical elements 440*a*, 438*a*, 436*a*, 434*a*, 432*a* may be volumetric or surface features, which may be configured to output light at specific angles. For example, the light extracting optical elements 440*a*, 438*a*, 436*a*, 434*a*, 432*a* may be volume holograms, surface holograms, and/or diffraction gratings. Light extracting optical elements, such as diffraction gratings, are described in U.S. Patent Publication No. 2015/0178939, published Jun. 25, 2015, which is incorporated by reference herein in its entirety.

In some embodiments, the light extracting optical elements 440*a*, 438*a*, 436*a*, 434*a*, 432*a* are diffractive features that form a diffraction pattern, or "diffractive optical element" (also referred to herein as a "DOE"). Preferably, the DOE has a relatively low diffraction efficiency so that only a portion of the light of the beam is deflected away toward the eye 410 with each intersection of the DOE, while the rest continues to move through a waveguide via total internal reflection. The light carrying the image information can thus be divided into a number of related exit beams that exit the waveguide at a multiplicity of locations and the result is a fairly uniform pattern of exit emission toward the eye 304 for this particular collimated beam bouncing around within a waveguide.

In some embodiments, one or more DOEs may be switchable between "on" state in which they actively diffract, and "off" state in which they do not significantly diffract. For instance, a switchable DOE may comprise a layer of polymer dispersed liquid crystal, in which microdroplets comprise a diffraction pattern in a host medium, and the refractive index of the microdroplets can be switched to substantially match the refractive index of the host material (in which case the pattern does not appreciably diffract incident light) or the microdroplet can be switched to an index that does not match that of the host medium (in which case the pattern actively diffracts incident light).

In some embodiments, the number and distribution of depth planes or depth of field may be varied dynamically based on the pupil sizes or orientations of the eyes of the viewer. Depth of field may change inversely with a viewer's pupil size. As a result, as the sizes of the pupils of the viewer's eyes decrease, the depth of field increases such that one plane that is not discernible because the location of that plane is beyond the depth of focus of the eye may become discernible and appear more in focus with reduction of pupil size and commensurate with the increase in depth of field. Likewise, the number of spaced apart depth planes used to present different images to the viewer may be decreased with the decreased pupil size. For example, a viewer may not be able to clearly perceive the details of both a first depth plane and a second depth plane at one pupil size without adjusting the accommodation of the eye away from one depth plane and to the other depth plane. These two depth planes may, however, be sufficiently in focus at the same time to the user at another pupil size without changing accommodation.

In some embodiments, the display system may vary the number of waveguides receiving image information based upon determinations of pupil size or orientation, or upon receiving electrical signals indicative of particular pupil size or orientation. For example, if the user's eyes are unable to distinguish between two depth planes associated with two waveguides, then the controller 460 (which may be an embodiment of the local processing and data module 260) can be configured or programmed to cease providing image information to one of these waveguides. Advantageously, this may reduce the processing burden on the system, thereby increasing the responsiveness of the system. In embodiments in which the DOEs for a waveguide are switchable between the on and off states, the DOEs may be switched to the off state when the waveguide does receive image information.

In some embodiments, it may be desirable to have an exit beam meet the condition of having a diameter that is less than the diameter of the eye of a viewer. However, meeting this condition may be challenging in view of the variability in size of the viewer's pupils. In some embodiments, this condition is met over a wide range of pupil sizes by varying the size of the exit beam in response to determinations of the size of the viewer's pupil. For example, as the pupil size decreases, the size of the exit beam may also decrease. In some embodiments, the exit beam size may be varied using a variable aperture.

The wearable system 400 can include an outward-facing imaging system 464 (e.g., a digital camera) that images a portion of the world 470. This portion of the world 470 may be referred to as the field of view (FOV) of a world camera and the imaging system 464 is sometimes referred to as an FOV camera. The FOV of the world camera may or may not be the same as the FOV of a viewer 210 which encompasses a portion of the world 470 the viewer 210 perceives at a given time. For example, in some situations, the FOV of the world camera may be larger than the viewer 210 of the viewer 210 of the wearable system 400. The entire region available for viewing or imaging by a viewer may be referred to as the field of regard (FOR). The FOR may include 4π steradians of solid angle surrounding the wearable system 400 because the wearer can move his body, head, or eyes to perceive substantially any direction in space. In other contexts, the wearer's movements may be more constricted, and accordingly the wearer's FOR may subtend a smaller solid angle. Images obtained from the outward-facing imaging system 464 can be used to track gestures made by the user (e.g., hand or finger gestures), detect objects in the world 470 in front of the user, and so forth.

The wearable system 400 can include an audio sensor 232, e.g., a microphone, to capture ambient sound. As described above, in some embodiments, one or more other audio sensors can be positioned to provide stereo sound reception useful to the determination of location of a speech source. The audio sensor 232 can comprise a directional microphone, as another example, which can also provide such useful directional information as to where the audio source is located. The wearable system 400 can use information from both the outward-facing imaging system 464 and the audio sensor 230 in locating a source of speech, or to determine an active speaker at a particular moment in time, etc. For example, the wearable system 400 can use voice recognition alone or in combination with a reflected image of the speaker (e.g., as seen in a mirror) to determine the identity of the speaker. As another example, the wearable system 400 can determine a position of the speaker in an environment based on sound acquired from directional microphones. The wearable system 400 can parse the sound coming from the speaker's position with speech recognition algorithms to determine the content of the speech and use voice recognition techniques to determine the identity (e.g., name or other demographic information) of the speaker.

The wearable system 400 can also include an inward-facing imaging system 466 (e.g., a digital camera), which observes the movements of the user, such as the eye movements and the facial movements. The inward-facing imaging system 466 may be used to capture images of the eye 410 to determine the size and/or orientation of the pupil of the eye 304. The inward-facing imaging system 466 can be used to obtain images for use in determining the direction the user is looking (e.g., eye pose) or for biometric identification of the user (e.g., via iris identification). In some embodiments, at least one camera may be utilized for each eye, to separately determine the pupil size or eye pose of each eye independently, thereby allowing the presentation of image information to each eye to be dynamically tailored to that eye. In some other embodiments, the pupil diameter or orientation of only a single eye 410 (e.g., using only a single camera per pair of eyes) is determined and assumed to be similar for both eyes of the user. The images obtained by the inward-facing imaging system 466 may be analyzed to determine the user's eye pose or mood, which can be used by the wearable system 400 to decide which audio or visual content should be presented to the user. The wearable system 400 may also determine head pose (e.g., head position or head orientation) using sensors such as IMUs, accelerometers, gyroscopes, etc.

The wearable system 400 can include a user input device 466 by which the user can input commands to the controller 460 to interact with the wearable system 400. For example, the user input device 466 can include a trackpad, a touch-screen, a joystick, a multiple degree-of-freedom (DOF) controller, a capacitive sensing device, a game controller, a keyboard, a mouse, a directional pad (D-pad), a wand, a haptic device, a totem (e.g., functioning as a virtual user input device), and so forth. A multi-DOF controller can sense user input in some or all possible translations (e.g., left/right, forward/backward, or up/down) or rotations (e.g., yaw, pitch, or roll) of the controller. A multi-DOF controller which supports the translation movements may be referred to as a 3DOF while a multi-DOF controller which supports the translations and rotations may be referred to as 6DOF. In some cases, the user may use a finger (e.g., a thumb) to press or swipe on a touch-sensitive input device to provide input to the wearable system 400 (e.g., to provide user input to a user interface provided by the wearable system 400). The user input device 466 may be held by the user's hand during the use of the wearable system 400. The user input device 466 can be in wired or wireless communication with the wearable system 400.

Figure 5:
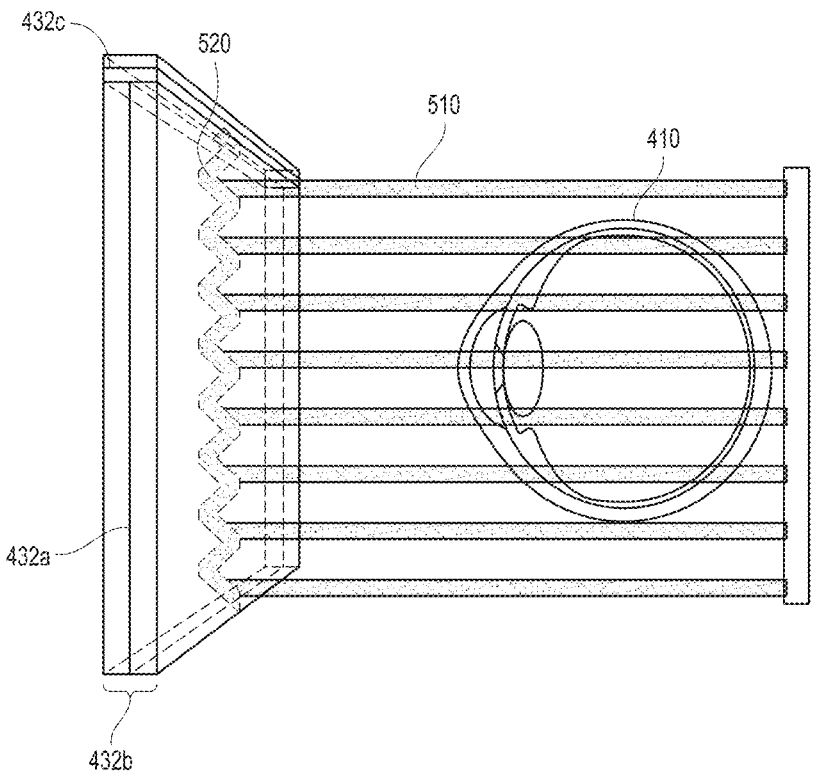
FIG. 5 shows example exit beams that may be outputted by a waveguide.

FIG. 5 shows an example of exit beams outputted by a waveguide. One waveguide is illustrated, but it will be appreciated that other waveguides in the waveguide assembly 480 may function similarly, where the waveguide assembly 480 includes multiple waveguides. Light 520 is injected into the waveguide 432b at the input edge 432c of the waveguide 432b and propagates within the waveguide 432b by TIR. At points where the light 520 impinges on the DOE 432a, a portion of the light exits the waveguide as exit beams 510. The exit beams 510 are illustrated as substantially parallel but they may also be redirected to propagate to the eye 410 at an angle (e.g., forming divergent exit beams), depending on the depth plane associated with the waveguide 432b. It will be appreciated that substantially parallel exit beams may be indicative of a waveguide with light extracting optical elements that outcouple light to form images that appear to be set on a depth plane at a large distance (e.g., optical infinity) from the eye 410. Other waveguides or other sets of light extracting optical elements may output an exit beam pattern that is more divergent, which would require the eye 410 to accommodate to a closer distance to bring it into focus on the retina and would be interpreted by the brain as light from a distance closer to the eye 410 than optical infinity.

Figure 6:
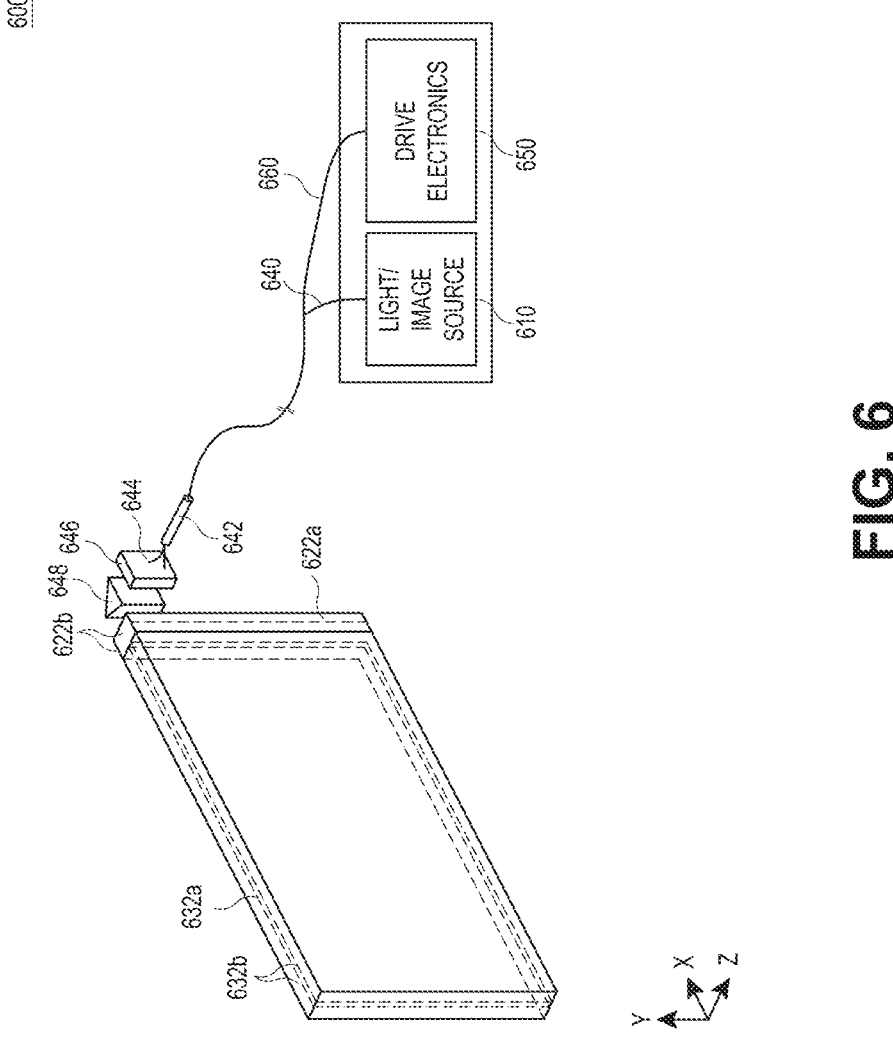
FIG. 6 is a schematic diagram showing an optical system including a waveguide apparatus, an optical coupler subsystem to optically couple light to or from the waveguide apparatus, and a control subsystem, used in the generation of a multi-focal volumetric display, image, or light field.

FIG. 6 is a schematic diagram showing an optical system including a waveguide apparatus, an optical coupler subsystem to optically couple light to or from the waveguide apparatus, and a control subsystem, used in the generation of a multi-focal volumetric display, image, or light field. The optical system can include a waveguide apparatus, an optical coupler subsystem to optically couple light to or from the waveguide apparatus, and a control subsystem. The optical system can be used to generate a multi-focal volumetric, image, or light field. The optical system can include one or more primary planar waveguides 632a (only one is shown in FIG. 6) and one or more DOEs 632b associated with each of at least some of the primary waveguides 632a. The planar waveguides 632b can be similar to the waveguides 432b, 434b, 436b, 438b, 440b discussed with reference to FIG. 4. The optical system may employ a distribution waveguide apparatus to relay light along a first axis (vertical or Y-axis in view of FIG. 6), and expand the light's effective exit pupil along the first axis (e.g., Y-axis). The distribution waveguide apparatus may, for example, include a distribution planar waveguide 622b and at least one DOE 622a (illustrated by double dash-dot line) associated with the distribution planar waveguide 622b. The distribution planar waveguide 622b may be similar or identical in at least some respects to the primary planar waveguide 632b, having a different orientation therefrom. Likewise, at least one DOE 622a may be similar to or identical in at least some respects to the DOE 632a. For example, the distribution planar waveguide 622b or DOE 622a may be comprised of the same materials as the primary planar waveguide 632b or DOE 632a, respectively. Embodiments of the optical display system 600 shown in FIG. 6 can be integrated into the wearable system 200 shown in FIG. 2.

The relayed and exit-pupil expanded light may be optically coupled from the distribution waveguide apparatus into the one or more primary planar waveguides 632b. The primary planar waveguide 632b can relay light along a second axis, preferably orthogonal to first axis (e.g., horizontal or X-axis in view of FIG. 6). Notably, the second axis can be a non-orthogonal axis to the first axis. The primary planar waveguide 632b expands the light's effective exit pupil along that second axis (e.g., X-axis). For example, the distribution planar waveguide 622b can relay and expand light along the vertical or Y-axis, and pass that light to the primary planar waveguide 632b which can relay and expand light along the horizontal or X-axis.

The optical system may include one or more sources of colored light (e.g., red, green, and blue laser light) 610 which may be optically coupled into a proximal end of a single mode optical fiber 640. A distal end of the optical fiber 640 may be threaded or received through a hollow tube 642 of piezoelectric material. The distal end protrudes from the tube 642 as fixed-free flexible cantilever 644. The piezoelectric tube 642 can be associated with four quadrant electrodes (not illustrated). The electrodes may, for example, be plated on the outside, outer surface or outer periphery or diameter of the tube 642. A core electrode (not illustrated) may also be located in a core, center, inner periphery or inner diameter of the tube 642.

Drive electronics 650, for example electrically coupled via wires 660, drive opposing pairs of electrodes to bend the piezoelectric tube 642 in two axes independently. The protruding distal tip of the optical fiber 644 has mechanical modes of resonance. The frequencies of resonance can depend upon a diameter, length, and material properties of the optical fiber 644. By vibrating the piezoelectric tube 642 near a first mode of mechanical resonance of the fiber cantilever 644, the fiber cantilever 644 can be caused to vibrate, and can sweep through large deflections.

By stimulating resonant vibration in two axes, the tip of the fiber cantilever 644 is scanned biaxially in an area filling two-dimensional (2D) scan. By modulating an intensity of light source(s) 610 in synchrony with the scan of the fiber cantilever 644, light emerging from the fiber cantilever 644 can form an image. Descriptions of such a set up are provided in U.S. Patent Publication No. 2014/0003762, which is incorporated by reference herein in its entirety.

A component of an optical coupler subsystem can collimate the light emerging from the scanning fiber cantilever 644. The collimated light can be reflected by mirrored surface 648 into the narrow distribution planar waveguide 622b which contains the at least one diffractive optical element (DOE) 622a. The collimated light can propagate vertically (relative to the view of FIG. 6) along the distribution planar waveguide 622b by TIR, and in doing so repeatedly intersects with the DOE 622a. The DOE 622a preferably has a low diffraction efficiency. This can cause a fraction (e.g., 10%) of the light to be diffracted toward an edge of the larger primary planar waveguide 632b at each point of intersection with the DOE 622a, and a fraction of the light to continue on its original trajectory down the length of the distribution planar waveguide 622b via TIR.

At each point of intersection with the DOE 622a, additional light can be diffracted toward the entrance of the primary waveguide 632b. By dividing the incoming light into multiple outcoupled sets, the exit pupil of the light can be expanded vertically by the DOE 622a in the distribution planar waveguide 622b. This vertically expanded light coupled out of distribution planar waveguide 622b can enter the edge of the primary planar waveguide 632b.

Light entering primary waveguide 632b can propagate horizontally (relative to the view of FIG. 6) along the primary waveguide 632b via TIR. As the light intersects with DOE 632a at multiple points as it propagates horizontally along at least a portion of the length of the primary waveguide 632b via TIR. The DOE 632a may advantageously be designed or configured to have a phase profile that is a summation of a linear diffraction pattern and a radially symmetric diffractive pattern, to produce both deflection and focusing of the light. The DOE 632a may advantageously have a low diffraction efficiency (e.g., 10%), so that only a portion of the light of the beam is deflected toward the eye of the view with each intersection of the DOE 632a while the rest of the light continues to propagate through the primary waveguide 632b via TIR.

At each point of intersection between the propagating light and the DOE 632a, a fraction of the light is diffracted toward the adjacent face of the primary waveguide 632b allowing the light to escape the TIR, and emerge from the face of the primary waveguide 632b. In some embodiments, the radially symmetric diffraction pattern of the DOE 632a additionally imparts a focus level to the diffracted light, both shaping the light wavefront (e.g., imparting a curvature) of the individual beam as well as steering the beam at an angle that matches the designed focus level.

Accordingly, these different pathways can cause the light to be coupled out of the primary planar waveguide 632b by a multiplicity of DOEs 632a at different angles, focus levels, or yielding different fill patterns at the exit pupil. Different fill patterns at the exit pupil can be beneficially used to create a light field display with multiple depth planes. Each layer in the waveguide assembly or a set of layers (e.g., 3 layers) in the stack may be employed to generate a respective color (e.g., red, blue, green). Thus, for example, a first set of three adjacent layers may be employed to respectively produce red, blue and green light at a first focal depth. A second set of three adjacent layers may be employed to respectively produce red, blue and green light at a second focal depth. Multiple sets may be employed to generate a full 3D or 4D color image light field with various focal depths.

Other Components of the Wearable System

In many implementations, the wearable system may include other components in addition or in alternative to the components of the wearable system described above. The wearable system may, for example, include one or more haptic devices or components. The haptic devices or components may be operable to provide a tactile sensation to a user. For example, the haptic devices or components may provide a tactile sensation of pressure or texture when touching virtual content (e.g., virtual objects, virtual tools, other virtual constructs). The tactile sensation may replicate a feel of a physical object which a virtual object represents, or may replicate a feel of an imagined object or character (e.g., a dragon) which the virtual content represents. In some implementations, haptic devices or components may be worn by the user (e.g., a user wearable glove). In some implementations, haptic devices or components may be held by the user.

The wearable system may, for example, include one or more physical objects which are manipulable by the user to allow input or interaction with the wearable system. These physical objects may be referred to herein as totems. Some totems may take the form of inanimate objects, such as for example, a piece of metal or plastic, a wall, a surface of table. In certain implementations, the totems may not actually have any physical input structures (e.g., keys, triggers, joystick, trackball, rocker switch). Instead, the totem may simply provide a physical surface, and the wearable system may render a user interface so as to appear to a user to be on one or more surfaces of the totem. For example, the wearable system may render an image of a computer keyboard and trackpad to appear to reside on one or more surfaces of a totem. For example, the wearable system may render a virtual computer keyboard and virtual trackpad to appear on a surface of a thin rectangular plate of aluminum which serves as a totem. The rectangular plate does not itself have any physical keys or trackpad or sensors. However, the wearable system may detect user manipulation or interaction or touches with the rectangular plate as selections or inputs made via the virtual keyboard or virtual trackpad. The user input device 466 (shown in FIG. 4) may be an embodiment of a totem, which may include a trackpad, a touchpad, a trigger, a joystick, a trackball, a rocker or virtual switch, a mouse, a keyboard, a multi-degree-of-freedom controller, or another physical input device. A user may use the totem, alone or in combination with poses, to interact with the wearable system or other users.

Examples of haptic devices and totems usable with the wearable devices, HMD, and display systems of the present disclosure are described in U.S. Patent Publication No. 2015/0016777, which is incorporated by reference herein in its entirety.

Example Wearable Systems, Environments, and Interfaces

A wearable system may employ various mapping related techniques in order to achieve high depth of field in the rendered light fields. In mapping out the virtual world, it is advantageous to know all the features and points in the real world to accurately portray virtual objects in relation to the real world. To this end, FOV images captured from users of the wearable system can be added to a world model by including new pictures that convey information about various points and features of the real world. For example, the wearable system can collect a set of map points (such as 2D points or 3D points) and find new map points to render a more accurate version of the world model. The world model of a first user can be communicated (e.g., over a network such as a cloud network) to a second user so that the second user can experience the world surrounding the first user.

Figure 7:
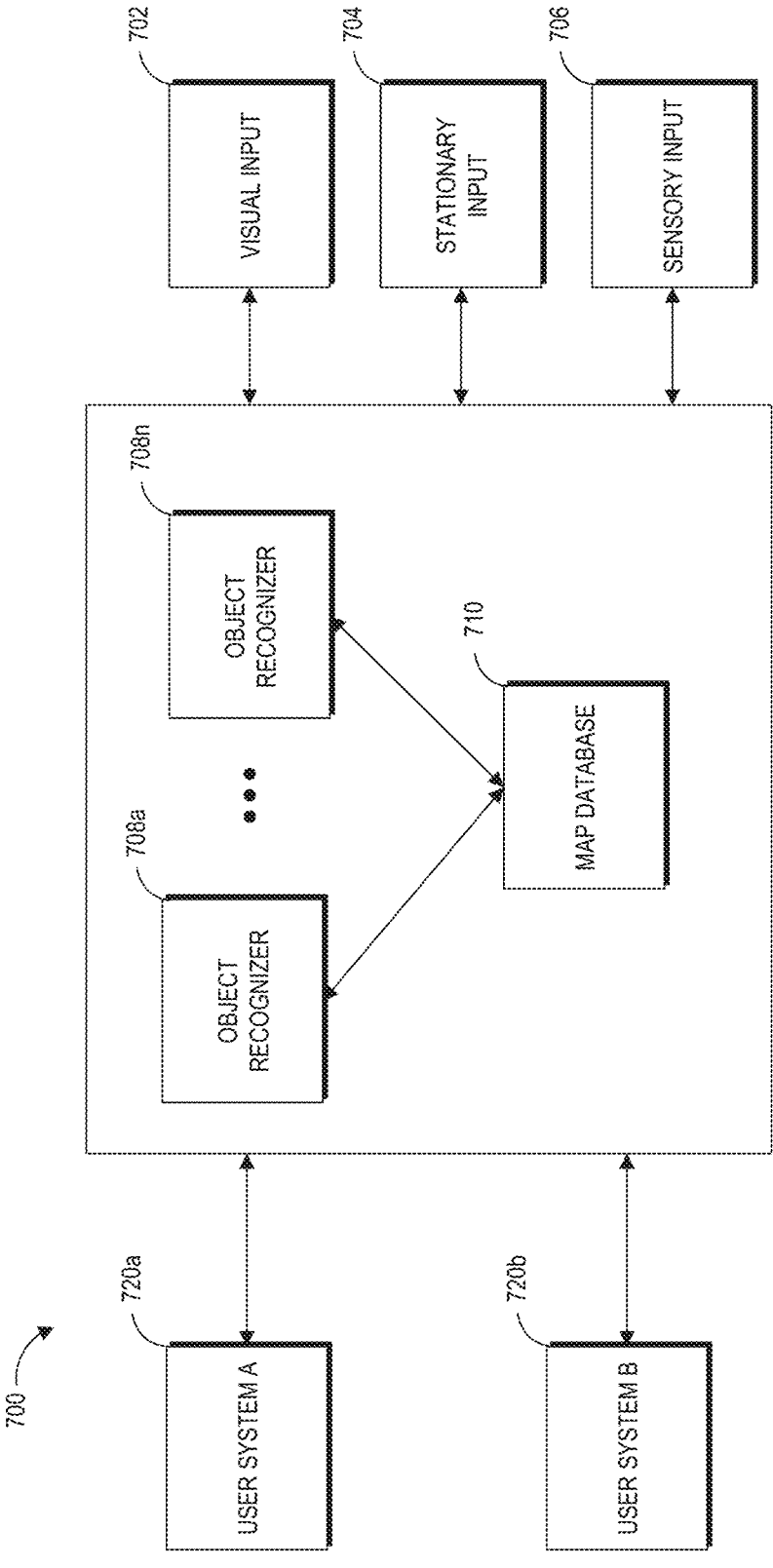
FIG. 7 is a block diagram of an example of a wearable system.

FIG. 7 is a block diagram of an example of an MR environment 700. The MR environment 700 may be configured to receive input (e.g., visual input 702 from the user's wearable system, stationary input 704 such as room cameras, sensory input 706 from various sensors, gestures, totems, eye tracking, user input from the user input device 466 etc.) from one or more user wearable systems (e.g., wearable system 200 or display system 220) or stationary room systems (e.g., room cameras, etc.). The wearable systems can use various sensors (e.g., accelerometers, gyroscopes, temperature sensors, movement sensors, depth sensors, GPS sensors, inward-facing imaging system, outward-facing imaging system, etc.) to determine the location and various other attributes of the environment of the user. This information may further be supplemented with information from stationary cameras in the room that may provide images or various cues from a different point of view. The image data acquired by the cameras (such as the room cameras and/or the cameras of the outward-facing imaging system) may be reduced to a set of mapping points.

One or more object recognizers 708 can crawl through the received data (e.g., the collection of points) and recognize or map points, tag images, attach semantic information to objects with the help of a map database 710. The map database 710 may comprise various points collected over time and their corresponding objects. The various devices and the map database can be connected to each other through a network (e.g., LAN, WAN, etc.) to access the cloud.

Based on this information and collection of points in the map database, the object recognizers 708a to 708n may recognize objects in an environment. For example, the object recognizers can recognize faces, persons, windows, walls, user input devices, televisions, documents (e.g., travel tickets, driver's license, passport), other objects in the user's environment, etc. One or more object recognizers may be specialized for object with certain characteristics. For example, the object recognizer 708a may be used to recognizer faces, while another object recognizer may be used recognize documents.

The object recognitions may be performed using a variety of computer vision techniques. For example, the wearable system can analyze the images acquired by the outward-facing imaging system 464 (shown in FIG. 4) to perform scene reconstruction, event detection, video tracking, object recognition (e.g., persons or documents), object pose estimation, facial recognition (e.g., from a person in the environment or an image on a document), learning, indexing, motion estimation, or image analysis (e.g., identifying indicia within documents such as photos, signatures, identification information, travel information, etc.), and so forth. One or more computer vision algorithms may be used to perform these tasks. Non-limiting examples of computer vision algorithms include: Scale-invariant feature transform (SIFT), speeded up robust features (SURF), oriented FAST and rotated BRIEF (ORB), binary robust invariant scalable keypoints (BRISK), fast retina keypoint (FREAK), Viola-Jones algorithm, Eigenfaces approach, Lucas-Kanade algorithm, Horn-Schunk algorithm, Mean-shift algorithm, visual simultaneous location and mapping (vSLAM) techniques, a sequential Bayesian estimator (e.g., Kalman filter, extended Kalman filter, etc.), bundle adjustment, Adaptive thresholding (and other thresholding techniques), Iterative Closest Point (ICP), Semi Global Matching (SGM), Semi Global Block Matching (SGBM), Feature Point Histograms, various machine learning algorithms (such as e.g., support vector machine, k-nearest neighbors algorithm, Naive Bayes, neural network (including convolutional or deep neural networks), or other supervised/unsupervised models, etc.), and so forth.

The object recognitions can additionally or alternatively be performed by a variety of machine learning algorithms. Once trained, the machine learning algorithm can be stored by the HMD. Some examples of machine learning algorithms can include supervised or non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, a-priori algorithms), artificial neural network algorithms (such as, for example, Perceptron), deep learning algorithms (such as, for example, Deep Boltzmann Machine, or deep neural network), dimensionality reduction algorithms (such as, for example, Principal Component Analysis), ensemble algorithms (such as, for example, Stacked Generalization), and/or other machine learning algorithms. In some embodiments, individual models can be customized for individual data sets. For example, the wearable device can generate or store a base model. The base model may be used as a starting point to generate additional models specific to a data type (e.g., a particular user in the telepresence session), a data set (e.g., a set of additional images obtained of the user in the telepresence session), conditional situations, or other variations. In some embodiments, the wearable HMD can be configured to utilize a plurality of techniques to generate models for analysis of the aggregated data. Other techniques may include using pre-defined thresholds or data values.

Based on this information and collection of points in the map database, the object recognizers 708a to 708n may recognize objects and supplement objects with semantic information to give life to the objects. For example, if the object recognizer recognizes a set of points to be a door, the system may attach some semantic information (e.g., the door has a hinge and has a 90 degree movement about the hinge). If the object recognizer recognizes a set of points to be a mirror, the system may attach semantic information that the mirror has a reflective surface that can reflect images of objects in the room. The semantic information can include affordances of the objects as described herein. For example, the semantic information may include a normal of the object. The system can assign a vector whose direction indicates the normal of the object. Over time the map database grows as the system (which may reside locally or may be accessible through a wireless network) accumulates more data from the world. Once the objects are recognized, the information may be transmitted to one or more wearable systems. For example, the MR environment 700 may include information about a scene happening in California. The environment 700 may be transmitted to one or more users in New York. Based on data received from an FOV camera and other inputs, the object recognizers and other software components can map the points collected from the various images, recognize objects etc., such that the scene may be accurately "passed over" to a second user, who may be in a different part of the world. The environment 700 may also use a topological map for localization purposes.

FIG. 8 is a process flow diagram of an example of a method 800 of rendering virtual content in relation to recognized objects. The method 800 describes how a virtual scene may be presented to a user of the wearable system. The user may be geographically remote from the scene. For example, the user may be in New York, but may want to view a scene that is presently going on in California, or may want to go on a walk with a friend who resides in California.

At block 810, the wearable system may receive input from the user and other users regarding the environment of the user. This may be achieved through various input devices, and knowledge already possessed in the map database. The user's FOV camera, sensors, GPS, eye tracking, etc., convey information to the system at block 810. The system may determine sparse points based on this information at block 820. The sparse points may be used in determining pose data (e.g., head pose, eye pose, body pose, or hand gestures) that can be used in displaying and understanding the orientation and position of various objects in the user's surroundings. The object recognizers 708a-708n may crawl through these collected points and recognize one or more objects using a map database at block 830. This information may then be conveyed to the user's individual wearable system at block 840, and the desired virtual scene may be accordingly displayed to the user at block 850. For example, the desired virtual scene (e.g., user in CA) may be displayed at the appropriate orientation, position, etc., in relation to the various objects and other surroundings of the user in New York.

Figure 9:
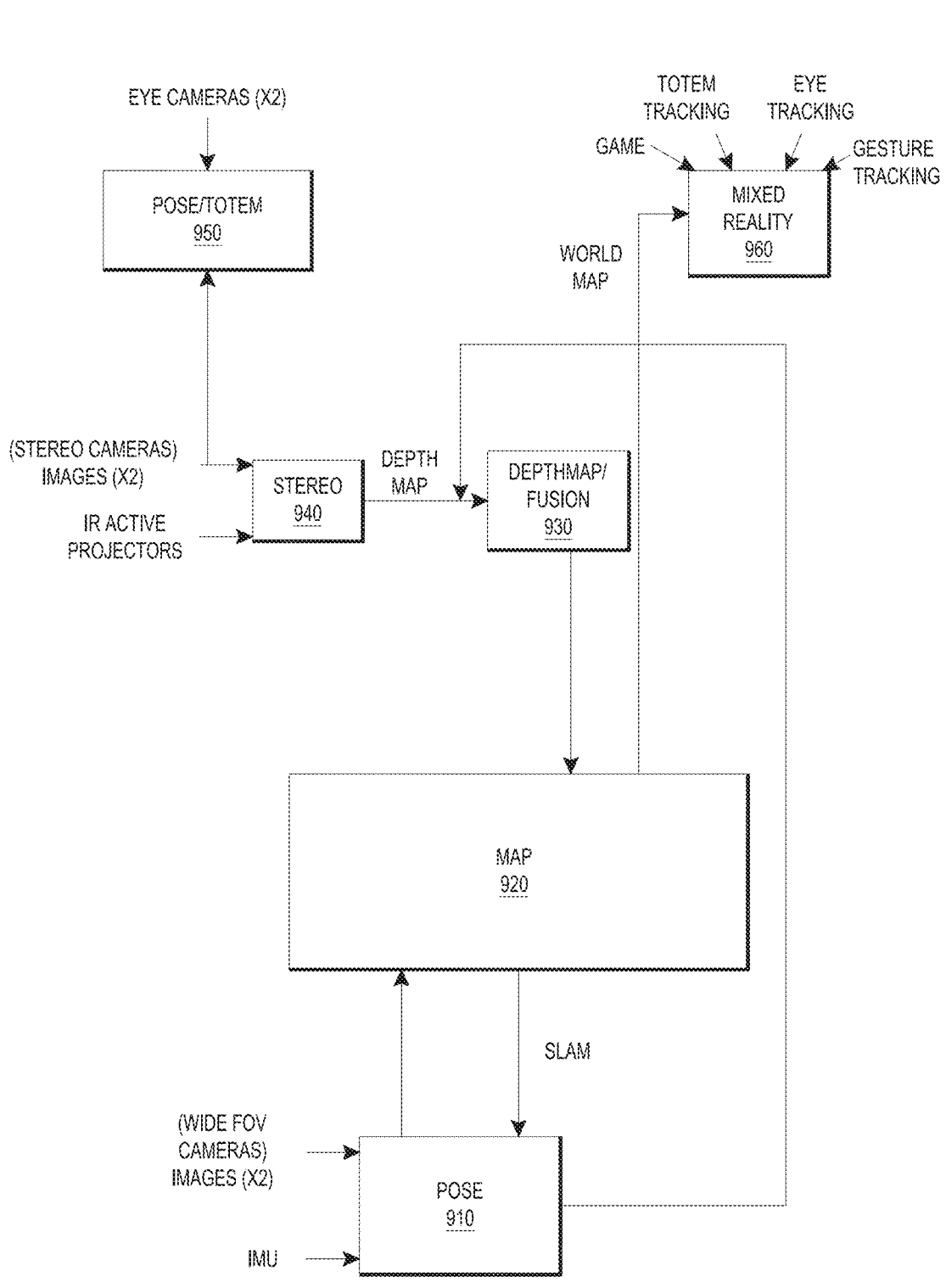
FIG. 9 is a block diagram of another example of a wearable system.

FIG. 9 is a block diagram of another example of a wearable system. In this example, the wearable system 900 comprises a map 920, which may include the map database 710 containing map data for the world. The map may partly reside locally on the wearable system, and may partly reside at networked storage locations accessible by wired or wireless network (e.g., in a cloud system). A pose process 910 may be executed on the wearable computing architecture (e.g., processing module 260 or controller 460) and utilize data from the map 920 to determine position and orientation of the wearable computing hardware or user. Pose data may be computed from data collected on the fly as the user is experiencing the system and operating in the world. The data may comprise images, data from sensors (such as inertial measurement units, which generally comprise accelerometer and gyroscope components) and surface information pertinent to objects in the real or virtual environment.

A sparse point representation may be the output of a simultaneous localization and mapping (e.g., SLAM or vSLAM, referring to a configuration wherein the input is images/visual only) process. The system can be configured to not only find out where in the world the various components are, but what the world is made of. Pose may be a building block that achieves many goals, including populating the map and using the data from the map.

In one embodiment, a sparse point position may not be completely adequate on its own, and further information may be needed to produce a multifocal AR, VR, or MR experience. Dense representations, generally referring to depth map information, may be utilized to fill this gap at least in part. Such information may be computed from a process referred to as Stereo 940, wherein depth information is determined using a technique such as triangulation or time-of-flight sensing. Image information and active patterns (such as infrared patterns created using active projectors), images acquired from image cameras, or hand gestures/totem 950 may serve as input to the Stereo process 940. A significant amount of depth map information may be fused together, and some of this may be summarized with a surface representation. For example, mathematically definable surfaces may be efficient (e.g., relative to a large point cloud) and digestible inputs to other processing devices like game engines. Thus, the output of the stereo process (e.g., a depth map) 940 may be combined in the fusion process 930. Pose 910 may be an input to this fusion process 930 as well, and the output of fusion 930 becomes an input to populating the map process 920. Sub-surfaces may connect with each other, such as in topographical mapping, to form larger surfaces, and the map becomes a large hybrid of points and surfaces.

To resolve various aspects in a mixed reality process 960, various inputs may be utilized. For example, in the embodiment depicted in FIG. 9, Game parameters may be inputs to determine that the user of the system is playing a monster battling game with one or more monsters at various locations, monsters dying or running away under various conditions (such as if the user shoots the monster), walls or other objects at various locations, and the like. The world map may include information regarding the location of the objects or semantic information of the objects and the world map can be another valuable input to mixed reality. Pose relative to the world becomes an input as well and plays a key role to almost any interactive system.

Controls or inputs from the user are another input to the wearable system 900. As described herein, user inputs can include visual input, gestures, totems, audio input, sensory input, etc. In order to move around or play a game, for example, the user may need to instruct the wearable system 900 regarding what he or she wants to do. Beyond just moving oneself in space, there are various forms of user controls that may be utilized. In one embodiment, a totem (e.g. a user input device), or an object such as a toy gun may be held by the user and tracked by the system. The system preferably will be configured to know that the user is holding the item and understand what kind of interaction the user is having with the item (e.g., if the totem or object is a gun, the system may be configured to understand location and orientation, as well as whether the user is clicking a trigger or other sensed button or element which may be equipped with a sensor, such as an IMU, which may assist in determining what is going on, even when such activity is not within the field of view of any of the cameras.)

Hand gesture tracking or recognition may also provide input information. The wearable system 900 may be configured to track and interpret hand gestures for button presses, for gesturing left or right, stop, grab, hold, etc. For example, in one configuration, the user may want to flip through emails or a calendar in a non-gaming environment, or do a "fist bump" with another person or player. The wearable system 900 may be configured to leverage a minimum amount of hand gesture, which may or may not be dynamic. For example, the gestures may be simple static gestures like open hand for stop, thumbs up for ok, thumbs down for not ok; or a hand flip right, or left, or up/down for directional commands.

Eye tracking is another input (e.g., tracking where the user is looking to control the display technology to render at a specific depth or range). In one embodiment, vergence of the eyes may be determined using triangulation, and then using a vergence/accommodation model developed for that particular person, accommodation may be determined. Eye tracking can be performed by the eye camera(s) to determine eye gaze (e.g., direction or orientation of one or both eyes). Other techniques can be used for eye tracking such as, e.g., measurement of electrical potentials by electrodes placed near the eye(s) (e.g., electrooculography).

Speech tracking can be another input can be used alone or in combination with other inputs (e.g., totem tracking, eye tracking, gesture tracking, etc.). Speech tracking may include speech recognition, voice recognition, alone or in combination. The system 900 can include an audio sensor (e.g., a microphone) that receives an audio stream from the environment. The system 900 can incorporate voice recognition technology to determine who is speaking (e.g., whether the speech is from the wearer of the ARD or another person or voice (e.g., a recorded voice transmitted by a loudspeaker in the environment)) as well as speech recognition technology to determine what is being said. The local data & processing module 260 or the remote processing module 270 can process the audio data from the microphone (or audio data in another stream such as, e.g., a video stream being watched by the user) to identify content of the speech by applying various speech recognition algorithms, such as, e.g., hidden Markov models, dynamic time warping (DTW)-based speech recognitions, neural networks, deep learning algorithms such as deep feedforward and recurrent neural networks, end-to-end automatic speech recognitions, machine learning algorithms (described with reference to FIG. 7), or other algorithms that uses acoustic modeling or language modeling, etc.

The local data & processing module 260 or the remote processing module 270 can also apply voice recognition algorithms which can identify the identity of the speaker, such as whether the speaker is the user 210 of the wearable system 900 or another person with whom the user is conversing. Some example voice recognition algorithms can include frequency estimation, hidden Markov models, Gaussian mixture models, pattern matching algorithms, neural networks, matrix representation, Vector Quantization, speaker diarisation, decision trees, and dynamic time warping (DTW) technique. Voice recognition techniques can also include anti-speaker techniques, such as cohort models, and world models. Spectral features may be used in representing speaker characteristics. The local data & processing module or the remote data processing module 270 can use various machine learning algorithms described with reference to FIG. 7 to perform the voice recognition.

With regard to the camera systems, the example wearable system 900 shown in FIG. 9 can include three pairs of cameras: a relative wide FOV or passive SLAM pair of cameras arranged to the sides of the user's face, a different pair of cameras oriented in front of the user to handle the stereo imaging process 940 and also to capture hand gestures and totem/object tracking in front of the user's face. The FOV cameras and the pair of cameras for the stereo process 940 may be a part of the outward-facing imaging system 464 (shown in FIG. 4). The wearable system 900 can include eye tracking cameras (which may be a part of an inward-facing imaging system 462 shown in FIG. 4) oriented toward the eyes of the user in order to triangulate eye vectors and other information. The wearable system 900 may also comprise one or more textured light projectors (such as infrared (IR) projectors) to inject texture into a scene.

Figure 10:
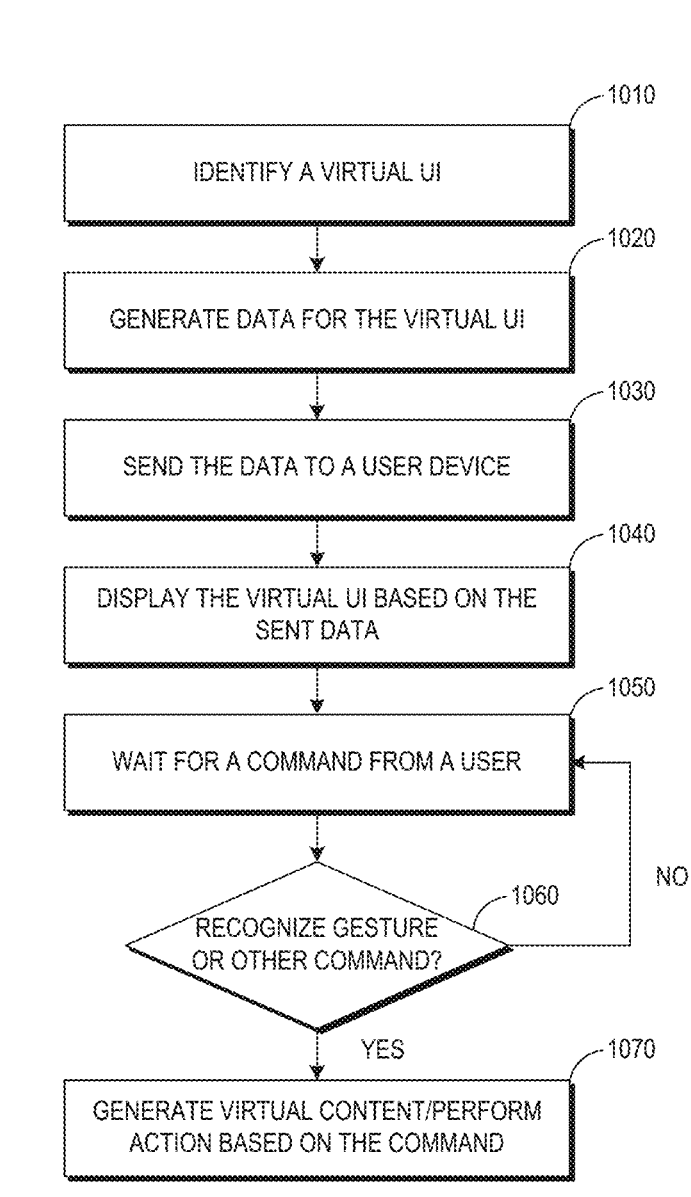
FIG. 10 is a process flow diagram of an example of a method for interacting with a virtual user interface.

FIG. 10 is a process flow diagram of an example of a method 1000 for interacting with a virtual user interface. The method 1000 may be performed by the wearable system described herein. The method 1000 may perform the method 1000 in a telepresence session.

At block 1010, the wearable system may identify a particular UI. The type of UI may be predetermined by the user. The wearable system may identify that a particular UI needs to be populated based on a user input (e.g., gesture, visual data, audio data, sensory data, direct command, etc.). The UI may be specific to a telepresence session. At block 1020, the wearable system may generate data for the virtual UI. For example, data associated with the confines, general structure, shape of the UI etc., may be generated. In addition, the wearable system may determine map coordinates of the user's physical location so that the wearable system can display the UI in relation to the user's physical location. For example, if the UI is body centric, the wearable system may determine the coordinates of the user's physical stance, head pose, or eye pose such that a ring UI can be displayed around the user or a planar UI can be displayed on a wall or in front of the user. In the telepresence context, the UI may be displayed as if the UI were surrounding user to create a tangible sense of another user's presence in the environment (e.g., the UI can display virtual avatars of the participants around the user). If the UI is hand centric, the map coordinates of the user's hands may be determined. These map points may be derived through data received through the FOV cameras, sensory input, or any other type of collected data.

At block 1030, the wearable system may send the data to the display from the cloud or the data may be sent from a local database to the display components. At block 1040, the UI is displayed to the user based on the sent data. For example, a light field display can project the virtual UI into one or both of the user's eyes. Once the virtual UI has been created, the wearable system may simply wait for a command from the user to generate more virtual content on the virtual UI at block 1050. For example, the UI may be a body centric ring around the user's body or the body of a person in the user's environment (e.g., a traveler). The wearable system may then wait for the command (a gesture, a head or eye movement, voice command, input from a user input device, etc.), and if it is recognized (block 1060), virtual content associated with the command may be displayed to the user (block 1070).

Examples of A Wearable Device and Imaging a User's Face

Figure 11:
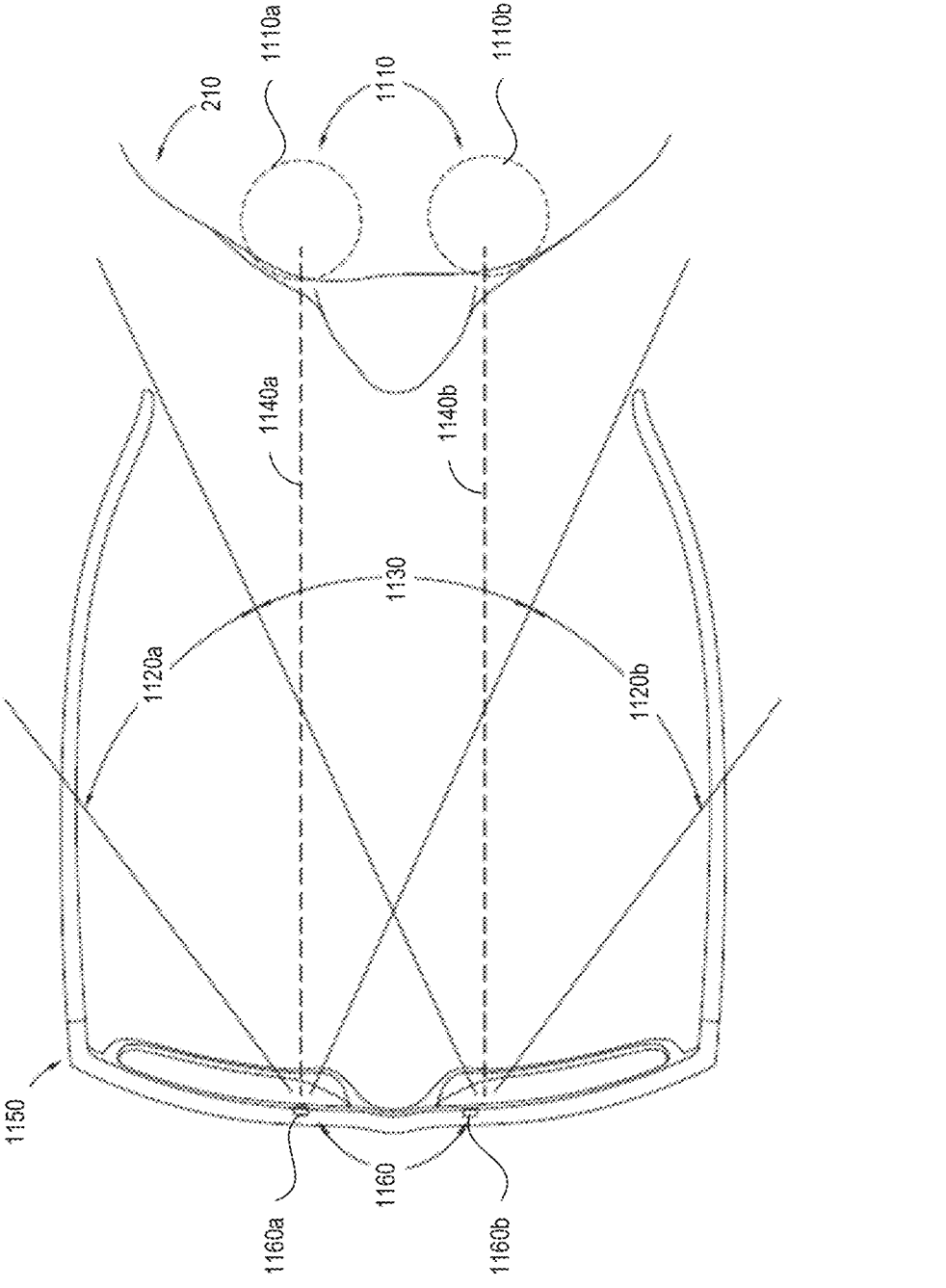
FIG. 11 illustrates an example wearable device which can acquire images of the user's face.

FIG. 11 illustrates an example wearable device which can acquire images of the user's face. The wearable device 1150 can be an example head-mounted device (HMD) as described with reference to FIG. 2. The wearable device 1150 may be a spatial augmented reality (SAR) device which may include a head-mounted display for rendering virtual objects from the perspectives of the user's eyes. The images acquired by the wearable device can include still images, animations, individual frames from a video, or a video.

The wearable device 1150 can include an imaging system 1160 which can be configured to image the user's 210 face. The imaging system 1160 may be an example of the inward-facing imaging system 462 shown in FIG. 4. For example, the imaging system 1160 may include sensors such as eye cameras (eye camera 1160*a* and eye camera 1160*b*) configured to image the periocular region of the user's eyes 1110 while the user 210 is wearing the wearable device 1150. The periocular region can include one or more periocular features such as, for example, an eye, an eye socket, an eyebrow, a nose, a cheek, a forehead, etc. In this example, the eye 1110*b* can correspond to the eye 302 and the eye 1110*a* can correspond to the eye 304 shown in FIG. 3. The wearable device 1150 can also include other types of sensors such as, e.g., inertial measurement units, pressure sensors, proximity sensors, etc. One or more of these sensors can be disposed on the frame of the wearable device 1150 (e.g., on the nose bridge, on one or both ear stem/temple, on the band that holds the head-mounted display to the user, etc.). Data acquired by the sensors may be used to determine the relative position between the wearable device 1150 and user's face and/or whether the user is wearing the wearable device 1150.

Each eye camera may have a field-of-view (FOV). For example, the FOV for the eye camera 1160*a* can include the region 1120*a* and the region 1130. The FOV for the eye camera 1160*b* can include the region 1120*b* and the region 1130. The FOV of the eye camera 1160*a* and the FOV of the eye camera 1160*b* may overlap at the region 1130.

As shown in FIG. 11, the imaging system 1160 points toward the head of the user 210. The eye camera 1160*a* may be configured to image the eye 1110*a* while the eye camera 1160*b* may be configured to image the eye 1110*b*. In this figure, the optical axis 1140*a* of the eye camera 1160*a* is parallel to the optical axis 1140*b* of the eye camera 1160*b*.

In some implementations, one or both of the eye cameras may be rotated such that the optical axes of the two eye cameras are no longer in parallel. For example, the two eye cameras may point slightly towards each other (e.g., particularly if the eye cameras are disposed near outside edges of the frame of the device 1150). This implementation may be advantageous because it can create a cross eyed configuration which can increase the overlap of the FOV between the two cameras as well as to allow the two eye cameras to image the face at a closer distance.

When the wearable device 1150 is too close to the user 210, the eye cameras may be out of focus. For example, assuming the periocular separation (e.g., a distance between periocular features on the left and right side of the face) for the user is 46 mm (typical for an adult male) and each of the two eye cameras has a horizontal FOV of 66 degrees (appropriate for eye-tracking), then the wearable device may take pictures when the distance between the face and the wearable device may be at least about 175 mm. The minimum focal distance for the lenses of many eye cameras may be approximately 14 mm. If the lenses have fixed focal length, their depth of focus may be about 65 diopters.

If the images are obtained when there is insufficient depth of focus, the wearable device 1150 may treat the images as low resolution images. As a result, the face model generated by the wearable device may have a lower fidelity or have sparse representations of gross facial features. Such face model may still be used to deduce an interocular separation for the user (e.g., an interpupillary distance), which is useful for determining whether the wearable device fits the user's face. Such face model may also still be used to deduce a distance separation between the user and the wearable device and/or to determine whether the user is wearing the wearable device.

Although the example described in FIG. 11 illustrates two eye cameras, wearable device 1150 is not required to have two eye cameras. In some embodiments, the imaging system 1160 may include one eye camera imaging the user's face. The one eye camera may be configured to image the periocular region associated with one eye or the periocular regions for both eyes. In other embodiments, the wearable device 1150 may include more than two eye cameras.

The wearable device 1150 can build a model of the user's face using the images of the user's face acquired by the imaging system 1160. The images may be acquired by the imaging system 1160 when the user is putting on or taking off the device. The images may also be acquired by scanning the user's face using the outward-facing imaging system 464 (shown in FIG. 4). For example, to scan the user's face using the outward-facing imaging system 464, the user may turn the wearable device 1150 such that the outward-facing imaging system 464 is facing toward the user's face (rather than the user's environment). The wearable device may or may not create a model of the user's face during an initialization phase of the wearable device, such as, e.g., when the user first uses the wearable device, or when a user turns on the wearable device. Examples of generating a face model using images acquired by the imaging system 1160 are also described in U.S. Publication No. 2018/0088340, titled "FACE MODEL CAPTURE BY A WEARABLE DEVICE," the disclosure of which is hereby incorporated by reference herein in its entirety.

The model of the user's face may be generated based on a base model and data specific to a user. For example, the wearable device may use a base model pre-generated from data associated with a group of people and customize the base model based on user specific information obtained by analyzing the images acquired by the wearable device. In some implementations, the base model may be associated with a group of people having similar demographic information to the user of the wearable device. For example, if the user is a female teenager, the wearable device may access a base model associated with a typical female teenager. As another example, if the user belongs to certain gender and/or race group, the wearable device may access a base model common to that gender and/or race group. The wearable device can also determine a likelihood of a location of a certain facial feature on the map based on statistical analysis on images associated with a group of people or the user. The wearable device can then update the likelihood or confirm the location of the periocular feature based on images acquired specific to the user.

In addition to or in alternative to identifying the presence of periocular features in an image, the wearable device can analyze images acquired by the inward-facing imaging system to determine the relative position between the wearable device and the user. The eye cameras of the inward-facing imaging system 462 (shown in FIG. 4) can continuously obtain images within their FOV. The eye cameras may also be configured to only acquire images based on a trigger. For example, the eye cameras may be triggered to capture one or more images when the user is putting on the wearable device (e.g., as determined by a movement of the wearable device based on the IMU). Alternatively, the eye cameras may capture images at a selected frequency. The frequency may be any desired time interval, such as every few seconds or minutes, and the frequency may change depending on requirements of the system using the images.

The wearable device can also build the face model based on the user specific images. For example, the wearable device may generate a model of the user's face solely from the images acquired by the inward-facing imaging system or by the outward-facing imaging system. In some implementations, the wearable device may update the user's face model as more images of the user's face are acquired. For example, the wearable device may generate a face model based on the images acquired by the inward-facing imaging system as the user is putting on the device. The wearable device can update the face model based on new images acquired when the user is taking off the device or in the next session where the user is putting on the device again.

Although these examples refer to building a face model or creating a map of a user's face using a wearable device, some embodiments may include the wearable device communicating with a remote computing device to generate or otherwise obtain a face model. For example, the wearable device can acquire images of the user's face and pass the images (alone or in combination with other information of the user, such as, e.g., the user's demographic information) to a remote computing device (e.g., such as a server). The remote computing device can analyze the images and create the face model and pass the face model to the wearable device of the user or pass the face model to another user's wearable device (e.g., during a telepresence session).

Further, in addition to or in alternative to determining distance between the wearable device and the user, determining fit or removal of the wearable device, and/or adjusting a rendering location of virtual images, the face model can also be used to perform user identification. As an example of determining a user's identity based on the images, the wearable device can analyze facial features of the user by applying various facial recognition algorithms to the acquired images (e.g., face shape, skin tone, characteristics of nose, eyes, cheeks, etc.). Some example facial recognition algorithms include principal component analysis using eigenfaces, linear discriminant analysis, elastic bunch graph matching using the Fisherface algorithm, the hidden Markov model, the multilinear subspace learning using tensor representation, and the neuronal motivated dynamic link matching, or a 3D face recognition algorithm. The device may also analyze the images to identify the iris and determine a biometric signature (e.g., an iris code), which is unique to each individual.

The wearable device can also perform image registration based on the images acquired by the wearable device while the device is being put on or taken off the user's face. The resulting image obtained from the image registration can include a portion of the user's environment (e.g., the user's room or another person near the user) in addition to or in alternative to the user's face.

Examples of Imaging a Periocular Region

As described with reference to FIG. 11, the images acquired by the imaging system 1160 may include a portion of the periocular region of the user. The periocular region can include one or more periocular feature, or portions of periocular features. Periocular features may include, for example, an eye, an eye socket, an eyebrow, a nose, a cheek, or a forehead. Other features or user-specific details of the face may also be considered periocular features.

Figure 12A:
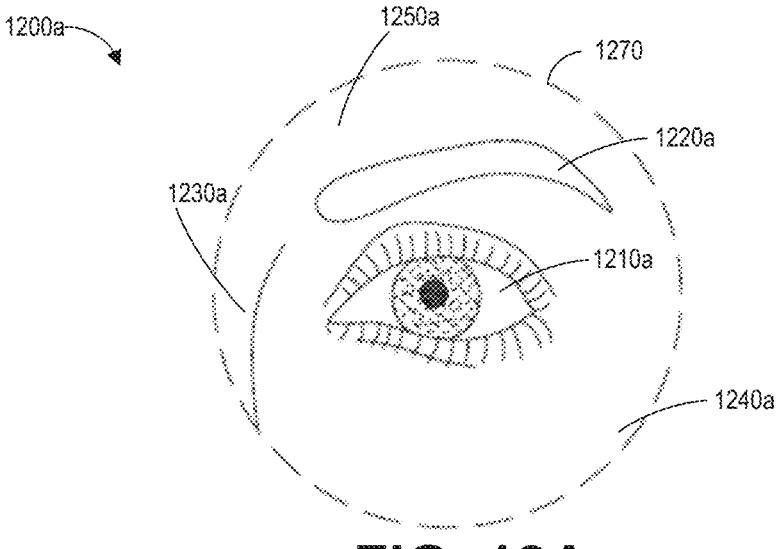
FIG. 12A illustrates an example image of a periocular region for one eye.

FIG. 12A illustrates an example image 1200a of a periocular region 1270 for one eye, such as could be obtained from an HMD camera imaging the periocular region 1270 of a user. In this example, the periocular region 1270 includes periocular features such as an eye 1210a, an eye socket, eyebrow 1220a, portions of the nose 1230a, cheek 1240a, and forehead 1250a. Each periocular feature may have a variety of characteristics associated with the periocular feature. The characteristics may be specific to each different periocular feature. For example, the periocular feature eyebrow 1220a may have characteristics including the shape of the eyebrows, the color of the eyebrow, likely movements or movement directions of the eyebrow, etc. The periocular feature eye 1210a may have characteristics such as, for example, shape, size, location of eye corners, gaze direction, pupil location, location of eyeball center, shape and folds of the eyelid, texture of skin around the eyeball, and so forth. Many other characteristics may also be used to identify and track each periocular feature. One or more characteristic of one or more periocular feature may be represented by keypoints, point clouds, or other types of mathematical representations.

The wearable device can compute and track periocular features and associated characteristics using neural network or visual keypoints techniques such as scale-invariant feature transform (SIFT), speeded up robust features (SURF), oriented FAST and rotated BRIEF (ORB), binary robust invariant scalable keypoints (BRISK), fast retina keypoint (FREAK), etc. In some embodiments, a particular facial feature may be tracked using a detector specifically designed for that particular periocular feature. For example, periocular feature characteristics, such as eye corners, nose features, mouth corners, etc., may be identified and tracked separately using various algorithms. Tracking one or more of these periocular feature characteristics separately may be advantageous because each periocular feature and/or characteristic may be prone to substantial motion while the user making facial expressions or is speaking. The algorithms used to track these periocular features and characteristics may take into account the range of mobility. As an example, some periocular features and/or associated characteristics may be likely to move in certain directions and/or may be likely to remain more stable in other directions (e.g., eyebrows tend to move up or down but not left or right).

The wearable device can analyze the movements of the periocular features statistically. These statistics may be used to determine the likelihood that the facial features will move in a certain direction. In some embodiments, one or more periocular features or characteristics may be removed or untracked to reduce processing demand or to improve reliability. In the instance where it is desired to improve reliability, it may be advantageous to ignore or mask periocular features or characteristics that are more error prone than others. For example, in some embodiments as described with reference to FIG. 12B, the wearable device may ignore pixels in a center area 1212 of the eye 1210*b* so that eye movement is not recognized by the HMD when tracking other periocular features or characteristics in the periocular region 1270.

The wearable device can also use visual simultaneous location and mapping (vSLAM) techniques, such as sequential Bayesian estimator (e.g., Kalman filter, extended Kalman filter, etc.), bundle adjustment, etc., to identify and track periocular features and characteristics. In some embodiments, the wearable device may be configured to allow depth perceptions and mapping of the user. For example, the wearable device can construct a dense map, which encodes at least a portion of the face, from data acquired by one or more cameras. In contrast with a keypoint map, the dense map may comprise patches or regions of the face whose 3D shape is measured. The patches or the regions may be used to compute the location of the HMD relative to the face of the user using techniques such as iterative closest algorithm or similar algorithms.

The size and content within the periocular region captured by a camera on the wearable device may depend on the eye camera's FOV. In some implementations, the eye camera may not have a large FOV to fit all recognizable periocular features within the captured periocular region. For example, the images captured by the eye camera may include the eye socket but not the eyebrow. Technical specifications of the camera may determine which periocular features are most likely to remain present in multiple captured frames of a periocular region and which periocular features are most reliable for tracking.

As described with reference to FIG. 11, in some situations, although each eye camera is configured to image an eye, the two eye cameras (one for the left eye and one for the right eye) may have an overlapping FOV 1130 such that overlapping periocular regions are imaged by the cameras. This may be because the FOV of the two cameras is sufficiently wide, the cameras are angled inwardly toward a center of a user's face, the cameras are positioned near each other, and/or because the two cameras are sufficiently far away from the user. As a result, a portion of the user's face, typically a center portion (e.g., nose), may be captured by both eye cameras. The wearable device may combine the images obtained from the two cameras, determine whether the combined image includes periocular features, and if periocular features are determined to be present within the images, the wearable device may identify the periocular features.

In some implementations, images acquired by eye cameras may be low resolution images because the eye cameras may be out of focus. Out of focus or low resolution images may result from physical limitations within the hardware of the wearable or improper positioning or movement of the wearable device. For example, out of focus images may be caused by eye cameras being too close or too far from the user's face. Alternatively, in some embodiments, it may be desired to capture lower resolution images. For example, the wearable device may not need high quality images to track the periocular features (e.g., for determining relative position between the user's face and the wearable device and/or for determining whether the user is wearing the wearable device) and the use of high resolution images may place more demand on software and hardware systems of the wearable device without providing a useful improvement in output. In order to reduce or minimize demand on the wearable device in terms of processing time, sampling frequency, power consumption, and other metrics, the resolution of the images obtained from an eye imager may be down-sampled relative to their original resolution or the resolution used in other applications (e.g., eye-tracking) to a reduced or minimum resolution necessary for detecting and identifying periocular features. For example, the eye cameras may image the user's eyes for the purpose of tracking the user's direction of gaze. The images obtained by the eye cameras can be downsized by the wearable device for use in determining the relative position between the user's face and the wearable device and/or in determining whether the user is wearing the wearable device. This implementation may be advantageous because the wearable device may not need detailed, high-resolution information of the periocular region to determine the relative position and/or in determining whether the user is wearing the wearable device.

In some situations, the wearable device can dynamically change the resolution of the eye camera. The resolution of the eye camera may be selected based on timing, device position with respect to a user's eyes, or intended use of the captured images. For example, it may be advantageous to capture images of a user's face from a distance further away than a normal resting use position so that a larger portion of the user's face is imaged for use is constructing a model of the user's face. It may be determined that these images are best captured as the user is putting on the wearable device. The resolution of the eye camera may be set to a high resolution when the user is putting on the wearable device so that high resolution photos of the user's entire face are available for use in generating a model of the user's face. While the wearable device is on the user, the resolution of the eye camera may be set to a low resolution so that the eye camera can continuously test whether the wearable device is in place without slowing down other processing applications. In various embodiments, the low resolution may be a factor smaller than the high resolution, where the factor is less than one, e.g., 0.5, 0.25, 0.1, or less, or any range between any of these values. Other variations are possible.

Examples of Masking Portions of a Periocular Region

Figure 12B:
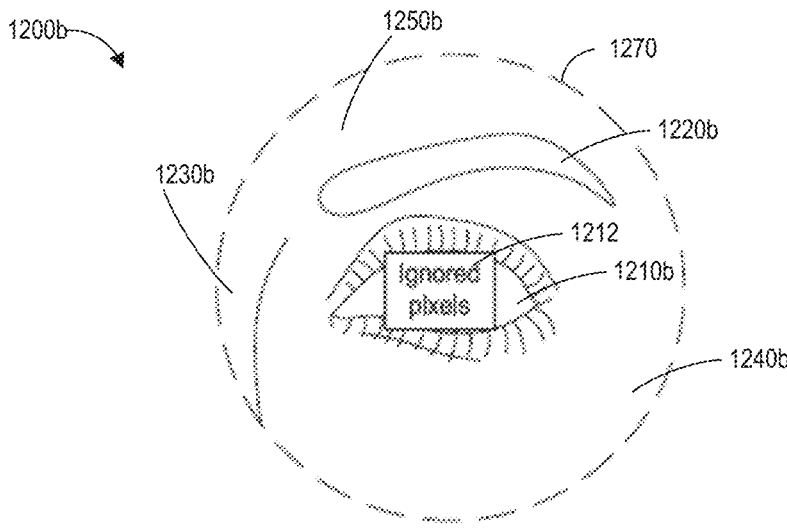
FIG. 12B illustrates another example image of the periocular region, where a portion of the periocular region in the image is masked out.

FIG. 12B illustrates an example image of periocular region 1270, where a portion of the periocular region in the image is masked out by the wearable device. In this example, the eye camera acquires an image 1200*b* of the periocular region 1270. The image 1200*b* shows that the periocular region 1270 can include the eyebrow 1220*b*, the eye 1210*b*, and portions of the nose 1230*b*, cheek 1240*b*, and forehead 1250*b*.

A portion of the image 1200*b* of the periocular region may be masked (such as, e.g., being ignored or otherwise excluded from image analysis) to reduce variations arising from a biological state of an eye (such as changes in eye pose, pupil dilation, blink, etc.). Characteristics of the eye, such as eye color, position of eyeball, and so forth, may also be highly variable among different people. These variations, in combination with variables relating to biological state of the eye, may introduce noise and error as the wearable device is determining whether the position of the wearable device has changed relative to the user's eye. Thus, masking the highly variable portion of the periocular region being imaged may reduce error and may also reduce the amount of computation needed to analyze the image. For example, as shown in FIG. 12B, a center area 1212 of the eye 1210*b* shown in periocular region 1270 may be masked so that it is ignored during image analysis. In some embodiments, the center area 1212 includes the iris and/or sclera of the eye. As a result, the wearable device will not analyze information in the center area 1212 of the perioculus while analyzing the image 1200*b* of the periocular region surrounding the ignored pixels in the area 1212. Center area 1212 may be automatically defined and bounded using periocular features or characteristics of periocular features.

Specular reflections occurring on the exposed portions of the eyeball, can also be masked. This implementation is particularly advantageous for improving accuracy when determining the relative position between the user's face and the wearable device. As the user moves around in the environment, specular reflections from the user's eye may change based on biological factors, such as where the user is looking, and may also change based on external factors, such as what the user is currently seeing, changes in environmental light sources, changes in distances to light sources, etc. However, changes in specular reflection may sometimes, but not always, be attributed to a change in the relative position between the user's face and the wearable device. Thus, it may be advantageous to ignore (or not analyze) this information since it may not be reliable for the purpose of determining relative position between a user's eye and the wearable device.

Examples of Identifying Periocular Features

The wearable device can use images acquired by the eye cameras to train a machine learning model to identify periocular features in the periocular region. The wearable device may also use the object recognizers 708 (described in FIG. 7) to perform the identification. The object recognizers 708 may implement the machine learning model trained from the images acquired by the eye cameras. The periocular region may be associated with one or both eyes. The machine learning model may be trained using periocular features, or characteristics associated with periocular features, generic to a group of people or specific to an individual. For example, the wearable device can train the machine learning model based on the characteristics of the periocular features such as a user's eyebrows and eye socket. As another example, the wearable device can train the machine learning model using the periocular features and/or associated characteristics of periocular features of other people who have the same or similar ethnicity and gender as the user.

The detection and identification of periocular features may be performed automatically using neural network techniques (such as sparse auto-encoder or similar clustering techniques or deep neural networks using many hidden layers) or other machine learning algorithms. In some implementations, the machine learning model may be customized based on its application. For example, if the machine learning model is used for determining whether the wearable device fits the user's face, the machine learning model may be trained to identify detailed characteristics of periocular features such as the location of eyebrows and eye balls. As another example, if the machine learning model is used for detecting whether the user has removed the wearable device, the machine learning model may not need to learn the detailed characteristics of periocular features of the user's face. Rather, it may be sufficient to identify a reduced or minimum set of periocular features such as for example, the eye socket and the nose of the user.

Examples of Determining Relative Position Between the HMD and the User's Face

The wearable device can identify periocular features in the periocular region in an image captured by cameras on the wearable device and may use the identified periocular features, and characteristics thereof, to determine a relative position between the wearable device and the user's face. In certain embodiments, the wearable device can calculate the relative position between the wearable device and the user separately for each eye or for one or more periocular features (e.g., an eye, an eyebrow, a nose etc.). For example, when the wearable device has two eye cameras, each configured to image one periocular region of the user, the wearable device may calculate one relative position between the left eye and the left eye camera and another relative position between the right eye and the right eye camera. Relative positions between the left eye and the wearable device and between the right eye and the wearable device may then be calculated. In some embodiments, calculating distances between eyes and the wearable device may also depend on known geometric information about positions of eye cameras on the wearable device in addition to known technical details about the cameras themselves, such as field of view, focal length, etc.

While the wearable device may track the relative positions for respective eyes separately, the wearable device may also be configured to combine relative position information between both eyes and the wearable device. Alternatively, a wearable device may include one eye camera capable of imaging both the user's left and right eyes simultaneously. In other embodiments, a single eye camera on the wearable device may image a periocular region of only one eye, from which relative positional data of the HMD with respect to the user may be extrapolated. More or fewer than two cameras may be used to image one or more periocular regions of a user and that the number of cameras used may depend upon the technical specifications of the camera and the desired types and number of images needed for a particular application or tracking algorithm.

As further described herein, the relative positions between the user's face and the wearable device can be used to determine whether a positional shift has occurred between the wearable device and the user. In some embodiments, detection of a positional shift may cause a display of the wearable device to adjust rendering locations of virtual objects so that the rendered virtual content may align correctly with the user's eyes. Because the relative position between the left eye and the wearable device may be different from the relative position between the right eye and the wearable device (such as when the wearable device tilts to one side), the adjustment to the rendering location of a virtual object may be different for the left eye display and the right eye display.

Figure 13A:
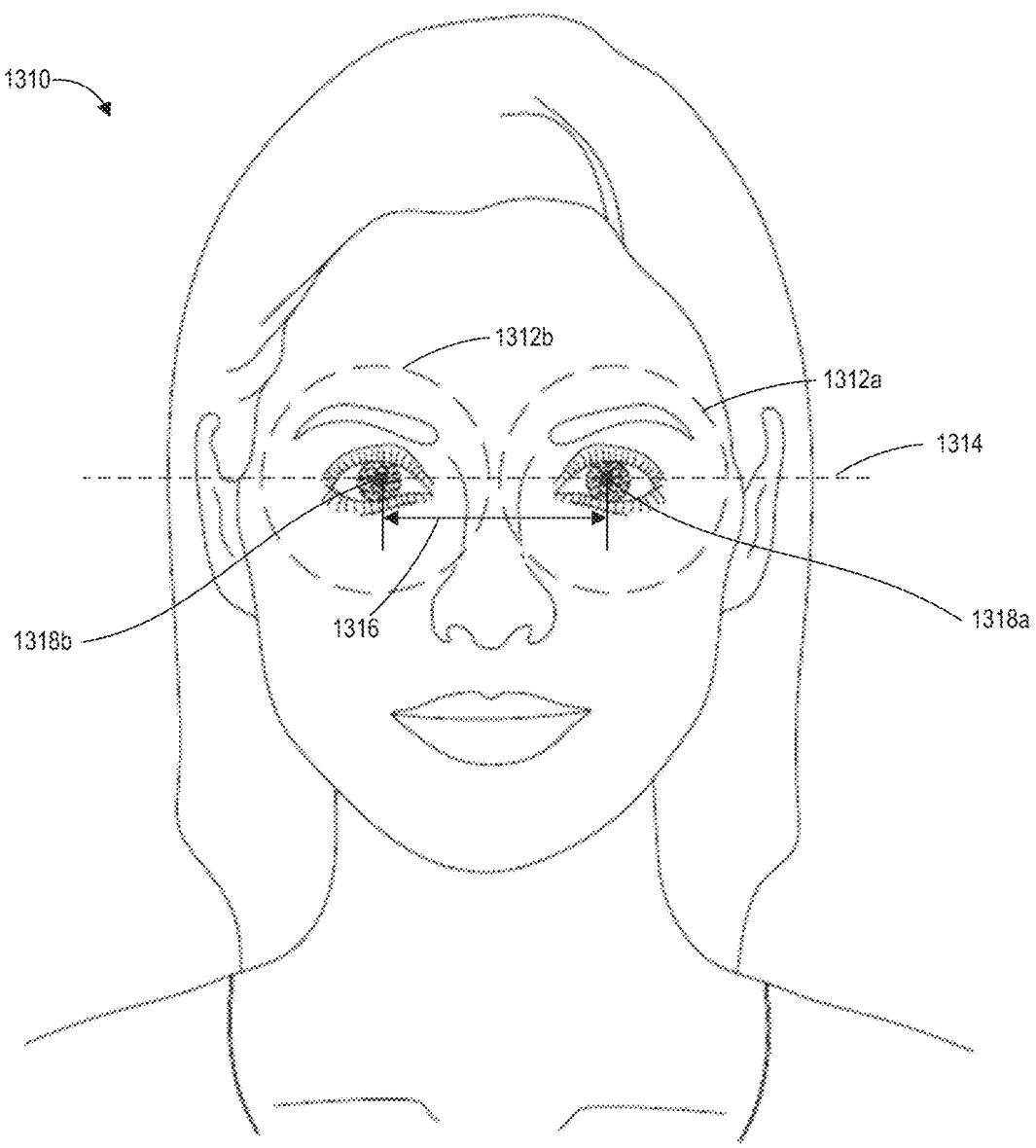
FIG. 13A illustrates an example where a head-mounted display is at its normal resting position with respect to the user's face.
Figure 13B:
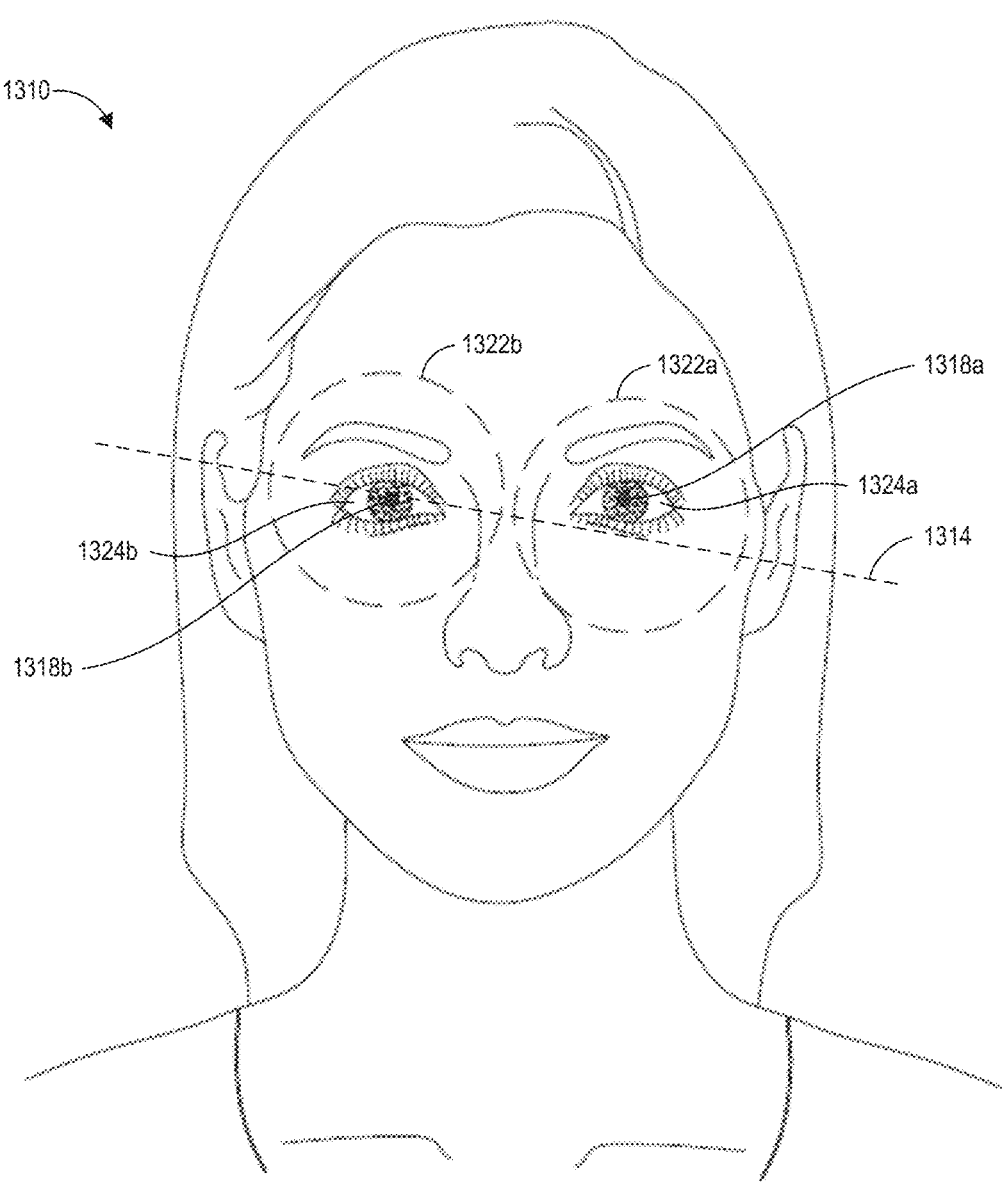
FIG. 13B illustrates an example where the head-mounted display is tilted to one side.
Figure 13C:
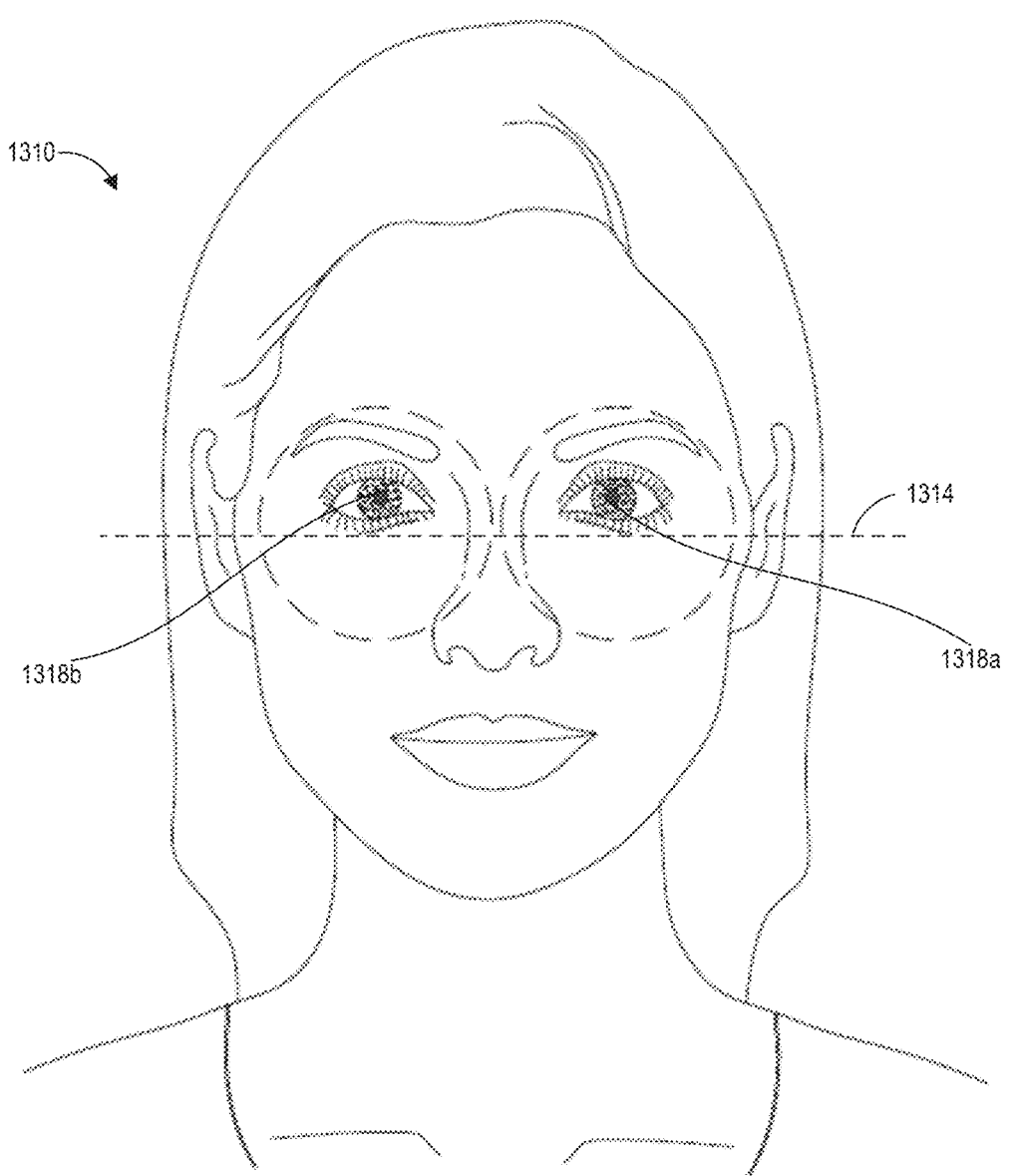
FIG. 13C illustrates an example where the head-mounted display has tilted or shifted forward.

FIGS. 13A-13C illustrate examples of periocular regions from a wearable device having various example relative positions with respect to the face of the user. The wearable device may be an HMD. FIG. 13A illustrates an example where the HMD (not pictured) is at its normal resting position with respect to the user's face, as indicated by a reference line 1314 of HMD aligning with left and right pupil centers 1318a, 1318b. FIG. 13B illustrates an example where the HMD is tilted to one side as compared with the normal resting position of FIG. 13A. FIG. 13C illustrates an example where the HMD has tilted or shifted forward (e.g., the HMD has slid down the user's nose) as compared with the normal resting position of FIG. 13A. In these example figures, the user 1310 is wearing an HMD which has at least two eye cameras to image periocular regions 1312a, 1312b. As shown in FIG. 13A, one eye camera is configured to image the periocular region 1312a while the other eye camera is configured to image the periocular region 1312b; however, more or fewer eye cameras may be used to capture one or more periocular regions of the user. For example, a single eye camera having sufficient field of view may image both periocular regions 1312a, 1312b. In these examples, the normal resting position is associated with the HMD. In some implementations, the normal resting position may be associated with the user's eye.

The wearable device can analyze the images obtained by one or both eye cameras to determine the relative position between the HMD and the user. The HMD can determine a normal resting position of the HMD and determine the relative position of the HMD with respect to a user based on a positional deviation from the normal resting position. The normal resting position of the HMD may be determined and calibrated during the initialization phase of the wearable device. For example, when a user first uses the wearable device, the wearable device may build a face model (e.g., a map of the user's face) and determine the normal resting position of the HMD based on the face model. As further described with reference to FIGS. 14A and 14B, when the HMD is at the normal resting position, the HMD may not need to adjust the rendering location of the virtual objects. Further, the HMD can determine that it fits the user's face if the HMD is at the normal resting position (see, e.g., FIG. 13A). The HMD can determine one or more goodness of fit parameters (further described below) that can be used to automatically assess the fit of the HMID on the user's face. Goodness of fit parameters can include one or more of, e.g., relative distance between the HMID and the user's eyes, amount of tilt or shift of the HMD on the user's face, interpupillary distance (IPD), locations of centers of pupils relative to the display, position of a reference line of the HMD relative to the pupils, etc.

While the user is using the wearable device, the wearable device can keep tracking the relative position between the HMD and the user using a variety of techniques. For example, the wearable device can identify and track visual keypoints associated with periocular features. Movement of visual keypoints associated with periocular features may indicate relative motion of the HMD with respect to the user's eyes and face. In some embodiments, the wearable device can also match a region of the face as identified in the acquired images relative to a dense map of the user's face to compute the location of the HMD relative to the face. As another example, the HMD may detect or calculate a distance from the HMD (or a component of the HMD such as an eye camera) to the eyes of user 1310. If the distance of the HMID passes a certain distance threshold (e.g., when the HMD is too close or too far), the HMD may determine that the HMD does not fit the user 1310 very well and may determine that the rendering locations of the pixels need to be adjusted. On the other hand, if the detected or calculated distance between the HMD and the user's eyes falls within a threshold range, the wearable device may determine that the HMD fits the user acceptably and the pixels will not need to be adjusted.

It may be that the HMD shifts asymmetrically with respect to the user's eyes. For example, the HMD may tilt to one side as shown in FIG. 13B. In such a position, a distance detected or calculated between the HMD and the left eye may differ from a distance detected or calculated between the HMD and the right eye. For example, as shown in FIG. 13B, the distance between the user's right eye 1324*b* and the HMD may be smaller than the distance between the user's left eye 1324*a* and the HMD. The HMD may use this difference as a cue to calculate in which direction the HMD is tilted and/or to calculate the degree of tilt. The direction and degree of tilt may be used to determine a direction and magnitude of render location adjustment necessary to accommodate for the tilt of the HMD with respect to the user's eyes.

As another example, the HMD may use IPD as one of the parameters for determining fit of the HMD and/or location of the HMD with respect to the user's eyes. The HMD may be capable of detecting and/or calculating a user's IPD based on images obtained from eye cameras. In some embodiments, knowledge of geometric placement of eye cameras on the HMD, specifics about orientation of the eye cameras, and information about camera field of view, focal distance, and other technical details may also be used in calculating user IPD.

The HMD may obtain an acceptable IPD range for the user 1310 (e.g., by accessing a database storing acceptable values of interpupillary distances). The acceptable interpupillary distance may be a distance or range of distances determined specifically for the user 1310 or may be determined based on data from a group of people. The HMD can compare the user's IPD to the acceptable IPD range. If the discrepancy between the user's IPD 1316 and the acceptable interpupillary distance passes a threshold, the HMD may determine that the HMD does not fit the user very well. On the other hand, if the discrepancy is within an acceptable range, the HMD may determine that the HMD fits the user adequately. In cases where the HMD fit is determined to be acceptable, no rendering adjustment is necessary; however, in cases where the HMD fit is inadequate, the HMD may adjust rendering to accommodate for a suboptimal fit.

For example, the interpupillary distance for a typical adult male may be around 65 mm. The acceptable IPD value may be based on an average value for a user of particular age, gender, and/or race. For example, the HMD may obtain user information indicating that the user is an adult male. This information may be used to obtain an acceptable IPD value for an adult male user, such as 65 mm. In some embodiments, the HMD may calculate an acceptable IPD range based on the acceptable IPD value for a given user. Continuing the example above, an acceptable IPD range may be the acceptable IPD value (65 mm) plus or minus a selected distance or percentage of the acceptable IPD value. The selected distance may be, for example, plus or minus 5 mm or plus or minus 10 mm to give acceptable IPD ranges of 60 mm-70 mm and 55 mm-75 mm, respectively. The percentage of IPD may be, for example, plus or minus 5% or plus or minus 10% to give acceptable IPD ranges of 61.75 mm-68.25 mm and 58.5 mm-71.5 mm, respectively. Any distance or percentage value may be selected for determining an acceptable IPD range.

In some implementations, the interpupillary distance may be calculated from a sample group of people. For example, the HMD can calculate the average, mean, or median value (or other statistical values) of the interpupillary distance for a group of people to be used for the determining an acceptable IPD value or range. The sample may take into account the characteristics of the user such as the user's gender, race, age, and so on. For example, if the user of the HMD is a female teenager, the HMD may calculate the threshold interpupillary distance for the user based on data from a group of female teenagers. In addition to or in alternative to interpupillary distance, the HMD can also calculate the threshold value based on other parameters, such as the periocular separation.

The wearable device can also use the detected location of relative centers of the pupils (1318*a* and 1318*b*) with respect to the display to determine the relative position between the HMD and the face. In FIG. 13A, the center of the display is shown by reference line 1314. As shown in FIG. 13A, the reference line 1314 of the display aligns with the centers of the pupils 1318*a* and 1318*b*. In this example, the HMD may determine that the HMD fits the user if the center of the display aligns with the center of the pupils 1318a and 1318b. The HMD can further determine that alignment between the pupils 1318a, 1318b and the reference line 1314 of the HMD is correct and that no adjustment to the rendering locations of the virtual objects is needed. However, in FIG. 13B, the HMD is tilted to one side and the center 1314 of the display does not align with both pupils 1318a, 1318b. As another example, in FIG. 13C, the HMD is titled forward or shifted downward, and as a result, the reference line 1314 of the display does not match the centers of the pupils 1318a and 1318b. In either or both situations, the HMD may send a signal indicating the relative position between the HMD and the user. The signal can cause the HMD to adjust the rendering locations of the virtual objects. In some embodiments, the HMD may provide an alert to display an indication of a goodness of fit to the user. The indication of goodness of fit displayed to the user may inform the user how to adjust the HMD with respect to pupils 1318a, 1318b such that alignment between reference line 1314 and pupils 1318a, 1318b is improved.

In another example, eye cameras may specifically track eyeball center as an indicator of relative position between the HMD and a user. Eyeball center location may allow the wearable device to determine relative tilt, rotation, and translation occurring up to three dimensions (e.g., x-, y-, and z-dimensions or yaw, pitch, and roll angular dimensions). To reduce errors associated with specular reflection, eye tracking cameras with specific componentry may be used. For example, eye cameras may include infrared (IR) light emitting diode (LED) lights. Operating parameters of the eye cameras and/or IR LED lights may also be adjusted or optimized to reduce or minimize tracking error caused by specular reflection. For example, the IR LED lights may be operated to burst light of a particular wavelength with relatively high power. An example IR wavelength may be between about 800 nm and 900 nm, and an example power level may correspond to an operating current of between about 2.5 mA and 50 mA. Exposure time of the eye cameras may additionally or alternatively be adjusted to reduce error. An example exposure time may be between about 400 microseconds and 8 ms. Additionally or alternatively to adjusting operating parameters of eye cameras, filtering steps may be performed to reduce error caused by reflection. Using one or more of these improvements may allow the wearable device to track wearable device location with respect to eyeball center with more stability and reliability than a system tracking relative position based on other periocular features. This may be especially relevant when other periocular features are difficult for the wearable device to identify and track, such as when makeup covers periocular features such as eyelid, eye corners, eyelash length, etc.

In some embodiments, the HMD can use observed asymmetries in the images of the periocular region to determine the relative position between the user's eyes and the wearable device. For example, in FIG. 13A, the HMD may determine, from the images of the periocular region, that the user's eyes are symmetric, and accordingly determine that the HMD is at the normal resting position. In some embodiments, other periocular features may be used to determine symmetry between the two periocular regions. In FIG. 13B, however, the periocular region 1322b and 1322a observed in the images may not have the same periocular features. In some embodiments, while the same periocular features may be present in each of the periocular regions 1322a, 1322b, their locations or sizes within the captured image may vary.

For example, the periocular region 1322b may include a larger portion of the forehead than the periocular region 1322a, while the periocular region 1322a may include a larger portion of the cheek than the periocular region 1322b. As a result, the HMD may determine that the HMD is tilted with respect to its normal resting position.

Although the two eye cameras for imaging the periocular regions 1312a and 1312b do not have an overlapping FOV in the examples shown in FIGS. 13A-13C, in some embodiments, the two eye cameras may have an overlapping FOV. As a result, a portion of the region 1312a may overlap with a portion of the region 1312b. This overlapping FOV may be useful for determining the relative position between the HMD and the face. For example, if the HMD is at its normal resting position relative to the user, the overlapping FOV may include a top portion of the nose. However, where the image in the overlapping FOV includes a portion of one eye (instead of the top portion of the nose), the HMD may determine that the HMD is titled. As another example, if the image includes a large portion of the nose, the HMD may determine that it has slid down the user's nose. Thus, the presence or absence of periocular features in each periocular region or in an overlapped periocular region may provide an indication of relative position of the HMD with respect to the user's eyes and face.

These example factors may be used alone or in combination to determine the relative position between the HMD and the user's face. For example, although the HMD detects asymmetries in the wearer's eyes in the images, the HMD may nevertheless determine that it is at the normal resting position because the relative centers of the pupils do not indicate a tilt. Thus, the HMD may be capable of performing more than one check to determine position of the HMD so that false indications of an HMD-to-user misalignment do not incorrectly and unnecessarily trigger an adjustment in render location.

The HMD can determine the relative position using a variety of algorithms For example, the wearable system can track visual keypoints and relative positions using SIFT, SURF, ORB, FREAK, BRISK. V-SLAM techniques, such as the use a sequential Bayesian estimator (e.g. Kalman Filter, Extended Kalman Filter, etc.) or Bundle Adjustment may also be employed. Where the cameras are capable (either singly or by integrating data from multiple cameras) of depth perception (either by stereoscopy, structured light projection, time of flight measurement, or any other means), a dense map may be constructed of the whole or parts of the face. Such a dense map can comprise of patches or regions whose three dimensional shape is measured. Such regions may be used, by matching (e.g. with the Iterative Closest Point algorithm, or similar), to compute the location of the HMD relative to the face. The HMD can use a model of the face (e.g., built during the initialization phase of the HMD) to determine the relative position between the HMD and the user's face.

In addition to or in alternative to determining the relative position between the HMD and the user's face, the wearable device can also determine a pose of the MID. The pose may be with respect to the user's face, such as titling to one side or forward by a certain degree or distance, or rotated in a clockwise or counterclockwise direction about the user's head, etc. The wearable device can determine the pose of the HMD using the information on the relative position between the HMD and the user's face. The wearable device can also determine the pose of the HMD directly from the images acquired by one or more cameras of the wearable device.

Adjusting a Rendering Location of a Virtual Object

The relative position between the HMD and the user's face or the HMD's pose may be used to compute an adjustment to a rendering location of the virtual objects.

Figure 14A:
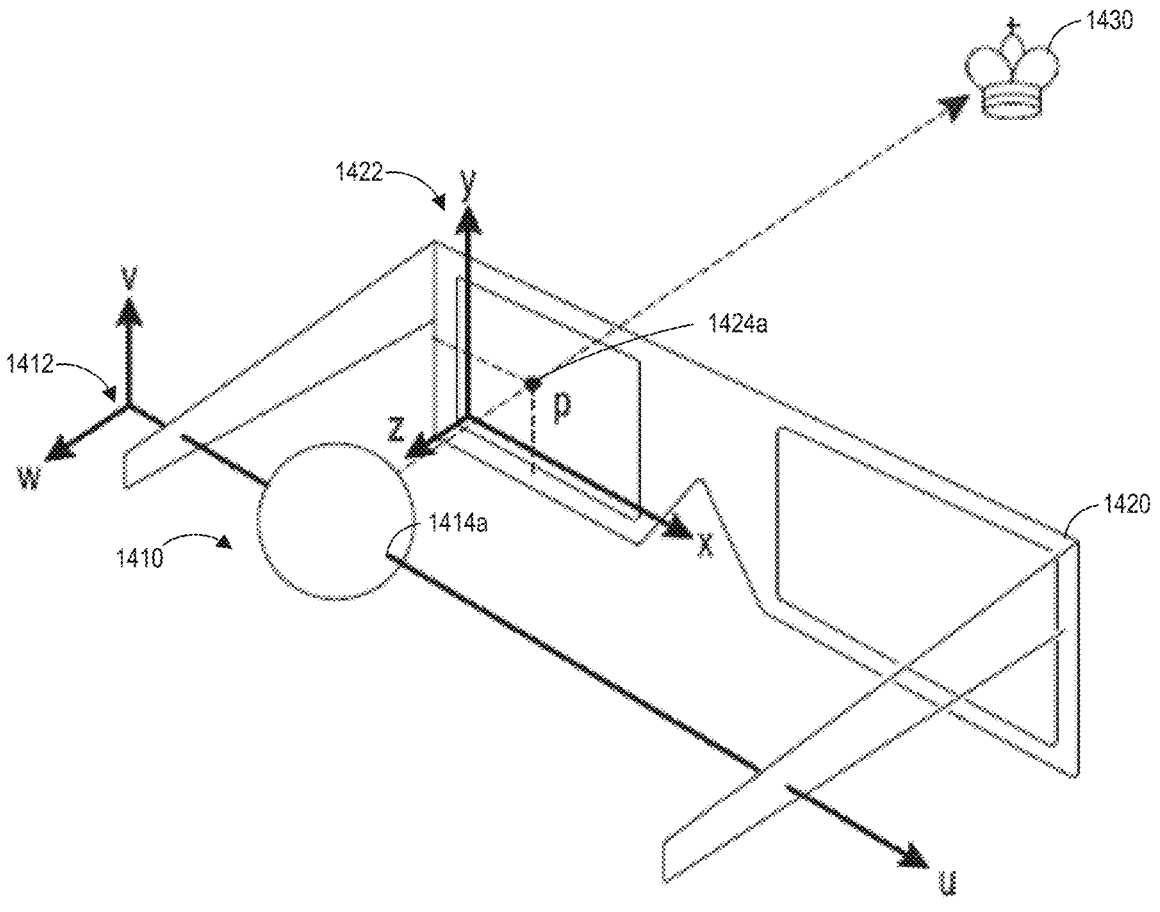
FIGS. 14A and 14B illustrate an example of adjusting a rendering location of a virtual object in a spatial augmented reality (SAR) display.
Figure 14B:
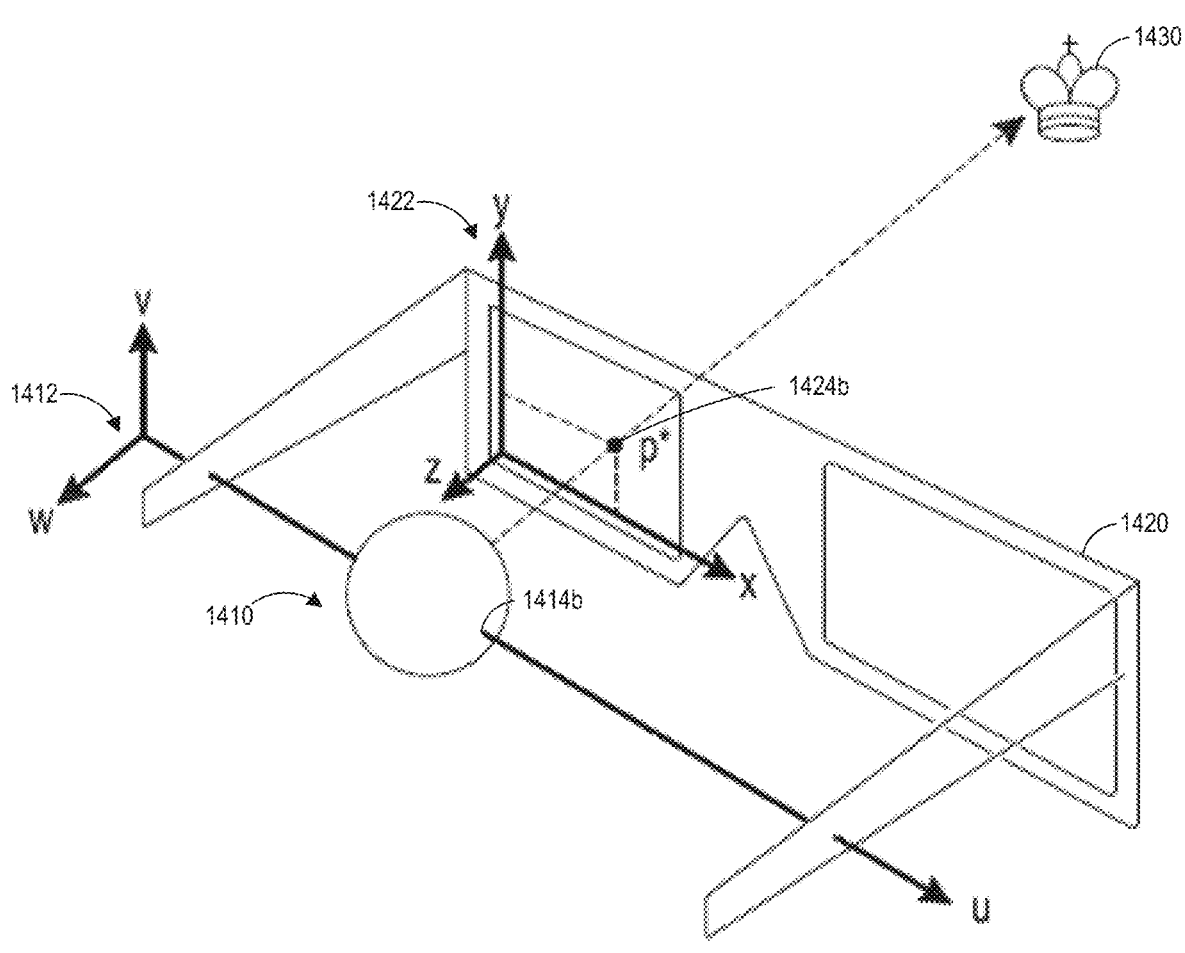

FIGS. 14A and 14B illustrate an example of adjusting a rendering location of a virtual object in a HMD. In these examples, the HMD can be a SAR display. In FIG. 14A, the eye 1410 is associated with an eye coordinate system 1412 and the HMD 1420 is associated with a rendering coordinate system 1422. In this example, the u-axis in the eye coordinate system 1412 corresponds to the x-axis in the rendering coordinate system 1422, the v-axis in the eye coordinate system 1412 corresponds to the y-axis in the rendering coordinate system 1422, and the w-axis in the eye coordinate system 1412 corresponds to the w axis in the rendering coordinate system 1422. Another example of the x-y-z coordinate of the rendering coordinate system is shown in FIG. 6. Although in these examples, the coordinate systems are illustrated using a Cartesian Coordinate system, other types of coordinate systems, such as, e.g., a Polar Coordinate system, may also be used with the techniques described herein.

In FIG. 14A, when the eye is at position 1414*a*, the user can perceive a virtual object 1430 at a position 1424*a* (represented by the letter "p") in the rendering coordinate system 1422. The position 1414*a* may represent the normal resting position of the eye 1410 (with respect to the HMD 1420) or the HMD 1420. In some implementations, the corresponding position 1424*a* for the wearable device 1420 may also be referred to as normal rendering position of the virtual object. In FIG. 14B, the eye deviates from its normal resting position by moving along the u axis in the eye coordinate system 1412 from the position 1414*a* to the position 1414*b*. This deviation may be a result of HMD's movement. For example, when the HMD may tilt forward or move to one side, the relative position between the HMD and the user's eye may change. The wearable device can similarly dynamically update the rendering locations of the virtual objects based on the tilting of the HMD. As an example, the HMD 1420 may shift the rendering location of the virtual object 1430 along the x-axis in the rendering coordinate system 1422 from the position p 1424*a* to the position p* 1424*b*. The shift can cause the virtual object 1430 to appear in the same location in the user's environment before and after the eye's 1410 movement in FIGS. 14A and 14B. Accordingly, the user will not perceive that the HMD has shifted or moved slightly on the user's head since rendering of the virtual objects is dynamically adjusted to correct for HMD movement, thereby providing an improved user experience.

As described with reference to FIG. 2, an SAR system can render virtual objects from the perspective of the user's eye. The rendering viewpoint associated with the user's eye may be represented by a virtual camera in a rendering system, such as the virtual camera in OpenGL or DirectX. To adjust the rendering locations of virtual objects, the virtual camera may be displaced or rotated based on a displacement of the normal resting position of the user's eye (with respect to the HMD) or the HMD. The amount of adjustment may be a fraction of change of the relative position between the user's face and the MID. For example, the displacement of the virtual camera may be a ratio (such as 0.2, 0.4, 0.6, etc.) of the movement of the HMD or the user's eye.

As an example, as shown in FIGS. 14A and 14B, the wearable device can update the position of the virtual camera from position p 1424*a* to position p* 1424*b* to correspond to the eye movement from position 1414*a* to position 1414*b*. As another example, the HMD may tilt forward due to sliding down the user's nose. As a result, the HMD may calculate an adjustment for the virtual camera corresponding to the tilt. In this example, the HMD may adjust the z value as well as the y value in the rendering coordinate system 1422 because the relative position between the eye 1410 and the HMD 1420 may change along both the w-axis and the v-axis. As yet another example, the HMD may tilt to one side (such as to the right or to the left) so that the position of the eye with respect to the HMD may change along the v-axis and the u-axis. Accordingly, the wearable device can adjust the virtual camera along the y-axis and/or the x-axis.

Because the position of the virtual camera is adjusted, the rendering locations of the virtual objects in the user's FOV may also be adjusted accordingly. Additionally or alternatively, the wearable device can shift the rendering coordinate system (e.g. the shift the x-y-z coordinate shown in FIGS. 14A and B) for adjusting a relative position change between the user's face and the HMD. For example, in FIG. 14B, the shift of the rendering coordinate system 1422 may correspond to the movement of the eye 1410 as relative to the HMD. As a result of the coordinate shift, the virtual object 1430 may still be at the same position in the rendering coordinate system 1422. The virtual object 1430 may also appear to be at the same location relative to the physical objects in the environment. The displacement of the coordinate system may be a displacement of a planar coordinate system such as the x-y plane, the y-z plane, or the x-z plane, or may be a displacement in the 3D space.

Shifting of the rendering coordinate system may be an approximation to the shifting of the virtual camera or the virtual objects. In some situations (particularly for small adjustments), this approximation may be close enough to the adjustments generated by displacing the virtual camera. Additionally, the coordinate shift may be advantageous for reducing the cost of calculating the positions of the virtual object and thereby increase the performance of the wearable device. It may also be advantageous for reducing delay. For example, the coordinate shift may be done after the rendering pipeline for the uncorrected coordinate is complete and the HMD can apply the coordinate shift just before the virtual images are mapped to the rendering coordinate system.

In some situations, when the change in the relative position exceeds a threshold level, the wearable device may generate an alert indicating the relative position change instead of adjusting the rendering locations of the virtual objects. In other situations, when the change in the relative position is less than a threshold level, the wearable device may be configured not to adjust the rendering locations of the virtual objects because such a small change in the relative position may not affect the user's visual experience. The dynamic rendering adjustment described herein can be performed periodically (e.g., every 0.5 s, 1 s, 5 s, 10 s, 30 s, etc.) or as needed (e.g., when the HMD relative position shift is greater than a threshold amount).

Example Process of Adjusting a Rendering Location of a Virtual Object

FIG. 16 illustrates an example process for adjusting a rendering location of a virtual object. The process 1600 in FIG. 16 may be performed by the wearable device which may include an HMD that can present virtual objects into physical objects from a perspective of the user's eyes and include an inward-facing imaging system configured to image the periocular region of the user.

At block 1610, the wearable device can receive images obtained by the inward-facing imaging system. For example, the wearable device can receive images from both eye cameras of the inward-facing imaging system. In some implementations, the inward-facing imaging system may include only one eye camera. The eye camera may be configured to image the periocular region of one eye or the periocular regions for both eyes. The images can be still images or frames from a video (e.g., typically the inward-facing imaging system comprises video cameras).

At block 1620, the wearable device can analyze the images to identify periocular features. For example, the wearable device may use only one image or a series of images (such as a video to make such analysis). As described with reference to FIGS. 11, 12A, and 12B, the wearable device may represent the periocular features in a series of 3D keypoints or in a dense map. The wearable device can use a machine learning model such as a deep neural network to identify the relevant periocular features.

At block 1630, the wearable device can determine a relative position between the HMD and the user's head. For example, the wearable device can track keypoints associated with periocular features in a series of images acquired by the wearable device. The wearable device can also match a region of the perioculus with a region in a dense map to determine the relative position between the HMD and the user's face. As another example, the wearable device may use the distance between the user and the inward-facing imaging system to determine whether the HMD tilts (to the side or forward). If the distance calculated for the left eye is different from the distance calculated for the right eye, the wearable device may determine that the HMD is tilted to one side. If the distances associated with for the left eye and the right eye are roughly the same but the distance exceeds a threshold distance, the wearable device may determine that it tilts forward because it's far away from user's eyes.

In addition to or in alternative to distance between the user's eyes and the HMD, the wearable device can also use other factors, alone or in combination, to determine the relative position between the user and the HMD. These factors may include alignment between the pupils and the center of the display, asymmetry of user's eyes, and so on.

At block 1640, the wearable device can adjust a rendering location of a virtual object based at least partly on the relative position between the HMD and the user's face. For example, the wearable device can determine a current position of the eye and calculate an adjustment based on the relative position between the eye and the HMD. The adjustment may be relative to a normal resting position of the eye or the HMD. The adjustment may be in one or more directions, such as a horizontal shift, a vertical shift, a depth shift, or a tilt to a side. The wearable device can update the location a virtual camera of a rendering system to reflect the adjustment, where the virtual camera may correspond to the perspective of the user's eye. The wearable device can also shift the rendering coordinate system of the HMD to reflect the adjustment.

At block 1650, the HMD renders the virtual object at the adjusted rendering location. The virtual object may be perceived to be at the same location in the user's environment due the adjustment even though the illuminated pixels associated with the virtual object may be shifted on the HMD.

In some situations, the wearable device can continuously or periodically (e.g., every 0.5, 1 s, 10 s, 1 min, etc.) monitor the position of the HMD relative to the user's head while the user is wearing the HMD because the position of the HMD may change as the user moves around (for example, the HMD may slide down the user's nose). The wearable device may change the AR or VR display (such as adjusting pixels or the location associated with the virtual object) to compensate for the change in the relative position between the HMD and the user's head periodically or continuously or as needed. This implementation may be particularly advantageous for maintaining a 3D view without requiring the 3D display to be constantly located at a particular place on the user's head. Accordingly, the wearable device can dynamically adjust the projection of light from the AR or VR display (e.g., a light field) to compensate for where the HMD is positioned on the user's head.

Glasses Fit

The HMD can use a variety of factors to determine how the HMD fits the user. As one example, the HMD can analyze the images obtained by the eye cameras by applying a mapping learned via machine learning techniques. The images acquired by the eye cameras can be trained using a machine learning model to identify periocular features. The machine learning model can include a mapping of an image space to a fit space for the HMD. The mapping can be applied to an eye image to determine whether the periocular region is present in the eye image (e.g., for determining whether the HMD is on the user's face) or the quality of the fit of the HMD on the user's face. In some implementations, one mapping may be used for both classifying the fit of the wearable device and for determining whether the periocular region is present or different mappings may be used for fit and for whether the HMD is on the user's face.

The mapping may incorporate a variety of parameters for determining the fit, such as for example, the appearance of the periocular features in the images (e.g., whether periocular features for the two eyes appear asymmetrical), the distance from one or both eyes to the HMD, interpupillary distance (e.g., comparing the interpupillary distance calculated based on images with a proper interpupillary distance for the user), or relative centers of the pupils (e.g., whether the center of the HMD's display aligns with the centers of the pupil).

The image space may include images of periocular regions or images of features in the periocular region. The fit space for an HMD may include interpupillary distance, alignment between the pupils and the center of the display, asymmetry of user's eyes, tilt of the HMD, and so on. The machine learning model can identify features that are predictors of the goodness of fit so that the mapping can be applied to an eye image to determine a quality of fit (e.g., good, acceptable, poor, or a grade, e.g., A-F, or a numerical fit score). The mapping for determining whether the HMD is on or off the user's face may be a Boolean value (e.g., on or off).

Various machine learning algorithms may be used for this process. Some examples of machine learning algorithms that can be used to generate and update the models can include supervised or non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, a-priori algorithms), artificial neural network algorithms (such as, for example, Perceptron), deep learning algorithms (such as, for example, Deep Boltzmann Machine), dimensionality reduction algorithms (such as, for example, Principal Component Analysis), ensemble algorithms (such as, for example, Stacked Generalization), and/or other machine learning algorithms.

In some embodiments, individual models can be customized for individual data sets. For example, the wearable device can generate a base model. The base model may be used as a starting point to generate additional models specific to a data type (e.g., a particular user), a data set (e.g., a set of additional images obtained), conditional situations (e.g., fit during gameplay may be different than fit during Internet browsing), or other variations. In some embodiments, the wearable device can be configured to utilize a plurality of techniques to generate models for analysis of the aggregated data. Other techniques may include using predefined thresholds or data values. Over time, the wearable device can continue to update the models.

The HMD can determine the fit using quantitative and/or qualitative measures. For example, the HMD can generate a score indicating the fit based on the relative position between the HMD and the user, or based on the pose of the HMD. The score may be an output of the mapping learned via machine learning techniques. In some implementations, a high score may indicate that the HMD fits the user well while a low score may indicate that the HMD does not fit very well. In other implementations, a high score may indicate that HMD does not fit the user well while a low score may indicate the HMD fits well. As another example, the HMD categorize how well it fits the user. The categories may include "fits well", "fits poorly, or "not fit at all". The categories may also be letter grades such as "A", "B", "C", "D", and so on. The categories may also be the output of the mapping learned from the machine learning techniques. For example, the mapping may include a correlation between an appearance of the periocular feature and a category of fit. The wearable device can output a certain category of fit based on the appearance of the periocular feature as determined from the images acquired by the eye cameras.

Example Processes for Determining Fit of a Wearable Device

Figure 15A:
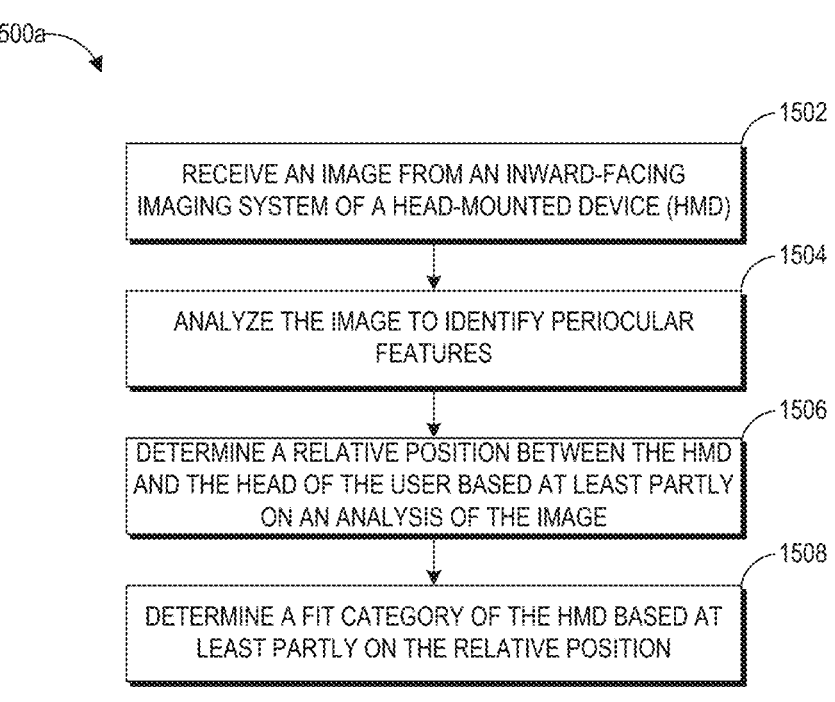
FIG. 15A illustrates an example method for determining a fit of the wearable device on a user's face.

FIG. 15A illustrates an example method for determining a fit of the wearable device. The process 1500*a* may be performed by the wearable device such as an HMD described with reference to FIGS. 2 and 4. The HMD may have an inward-facing imaging system configured to image the periocular region of the user.

At block 1502, the HMD can receive images obtained by the inward-facing imaging system. For example, the HMD can receive images for both eye cameras of the inward-facing imaging system. In some implementations, the inward-facing imaging system may include only one eye camera. The eye camera may be configured to image the periocular region of one eye or the periocular regions for both eyes. The images can be still images or frames from a video (e.g., typically the inward-facing imaging system comprises video cameras).

At block 1504, the HMD can analyze the images to identify periocular features. For example, the HMD may use only one image or a series of images (such as a video to make such analysis). As described with reference to FIGS. 11 and 12A-B, the HMD may represent the periocular features in a series of 3D points. The HMD can use a machine learning model such as deep neural network to identify the relevant periocular features.

At block 1506, the HMD can determine a relative position between the HMD and the user's head. For example, the HMD can analyze the image to determine whether one or more periocular features appear in the image. If the periocular features do not appear in the image, the HMD may determine that the user is not currently wearing the HMD. If the periocular features appear in the image, the HMD can analyze whether the HMD properly fits the user's face. For example, the HMD may use the distance between the user and the inward-facing imaging system to determine whether the HMD tilts (to the side or forward). As an example, if the distance calculated for the left eye is different from the distance calculated for the right eye, the HMD may determine that the HMD is tilted to one side. As another example, if the distances associated with for the left eye and the right eye are roughly the same but the distance exceeds a threshold distance, the HMD may determine that it tilts forward because it's far away from user's eyes.

In addition to or in alternative to distance between the user's eyes and the HMD, the HMD can also use other factors, alone or in combination, to determine the relative position between the user and the HMD. These factors may include interpupillary distance, alignment between the pupils and the center of the display, asymmetry of user's eyes, and so on.

At block 1508, the HMD can determine a fit category based on the relative position. As described herein, a machine learned mapping can be applied to an eye image to determine goodness of fit. The HMD can classify the fit into different categories such as "fits well", "fits poorly", and "not fit at all." The HMD can also indicate the fit category through a user interface. For example, the HMD may provide a warning sign when the HMD fits poorly. As another example, the HMD may provide an indicator in the user interface if the HMD fits well. In some implementations, the HMD may provide a score associated with fit. The HMD can display the score to the user via the user interface. In some embodiments, fit categories may each be associated with a range of the scores. The HMD can accordingly inform the user the fit category based on whether the score falls within a given range.

In some situations, the HMD can continuously or periodically (e.g., every 1 s, 10 s, 1 min, etc.) monitor the position of the HMD relative to the user's head while the user is wearing the HMD because the position of the HMD may change as the user moves around (for example, the HMD may slide down the user's nose). The HMD may change the AR or VR display (such as adjusting pixels or the location associated with the virtual object) to compensate for the change in the relative position between the HMD and the user's head. This implementation may be particularly advantageous for maintaining a 3D view without requiring the 3D display to be constantly located at a particular place on the user's head. Accordingly, the HMD can dynamically adjust the projection of light from the AR/VR/MR display (e.g., a light field) to compensate for where the HMD is positioned on the user's head.

Glasses Removal

As described with reference to FIGS. 13A, 13B, and 13C, the wearable device can analyze the images acquired by the inward-facing imaging system and use various factors to determine relative positions between the user and the wearable device, such as a distance between the wearable device and the user and/or whether the wearable device tilts to the side or forward.

The information on the relative positions can also be used to determine whether the user is currently wearing the wearable device. For example, the wearable device can identify periocular features in the image acquired by the inward-facing imaging system. If the wearable device does not identify any periocular features, the wearable device may determine that the user is not wearing the wearable device. In other situations, the wearable device may calculate a likelihood that the user has removed the wearable device based on a degree of presence of the user's periocular features. For example, the wearable device may determine that periocular features in the images are sufficiently small (e.g., below a threshold size) that the device has been removed from the user's head. As another example, the wearable device may calculate how a percentage likelihood that the user has removed the wearable device and compare the percentage likelihood with a threshold value. If the percentage likelihood is above the threshold value, the wearable system may indicate that the wearable device has been removed from the user's head. On the other hand, the wearable system can calculate that a percentage likelihood that the user is still wearing the wearable device and compare that value against a threshold value on the likelihood of that the user is wearing the wearable device. If the percentage likelihood drops below the threshold value, the wearable device may determine that the user has removed the wearable device.

As another example, the wearable device can analyze a series of images acquired by the inward-facing imaging system. For example, although the periocular features do not appear in the first several images in the series, the inward-facing imaging system can discover periocular features in later acquired images. As a result, the wearable device may determine that the user just put on the wearable device. On the other hand, the periocular features may initially appear in the images, but the wearable device later discovers that the periocular features are no longer in the present FOV (or are sufficiently small). The wearable device can then determine that the user has taken off the wearable device.

Additionally or alternatively, the wearable device may use distance, size of the periocular features, and/or other factors to determine whether the wearable device is in place or has been removed. For example, although the wearable device may detect periocular features in an image, the periocular features may appear to be too small. As a result, the wearable device may determine that the distance between the wearable device and the user may be sufficiently far such that the user is not currently wearing the wearable device.

The wearable device can use other sensors together with the inward-facing imaging system to determine the relative position between the user and the wearable device. For example, the wearable device may use the sensors described herein, such as IMUs (e.g., accelerometers or gyroscopes), and so on, to detect a movement of the wearable device. This information of movement may be used together with image analysis to determine whether a user has taken off or put on the wearable device. As an example, the wearable device may detect an acceleration of the wearable device while acquiring a series of images using the inward-facing imaging system. If the wearable device does not detect the periocular region in an initial image of the series of images, the wearable device may determine that the user is putting on the device. On the other hand, if the periocular region was in the images acquired by the inward-facing imaging system and the wearable device detects an acceleration of the wearable device, the wearable device may determine that the user has removed the wearable device.

As another example, the wearable device may have a pressure sensor. The pressure sensor (e.g., strain gauge) may be located at the temple (such as the earpieces) of glasses, the band around the head that holds the head-mounted display to the user, or the nose pad of the wearable device. When the wearable device is put onto the user's face, the pressure sensor may send a signal indicating that the wearable device touches the user. On the other hand, when the user takes off the wearable device, the pressure sensor may acquire data suggesting that it no longer presses the user. This information may be combined with the images acquired by the inward-facing imaging system to determine whether the user has taken off or put on the wearable device.

Although some implementations as described with respect to FIG. 12B can be configured to mask periocular features, such as the center area 1212 of the eye 1210b, in some implementations, light reflected from the eye can be monitored to determine whether the user is wearing the device. For example, the wearable device can include a light source and a light-monitoring device. The light source can be configured to project light into the user's eye; and the light-monitoring device can be configured to measure the reflected light.

In some designs, the wearable device (e.g., via processing electronics) can receive measurements of reflected light. The device can analyze the measurements to identify a signal reflected from the user. When the user is wearing the device, a signal may be identified in the measurements. On the other hand, when the user is not wearing the device, a relatively weak or no signal may be identified in the measurements. In some instances, a signal may be considered weak if it is in a range from 80% to 99% weaker than if the user were wearing the device (e.g., 80%, 85%, 90%, 95%, 96% 97%, 98%, or 99% weaker, or in any range formed by such values). In some implementations, the signal can be a heartbeat.

In some implementations, the wearable device (e.g., via processing electronics) can be configured to analyze a series of measurements of reflected light to determine whether the user is removing or putting on the device. For example, in some designs, the wearable device can be configured to receive from the light-monitoring device measurements acquired in sequence. For example, the device can receive a first measurement and a second measurement after the first measurement. The device can analyze the measurements to identify a signal (e.g., a heartbeat) reflected from the user. When the wearable device is removed from the user's face, a signal may be identified from the first measurement, and a weak (or weaker) or no signal from the second measurement. On the other hand, when the wearable device is put onto the user's face, a signal may be identified from the second measurement, but a weak (or weaker) or no signal from the first earlier measurement.

Once the wearable device determined that it has been removed from the user's head, the wearable device may accordingly send a signal which turns off one or more functions of the wearable device or enter power saving mode (e.g., reducing power of one or more components of the device) when the wearable device is removed from the user. On the other hand, when the wearable device determines that the user has put on the device, the wearable device may send a signal which turns on a function (such as the activation of the AR/VR/MR display) or exit power saving mode (such as increasing the power of one or more components, e.g., one or more components having power that was previously reduced) of the wearable device. In some examples, reducing the power of one or more components can include dimming or turning off a light source of the display. In some examples, reducing the power of one or more components can include reducing a refresh rate associated with the display. In some instances, the power saving mode can include reducing or turning off the power of one or more sensors (e.g., reducing the frame rate of one or more cameras). In some examples, reducing the power of one or more components may cause the display to enter a sleep mode.

The wearable device can also adjust the 3D display based on the relative position of the wearable device and the user's eyes. For example, when the wearable device detects that the device slips down the user's nose, the wearable device may shift the location of the pixels or change the position of a virtual object in the 3D user interface to accommodate this change in position. This implementation may provide a realistic and stable 3D display while the user is moving around in his environment.

The wearable device can continuously monitor whether the periocular region appears in the images. The wearable device can also select an image among a series of images acquired by the inward-facing imaging system, and determine whether the periocular region appears in that image. The continuous monitoring can occur at closely spaced time intervals, which may be periodic (e.g., every second, every 10 seconds, every 30 seconds, every minute, every two minutes, every five minutes, every 10 minutes, every 15 minutes, etc. or in any range formed by any combination of these values).

In some embodiments, the inward-facing imaging system may continuously obtain images in its FOV. The inward-facing imaging system, however, may also start or stop imaging in response to a trigger. For example, the wearable device may be configured to start imaging the user's face when it detects that the user is putting on the wearable device. The wearable device can use various sensors described with reference to FIGS. 2 and 7, such as an accelerometer and/or a gyroscope, for the detection. The data acquired by the sensors may be analyzed against a threshold level. If the data passes the threshold level, the wearable device may start or stop the imaging process. As an example, when a user lifts up the wearable device, the accelerometer of the wearable device may acquire data on the acceleration of the wearable device. If the wearable device determines that the acceleration exceeds certain threshold acceleration, the wearable device may begin to image the user's face. Once the user puts the wearable device, for example, on his head, the acceleration may decrease. If the wearable device determines that the acceleration has reduced to a certain threshold, the wearable device may stop taking images of the user's face.

Another trigger may be the distance between the wearable device and the user. For example, the sensors may emit and receive signals such as acoustic or optical signals, and use the signals or the feedback of the signals to measure the distance. The wearable device may also determine the distance by analyzing images acquired by the inward-facing imaging system. For example, the wearable device may calculate the distance based on the size of the face in the image, where a big size may indicate a small distance while a small size may indicate a large distance. The wearable device may image the user when the distance passes a threshold or is within a certain range. For example, the wearable device may only image the user when the wearable device is within a certain distance to the user.

Example Processes for Determining Removal of a Wearable Device

FIG. 15B illustrates an example method for determining a removal of the wearable device. The process 1500b in FIG. 15B may be performed by the wearable device such as an HMD described with reference to FIGS. 2 and 4. The HMD may have an inward-facing imaging system configured to image the periocular region of the user.

At block 1510, the inward-facing imaging system can acquire a series of images. The HMD can receive the images acquired by the inward-facing imaging system. The series of images may be taken in a sequence. For example, the series of images may include frames of images at different time-stamps of a video.

At block 1520, the HMD can analyze one or more images acquired in block 1510 to identify periocular features. As described with reference to FIGS. 11 and 12A-B, the periocular features may be mathematical representations (such as points in the 3D space) of the facial features. The HMD can use machine learning techniques, such as deep neural network, to identify the periocular features.

In some implementations, the HMD may reduce the resolution of the incoming images or ignore a portion of the image (such as center portion of the perioculus, including the iris and the sclera) and thereby increase the image processing speed. These implementations may be advantageous because the center portion of the perioculus may have detailed characteristics which may not significantly affect the determination of whether an HMD is on the user. Furthermore, the sclera may create specular reflections of objects in the environment. These specular reflections and detailed characteristics of perioculus can introduce noise to the machine learning models and decrease the accuracy of the analysis.

At block 1530, the HMD can determine whether the periocular features do not appear in the acquired images. If the HMD determines that one or more periocular features do not appear in the acquired images, the HMD can emit a signal indicating that the HMD has been removed from the user's head at block 1532. The signal may cause the HMD to power off, reduce the power of one or more components, or enter sleep mode to reduce battery power consumption. The signal may also cause the HMD to stop performing certain functions. For example, the signal may cause the HMD to turn off the VR or AR mode. The emitted signal could be an electronic signal but may additionally or alternatively include an audible or visible signal as an alert or warning to the user.

If the HMD determines that the periocular region only appears in a subset of the image at block 1540, the HMD may indicate a change of state for the HMD at block 1542. For example, the HMD may determine that the periocular features appear in an initial image but not a later image. Based on this determination, the HMD may indicate that the user has taken off the HMD. In some implementations, the HMD may send a signal indicating that the user has taken off the HMD, which may cause the same actions as shown in block 1532 to be performed.

On the other hand, the HMD may detect that the periocular features only appear in a later image. Accordingly, the HMD may determine that the user has put on the device. In response to this determination, the HMD may increase the power of one or more component, turn on the virtual reality or augmented reality function of the HMD, initiate a user login sequence, change the resolution of the inward-facing imaging system (e.g., to a resolution more suitable for eye-tracking or iris recognition), or perform other actions to reflect this change of state.

However, if the HMD detects periocular features in both the initially acquired images and later acquired images, the HMD may determine that the user is currently wearing the HMD at block 1544. Accordingly, the HMD may optionally perform as set forth in block 1510.

In addition to or in alternative to determining removal of the HMD based on identification of one or more periocular features, the wearable device can determine removal of the HMD based on other methods as described herein. For example, the wearable device can determine that the user is wearing the HMD based on a distance between the HMD and the user (e.g., a distance associated with a normal resting position), detection of exerted pressure on the HMD (e.g., on the temple, band that supports the display on the user, or nose pad of the device), and/or detection of a certain signal (e.g., a heartbeat) from light reflected from the eye. As another example, the wearable device can determine that the user is not wearing the HMD based on a distance between the HMD and the user (e.g., a distance further away from a normal resting position), lack of detection of exerted pressure on the HMD (e.g., on the temple, band that supports the display on the user, or nose pad of the device), and/or a lack of detection of a certain signal (e.g., a heartbeat) from light reflected from the eye.

In some implementations, the wearable device can determine that the user is removing the HMD based on a distance associated with a normal resting position followed by a distance further away from a normal resting position. As another example, the wearable device can determine that the user is removing the HMD based on a detection of exerted pressure on the HMD (e.g., on the temple, band, or nose pad of the device) followed by lack of the exerted pressure. As yet another example, the wearable device can determine that the user is removing the HMD based on a detection of a signal (e.g., a heartbeat) from light reflected from the eye followed by lack of the signal.

In some implementations, the wearable device can determine that the user is putting on the HMD based on a distance further away from a normal resting position followed by a distance associated with a normal resting position. As another example, the wearable device can determine that the user is putting on the HMD based on lack of a detection of exerted pressure on the HMD followed by detection of exerted pressure on the HMD (e.g., on the temple, band, or nose pad of the device). As yet another example, the wearable device can determine the user is putting on the HMD based on lack of a detection of a signal (e.g., a heartbeat) from light reflected from the eye followed by detection of a signal.

In some implementations, the wearable device may be configured to consider other factors before entering a power saving mode. For example, a user might only take off the wearable device for a short period of time, such as 1 second, 2 seconds, 3 seconds, 4 seconds, 5 seconds, 7 seconds, 10 seconds, 15 seconds, 20 seconds, 25 seconds, 30 seconds, 45 seconds, 1 minute, 1.5 minutes, 2 minutes, etc. or any range formed by such values (e.g., 1 second to 10 seconds, 1 second to 20 seconds, 1 second to 30 seconds, 1 second to 1 minute, 1 minute to 1.5 minutes, 1 minute to 2 minutes, etc.). Some wearable devices can be configured to save power when it has been determined that the device has been removed for at least a certain period of time. In some such instances, the wearable device can keep track of the elapsed time when the user has removed the device and can enter into a power saving mode when the elapsed time is greater than or equal to a threshold period time.

Although the examples are described with reference to detecting the periocular region, these techniques described herein are not limited to the periocular region. For example, the techniques described herein can also be used to detect other facial features or portions of the user's body. In addition, the blocks shown in FIG. 15B (or any other figure in this disclosure) are not required to be performed in a sequence because some blocks may be performed before, after, or at the same time as another block. For example, the decision block 1540 is not required to be performed after the decision block 1530. Furthermore, the method 1500b is not required to include all blocks shown in FIG. 15B, and the method 1500 may include more or fewer blocks. For example, one or more blocks (such as blocks 1530 and 1540) in FIG. 15B may be combined in single block.

Figure 15C:
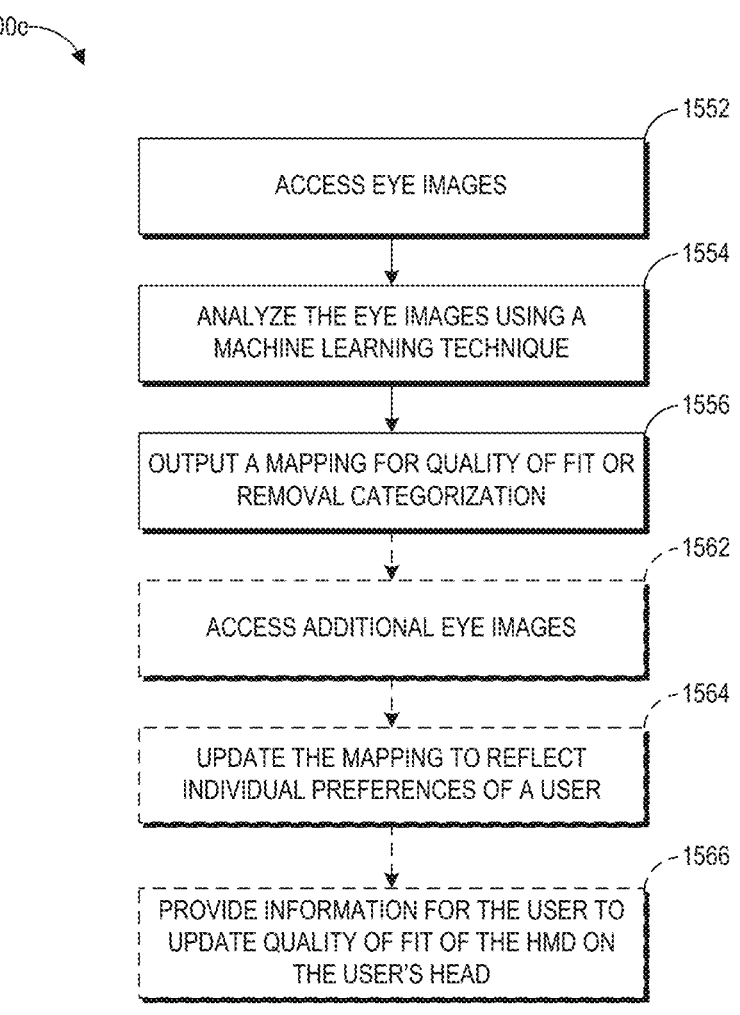
FIG. 15C illustrates an example of a method for using a machine learning technique to provide a mapping for goodness of fit or whether the head-mounted display is on the user.

Example Processes of Generating a Mapping from a Periocular Image to a Relative Position Between a Wearable Device and the User's Face FIG. 15C is an example of a method 1500c for applying a machine learning technique to provide a mapping for goodness of fit or whether the HMD is on the user. At block 1552, eye images are accessed, which may be used as training images in a supervised or unsupervised learning to generate the mapping. At block 1554, the machine learning technique (e.g., a deep neural network) is used to analyze the eye images to develop the mapping that can be used for quality of fit of the HMD on the user or an HMD removal categorization (e.g., on or off the user's head). At block 1556, the mapping is the output (e.g., output from a trained neural network) and can be stored in a memory associated with a particular HMD (e.g., the local data module 260 or the remote data repository 280). At block 1562, additional eye images can be accessed, which may be particular to a user. For example, the user can stand in front of a mirror and move the HMD around on the user's face and notate the user's subjective impression of the quality of the resulting fit. At block 1564, the machine learning technique updates the mapping to reflect the user's individual preferences, e.g., by further training a neural network.

At block 1566, the HMD can provide to the user information about the quality of the measured fit of the HMD on the user's head. For example, the HMD may display a quality grade to the user or emit an audible signal indicating quality of fit. The HMD may display instructions to the user (or provide audible instructions) on how to improve the fit of the HMD on the user's head, acquire additional eye images (block 1562), and determine an updated quality of fit (block 1564). The HMD may repeat this until the quality of fit of the HMD on the user's head is at an acceptable or optimal level. Accordingly, the HMD may lead the user through a quality fitting procedure to ensure the fit of the HMD on the particular user's head is suitable. The HMD may perform this quality fitting procedure the first time a particular user puts on the HMD, periodically, or when the measured quality of fit is below a threshold (e.g., on an A-F grade scale, when the quality grade is below a C).

Blocks 1562, 1564, 1566 are optional but provide an advantageous level of user customization. Further, the mapping can be customized for each of a number of users of the HMD (e.g., a family may share use of a single HMD and can customize a mapping for each family member).

ADDITIONAL ASPECTS

In a 1st aspect, a method for detecting removal of a head-mounted display from the head of a user, the method comprising: under control of the head-mounted display comprising computer processor and an inward-facing imaging system configured to image a periocular region of a user: receiving an image from the inward-facing imaging system; analyzing the image to identify a degree of presence of periocular features of the periocular region in the image; determining, based at least in part on the degree of presence of the periocular features, a likelihood that the head-mounted display has been removed from the head of the user; and in response to a determination that the likelihood passes a threshold, providing an indication that the head-mounted display has been removed from the head of the user.

In a 2nd aspect, the method of aspect 1, wherein the inward-facing imaging system comprises two eye cameras, wherein each eye camera is configured to image a respective eye of the user.

In a 3rd aspect, the method of any one of aspects 1-2, wherein the periocular region comprises one or more of the following: eye sockets, a portion of a nose, a portion of cheeks, a portion of eyebrows, or a portion of a forehead of the user.

In a 4th aspect, the method of any one of aspects 1-3, wherein analyzing the image is performed by a sparse auto-encoder algorithm, a clustering algorithm, a deep neural network, or any type of neural network.

In a 5th aspect, the method of any one of aspects 1-4, wherein determining, based at least in part on the degree of presence of periocular features, the likelihood that the head-mounted display has been removed from the head of the user, comprises determining a presence of periocular features specific to the user of the head-mounted display.

In a 6th aspect, the method of any one of aspects 1-5, wherein analyzing the image comprises reducing a resolution of the image.

In a 7th aspect, the method of any one of aspects 1-6, wherein analyzing the image comprises masking out a portion of the periocular region, the portion comprising at least one of the following: an iris, a sclera of an eye, or a specular reflection on an eyeball.

In an 8th aspect, the method of any one of aspects 1-7, wherein providing the indication comprises providing a signal that causes the head-mounted display to power off or to enter a battery saving mode.

In a 9th aspect, a system for detecting removal of a head-mounted display from the head of a user, the system comprising an inward-facing imaging system configured to image a periocular region of a user and a computer processor configured to perform any one of the methods in aspects 1-8.

In a 10th aspect, a method for determining a location of a head-mounted display with respect to the head of a user, the method comprising: under control of the head-mounted display comprising computer processor and an inward-facing imaging system configured to image a periocular region of a user: receiving a first image and a second image from the inward-facing imaging system, wherein the first image and the second image are acquired in a sequence; analyzing the first image and the second image to identify periocular features of the periocular region in the first image and the second image; determining whether the periocular region is in the first image or the second image based at least partly on the periocular features; in response to a determination that the periocular region is in neither the first image nor the second image, providing an indication that the head-mounted display has been removed from the head of the user; and in response to a determination that the periocular region is in either the first image or the second image, indicating a change of a state for the head-mounted display.

In an 11th aspect, the method of aspect 10, wherein the first image is acquired before the second image.

In a 12th aspect, the method of any one of aspects 10-11, wherein the inward-facing imaging system comprises two eye cameras, each is configured to image an eye of the user.

In a 13th aspect, the method of any one of aspects 10-12, wherein the periocular region comprises one or more of the following: an eye socket, a portion of a nose, a portion of a cheek, a portion of an eyebrow, or a portion of a forehead of the user.

In a 14th aspect, the method of any one of aspects 10-13, wherein identifying the periocular features is performed by a deep neural network, a sparse auto-encoder algorithm, a clustering algorithm, or any type of neural network.

In a 15th aspect, the method of any one of aspects 10-14, wherein the periocular features are specific to the user of the head-mounted display.

In a 16th aspect, the method of any one of aspects 10-15, wherein analyzing the first image and the second image comprises reducing a resolution of the first image and the second image.

In a 17th aspect, the method of any one of aspects 10-16, wherein analyzing the first image and the second image comprises masking out, in the first image and the second image, a portion of the periocular region, the portion comprises at least one of the following: an iris, a sclera of an eye, or a specular reflection on an eyeball.

In a 18th aspect, the method of any one of aspects 10-17, wherein indicating the change of the state for the head-mounted display comprises powering off or entering a battery saving mode.

In a 19th aspect, the method of any one of aspects 10-18, wherein the state of the head-mounted display comprises that head-mounted display is on the head of the user or that head-mounted display is removed from the head of the user.

In a 20th aspect, the method of aspect 19, wherein: in response to determining that the periocular features are identified in the first image but not the second image, changing the state of the head-mounted display from being on the head of the user to be removed from the head of the user, and in response to determining that the periocular features are identified in the second image but not in the first image, changing the state of the head-mounted display from being removed from the head of the user to be on the head of the user.

In a 21st aspect, a system for determining a location of a head-mounted display with respect to the head of a user, the system comprising an inward-facing imaging system configured to image a periocular region of a user and a computer processor configured to perform any one of the methods in aspects 10-20.

In a 22nd aspect, a method for determining a fit of a head-mounted display on the head of a user, the method comprising: under control of the head-mounted display comprising computer processor and an inward-facing imaging system configured to image a periocular region of a user: receiving an image from the inward-facing imaging system; analyzing the image to identify periocular features of the periocular region; determining a relative position between the head-mounted display and the head of the user based at least partly on an analysis of the image; and determining a fit category of the head-mounted display based at least partly on the relative position between the head-mounted display and the head of the user.

In a 23rd aspect, the method of aspect 22, wherein the inward-facing imaging system comprises two eye cameras, with each eye camera configured to image a respective eye of the user.

In a 24th aspect, the method of any one of aspects 22-23, wherein the periocular region comprises one or more of the following: eye sockets, a portion of a nose, a portion of cheeks, a portion of eyebrows, or a portion of a forehead of the user.

In a 25th aspect, the method of any one of aspects 22-24, wherein the periocular features are specific to the user of the head-mounted display.

In a 26th aspect, the method of any one of aspects 22-25, wherein the periocular features are identified using at least one of: a clustering algorithm or a neural network algorithm.

In a 27th aspect, the method of any one of aspects 22-26, wherein the determining the relative position comprises one or more of the following: calculating a distance with the head-mounted display to eyes of the user; calculating an interpupillary distance between the eyes of the user; determining a relative position between the head-mounted display and the eyes of the user; determining an asymmetry of the eyes of the user; or determining a tilt of the head-mounted display, wherein the tilt comprises at least one of a forward tilt or a side tilt.

In a 28th aspect, the method of any one of aspects 22-27, wherein determining the fit category comprises: comparing the relative position between the HMD and the head of the user with a threshold condition; and associating the fit category with the HMD based at least partly on the comparison between the relative position and the threshold condition.

In a 29th aspect, the method of any one of aspects 22-28, wherein the fit category comprises at least one of: fit well, fit adequately, or fit poorly.

In a 30th aspect, the method of any one of aspects 22-29, further comprising: providing an indication of the fit category, wherein the indication causes the head-mounted display to perform at least one of the following: adjusting a display of the head-mounted display to compensate for the relative position, or providing an alert to the user associated with the fit category.

In a 31st aspect, a system for determining a fit of a head-mounted display on a user, the system comprising: a hardware computer processor programmed to: access an image of a periocular region of a user; access a mapping between images of the periocular region and a goodness of fit of the head-mounted display on the user; and apply the mapping to determine the goodness of fit of the head-mounted display.

In a 32nd aspect, the system of aspect 31, wherein the mapping is generated by a neural network.

In a 33rd aspect, the system of any one of aspects 31-32, wherein the goodness of fit comprises at least one of a qualitative rating, a numerical rating, or a letter grade.

In a 34th aspect, the system of any one of aspects 31-33, wherein the computer processor is further programmed to perform a corrective action in response to the goodness of fit passing a threshold level.

In a 35th aspect, the system of aspect 34, wherein to perform the corrective action, the computer processor is programmed to: provide an indication to the user, or adjust a display of the head-mounted display to compensate for the fit.

In a 36th aspect, the system of aspect 35, wherein to provide the indication to the user, the computer processor is programmed to provide instructions to the user on improving the goodness of fit.

In a 37th aspect, the system of any one of aspects 34-35, wherein to provide the indication to the user, the computer processor is programmed to: access an additional eye image; apply the mapping to the additional eye image to determine an updated goodness of fit.

In a 38th aspect, the system of aspect 37, wherein the computer processor is programmed to continue to access additional eye images and determine updated goodnesses of fit until an updated goodness of fit passes a threshold.

In a 39th aspect, an augmented reality (AR) system for adjusting a rendering location of a virtual object, the AR system comprising: an AR display system configured to render a virtual object onto a three-dimensional space (3D); an imaging system configured to image a periocular portion of a user's face; and a hardware processor programmed to: receive an image from the imaging system; analyze the image to identify periocular features of the user; determine a relative position between the AR display system and the head of the user based at least partly on the periocular features; adjust a rendering location of the virtual object based at least partly on the relative position between the AR display system and the head of the user; and instruct the augmented reality display system to render the virtual object at the rendering location.

In a 40th aspect, the AR system of aspect 39, wherein to adjust the rendering location, the hardware processor is programmed to: determine a normal resting position of the user's eye and a normal rendering position of the virtual object which corresponds to the normal resting position of the user's eye; calculate a correction to the normal rendering position of the virtual object based at least partly on the relative position between the AR display system and the head of the user; and determine the rendering location of the virtual object based on the correction to the normal rendering position.

In a 41st aspect, the AR system of aspect 40, wherein the normal rendering position of the user's eye and the normal rendering position of the virtual object are determined during an initiation phase of the AR system.

In a 42nd aspect, the AR system of any one of aspects 39-41, wherein the hardware processor is further programmed to: analyze the image to determine an eye pose; and wherein a position of the user's eye is corresponding to a rendering viewpoint in the AR display system, and wherein to adjust the rendering location comprises to update a position of the rendering viewpoint based on the eye pose of the user.

In a 43rd aspect, the AR system of aspect 42, wherein to update the position of the rendering viewpoint comprises shifting a coordinate associated with the AR display system.

In a 44th aspect, the AR system of any one of aspects 39-43, wherein the AR display system comprises a spatial AR display system configured to render a virtual object from a perspective of the user's eye.

In a 45th aspect, the AR system of any one of aspects 39-44, wherein the imaging system comprises an outward-facing imaging system configured to image an environment of the user and wherein the image from the imaging system comprises a reflected image of the user's face.

In a 46th aspect, the AR system of any one of aspects 39-45, wherein the relative position between the AR display system and the head of the user comprises one or more of: a horizontal shift, a vertical shift, a depth shift, a tilt to a side, or a forward tilt.

In a 47th aspect, the AR system of any one of aspects 39-46, wherein the relative position between the AR display system and the head of the user comprises a first relative position for a first eye of the user and a second relative position for a second eye of the user.

In a 48th aspect, the AR system of any one of aspects 39-47, wherein the relative position is determined by at least one of: tracking the periocular features using visual keypoints or matching a region of the face with a dense map encoding at least a portion of the head of the user.

In a 49th aspect, the AR system of aspect 48, wherein the visual keypoints are computed using at least one of: scale-invariant feature transform, speeded up robust features, oriented FAST and rotated BRIEF, binary robust invariant scalable keypoints, or fast retina keypoint; or wherein the dense map is calculated using iterative closest point algorithm.

In a 50th aspect, a method for adjusting a rendering location of a virtual object in an augmented reality device (ARD), the method comprising: under control of an ARD comprising a hardware processor, an augmented reality display system configured to render a virtual object onto a three-dimensional space (3D), and an imaging system configured to image a periocular portion of a user's face: receiving an image from the imaging system; analyzing the image to identify periocular features of the user; determining a relative position between the ARD and the head of the user based at least partly on the periocular features; adjusting a rendering location of the virtual object based at least partly on the relative position between the ARD and the head of the user of the user; and rendering, by the augmented reality display system, the virtual object at the rendering location.

In a 51st aspect, the method of aspect 50, wherein adjusting the rendering location comprises: determining a normal resting position of the user's eye and a normal rendering position of the virtual object which corresponds to the normal resting position of the user's eye; calculating a correction to the normal rendering position of the virtual object based at least partly on the relative position between the ARD and the head of the user; and determining the rendering location of the virtual object based on the correction to the normal rendering position.

In a 52nd aspect, the method of aspect 51, wherein the normal rendering position of the user's eye and the normal rendering position of the virtual object are determined during an initiation phase of the ARD.

In a 53rd aspect, the method of any one of aspects 50-52, the method further comprising: analyzing the image to determine an eye pose; and wherein a position of the user's eye is corresponding to a rendering viewpoint in the augmented reality display system, and wherein adjusting the rendering location comprises updating a position of the rendering viewpoint based on the eye pose of the user.

In a 54rd aspect, the method of aspect 53, wherein updating the position of the rendering viewpoint comprises shifting a coordinate associated with the augmented reality display system.

In a 55th aspect, the method of any one of aspects 52-54, wherein the augmented reality display system comprises a spatial augmented reality display configured to render a virtual object from a perspective of the user's eye.

In a 56th aspect, the method of any one of aspects 50-55, wherein the imaging system comprises an outward-facing imaging system configured to image an environment of the user and wherein the image from the imaging system comprises a reflected image of the user's face.

In a 57th aspect, the method of any one of aspects 50-56, wherein the relative position between the ARD and the head of the user comprises one or more of: a horizontal shift, a vertical shift, a depth shift, a tilt to a side, or a forward tilt.

In a 58th aspect, the method of any one of aspects 50-57, wherein the relative position between the ARD and the head of the user comprises a first relative position for a first eye of the user and a second relative position for a second eye of the user.

In a 59th aspect, the method of any one of aspects 50-58, wherein the relative position is determined by at least one of:

tracking the periocular features using visual keypoints or matching a region of the face with a dense map encoding at least a portion of the head of the user.

In a 60th aspect, the method of aspect 59, wherein the visual keypoints are computed using at least one of: scale-invariant feature transform, speeded up robust features, oriented FAST and rotated BRIEF, binary robust invariant scalable keypoints, or fast retina keypoint; or wherein the dense map is calculated using iterative closest point algorithm.

In a 61st aspect, an augmented reality device (ARD) for adjusting a rendering location of a virtual object, the ARD comprising: an augmented reality display system configured to render a virtual object onto a three-dimensional space (3D); an imaging system configured to acquire an image of a user; a hardware processor programmed to: receive an image from the imaging system; analyze the image to identify features of a user; compute a pose for the ARD relative to the head of the user based at least partly on the identified features; and instruct the augmented reality display system to render the virtual object at a rendering location that is based at least partly on the pose for the ARD.

In a 62nd aspect, the ARD of aspect 61, wherein the image comprises a periocular image and the features comprise periocular features.

In a 63rd aspect, the ARD of any one of aspects 61-62, wherein the features are encoded by at least one of: visual keypoints or a dense map associated with a face model of the user.

In a 64th aspect, the ARD of aspect 63, wherein to compute the pose for the ARD, the hardware processor is programmed to track the visual keypoints or matching a region of the user's face with the face model.

In a 65th aspect, the ARD of any one of aspects 63-65, wherein the visual keypoints are computed using at least one of: scale-invariant feature transform, speeded up robust features, oriented FAST and rotated BRIEF, binary robust invariant scalable keypoints, or fast retina keypoint or wherein the dense map is calculated using iterative closest point algorithm.

In a 66th aspect, the ARD of any one of aspects 61-65, wherein the pose for the ARD comprises one or more of: a horizontal shift, a vertical shift, a depth shift, a tilt to a side, or a forward tilt.

In a 67th aspect, the ARD of any one of aspects 61-66, wherein to instruct the augmented reality display system to render the virtual object at the rendering location that is based at least partly on the pose for the ARD, the hardware processor is programmed to perform at least one of: displacing a virtual camera in the augmented reality display system, or shifting a rendering coordinate system associated with the augmented reality display system to correspond to the pose of the ARD.

In a 68th aspect, the ARD of any one of aspects 61-67, wherein the augmented reality display system comprises a spatial augmented reality display configured to render a virtual object from a perspective of the user's eye.

In a 69th aspect, a method for adjusting a rendering location of a virtual object in an augmented reality device (ARD), the method comprising: under control of an ARD comprising a hardware processor, an augmented reality display system configured to render a virtual object onto a three-dimensional space (3D), and an imaging system: receiving an image from the imaging system; analyzing the image to identify features of a user; computing a pose for the ARD relative to the head of the user based at least partly on the identified features; and rendering, by the augmented reality display system, the virtual object at a rendering location that is based at least partly on the pose for the ARD.

In a 70th aspect, the method of aspect 69, wherein the image comprises a periocular image and the features comprise periocular features.

In a 71st aspect, the method of any one of aspects 69-30, wherein the features are encoded by at least one of: visual keypoints or a dense map associated with a face model of the user.

In a 72nd aspect, the method of aspect 31, wherein computing the pose for the ARD comprises tracking the visual keypoints or matching a region of the user's face with the face model.

In a 73rd aspect, the method of any one of aspects 31-32, wherein the visual keypoints are computed using at least one of: scale-invariant feature transform, speeded up robust features, oriented FAST and rotated BRIEF, binary robust invariant scalable keypoints, or fast retina keypoint or wherein the dense map is calculated using iterative closest point algorithm.

In a 74th aspect, the method of any one of aspects 69-73, wherein the pose for the ARD comprises one or more of: a horizontal shift, a vertical shift, a depth shift, a tilt to a side, or a forward tilt.

In a 75th aspect, the method of any one of aspects 69-74, wherein rendering, by the augmented reality display system, the virtual object at a rendering location that is based at least partly on the pose for the ARD, comprises at least one of: displacing a virtual camera in the augmented reality display system or shifting a rendering coordinate system associated with the augmented reality display system to correspond to the pose of the ARD.

In a 76th aspect, the method of any one of aspects 69-75, wherein the augmented reality display system comprises a spatial augmented reality display configured to render a virtual object from a perspective of the user's eye.

In 77th aspect, a head-mounted device (HMD) comprising: a spatial augmented reality (AR) display system configured to render a virtual object from a perspective of the user's eye; an inward-facing imaging system configured to image a periocular region of a user's face; wherein the inward-facing imaging system is configured to acquire at least a first image of the periocular region and is further configured to mask a portion of the periocular region captured in the first image; and a hardware processor programmed to: receive an image from the inward-facing imaging system; analyze the image to identify periocular features of the user by an object recognizer; determine a normal resting position of the user's eye and a normal rendering position of the virtual object which corresponds to the normal resting position of the user's eye; determine a relative position between the HMD and the head of the user based at least partly on the periocular features; calculate an adjustment to the normal rendering position of the virtual object based at least partly on the relative position between the HMD and the head of the user; determine the rendering location of the virtual object based on the adjustment to the normal rendering position; and instruct the HMD to render the virtual object at the rendering location. In certain implementations, the inward-facing imaging system can also be configured to acquire the first image at a reduced resolution.

In a 78th aspect, the HMD of aspect 77, wherein the processor is configured to determine the normal resting position of the user's eye and the normal rendering position of the virtual object during an initialization phase of the HMD.

In a 79th aspect, the HMD of any one of aspects 77-78, wherein to determine relative position between the HMD and the head of the user, the processor is configured to perform at least one of: tracking the periocular features using visual keypoints, or matching a region of the face with a dense map encoding at least a portion of the head of the user.

In an 80th aspect, the HMD of aspect 79, wherein the visual keypoints are computed using at least one of: scale-invariant feature transform, speeded up robust features, oriented FAST and rotated BRIEF, binary robust invariant scalable keypoints, or fast retina keypoint; or wherein the dense map is calculated using iterative closest point algorithm.

In an 81st aspect, the HMD of any one of aspects 77-80, wherein the normal resting position of the user's eye corresponds to a rendering viewpoint of the HMD, and to adjust the normal rendering position, the hardware processor is programmed to shift a coordinate associated with the HMD to update the position of the rendering viewpoint.

In an 82nd aspect, the HMD of any one of aspects 77-81, wherein the relative position between the HMD and the head of the user comprises a first relative position for a first eye of the user and a second relative position for a second eye of the user.

In an 83rd aspect, the HMD of any one of aspects 77-82, wherein with respect to the normal resting position, the relative position between the HMD and the head of the user comprises one or more of: a horizontal shift, a vertical shift, a depth shift, a tilt to a side, or a forward tilt.

In an 84th aspect, a method comprising: under control of a head-mounted device (HMD) comprising a hardware processor, a computer processor, a display system configured to render a virtual object, and an inward-facing imaging system configured to image a periocular portion of a user's face: receiving an image from the inward-facing imaging system; analyzing the image to identify periocular features of the user by an object recognizer; determining a relative position between the HMD and the head of the user based at least partly on the periocular features; determining a degree of fit by comparing the relative position with a threshold condition; and causing the HMD to perform at least one of the following: adjusting a display of the HMD to compensate for the relative position, and providing an indication to the user associated with the degree of fit.

In an 85th aspect, the method of aspect 84, wherein the object recognizer analyzes the image using at least one of: a sparse auto-encoder algorithm, a clustering algorithm, a deep neural network, and any type of neural network.

In an 86th aspect, the method of any one of aspects 84-85, wherein determining the relative position comprises at least one of: calculating a distance with the HMD to eyes of the user; calculating an interpupillary distance between the eyes of the user; determining a relative position between the HMD and the eyes of the user; determining an asymmetry of the eyes of the user; or determining a tilt of the HMD, wherein the tilt comprises at least one of a forward tilt or a side tilt.

In an 87th aspect, the method of any one of aspects 84-86, the method further comprising: adjusting a rendering location of the virtual object based at least partly on the relative position between the HMD and the head of the user; and rendering, by the AR display system, the virtual object at the rendering location.

In an 88th aspect, the method of aspect 87, wherein adjusting the rendering location of the virtual object comprises: determining a normal resting position of the user's eye and a normal rendering position of the virtual object which corresponds to the normal resting position of the user's eye; calculating an adjustment to the normal rendering position of the virtual object based at least partly on the relative position between the HMD and the head of the user; and determining the rendering location of the virtual object based on the adjustment to the normal rendering position.

In an 89th aspect, the method of any one of aspects 87-88, the method further comprising: analyzing the image to determine an eye pose; and wherein a position of the user's eye is corresponding to a rendering viewpoint in the display system, and wherein adjusting the rendering location comprises updating a position of the rendering viewpoint based on the eye pose of the user.

In a 90th aspect, the method of aspect 89, wherein updating the position of the rendering viewpoint comprises shifting a coordinate associated with the display system.

In a 91st aspect, the method of any one of aspects 84-90, wherein determining the degree of fit comprises: accessing the image of the periocular region of the user; accessing a mapping between images of the periocular region and the degree of fit of the HMD on the user; and applying the mapping to determine the degree of fit of the HMD.

In a 92nd aspect, the method of any one of aspects 84-91, wherein the degree of fit comprises at least one of: fit well, fit adequately, or fit poorly.

In a 93rd aspect, the method of any one of aspects 84-92, wherein the indication to the user associated with the degree of fit comprises: providing instructions to the user on improving the degree of fit; accessing an additional eye image; applying the mapping to the additional eye image to determine an updated degree of fit; and accessing additional eye images and determine updated degrees of fit until an updated degree of fit passes a threshold.

In a 94th aspect, the method of any one of aspects 84-93, wherein determining the relative position comprises: receiving a first image and a second image from the inward-facing imaging system, wherein the first image and the second image are acquired in sequence; analyzing the first image and the second image to identify periocular features specific to the user of the periocular region in the first image and the second image; determining whether the periocular region is in the first image or the second image based at least partly on the periocular features; determining the relative position based at least partly on the appearance of the periocular features in the first and the second image; and wherein the method further comprises: in response to a determination that the periocular region is in neither the first image nor the second image, providing an indication that the HMD has been removed from the head of the user; and in response to a determination that the periocular features is either the first image or the second image, indicating a change of a state for the HMD.

In a 95th aspect, the method of aspect 94, wherein indicating the change of the state causes the HMD to power off or enter a battery saving mode.

In a 96th aspect, the method of any one of aspects 94-95, wherein: in response to determining that the periocular features are identified in the first image but not the second image, changing the state of the HMD from being on the head of the user to be removed from the head of the user, and in response to determining that the periocular features are identified in the second image but not in the first image, changing the state of the HMD from being removed from the head of the user to be on the head of the user.

In a 97th aspect, an HMD comprising: a spatial augmented reality (AR) display system configured to render a virtual object from a perspective of the user's eye; non-transitory memory configured to store a measurement of a relative position between the HMD and the head of the user; and a hardware processor in communication with the non-transitory memory and the spatial AR display system, the hardware processor programmed to: access the measurement of the relative position between the HMD and the head of the user; calculate an adjustment to a normal rendering position of the virtual object based at least partly on the relative position between the HMD and the head of the user; determine the rendering location of the virtual object based on the adjustment to the normal rendering position; and instruct the spatial AR display system to render the virtual object at the rendering location.

In a 98th aspect, the HMD of aspect 97, wherein the measurement of the relative position between the HMD and the head of the user is calculated by performing at least one of: tracking the periocular features using visual keypoints, or matching a region of the face with a dense map encoding at least a portion of the head of the user.

In a 99th aspect, the HMD of aspect 98, wherein the visual keypoints are computed using at least one of: scale-invariant feature transform, speeded up robust features, oriented FAST and rotated BRIEF, binary robust invariant scalable keypoints, or fast retina keypoint; or wherein the dense map is calculated using iterative closest point algorithm.

In a 100th aspect, the HMD of any one of aspects 97-99, wherein the hardware processor is further programmed to determine a normal resting position of the user's eye associated with a rendering viewpoint of the MID, wherein the normal rendering position of the virtual object which corresponds to the normal resting position of the user's eye.

In a 101st aspect, the HMD of aspect 100, wherein to calculate the adjustment to the normal rendering position of the virtual object, the hardware processor is programmed to: determine a shift with respect to the normal resting positon based at least partly on the relative position between the HMD and the head of the user; and shift a coordinate associated with the rendering viewpoint of the HMD based at least partly on the shift with respect to the normal resting position.

In a 102nd aspect, the HMD of aspect 101, wherein the relative position between the HMD and the head of the user comprises one or more of: a horizontal shift, a vertical shift, a depth shift, a tilt to a side, or a forward tilt with respect to the normal resting position.

In a 103rd aspect, the HMD of any one of aspects 97-102, wherein the relative position between the HMD and the head of the user comprises a first relative position between the HMD for a first eye of the user and a second relative position for a second eye of the user.

In a 104th aspect, a method comprising: under control of an HMD comprising a hardware processor, a computer processor, a display system configured to render a virtual object, and an inward-facing imaging system configured to image a periocular portion of a user's face: receiving an image from the inward-facing imaging system; analyzing the image to identify periocular features of the user by an object recognizer; determining a relative position between the HMD and the head of the user based at least partly on the periocular features; determining a degree of fit by comparing the relative position with a threshold condition; and causing the HMD to perform at least one of the following: adjusting a display of the HMD to compensate for the relative position, or providing an indication to the user associated with the degree of fit.

In a 105th aspect, the method of aspect 104, wherein determining the relative position comprises at least one of: calculating a distance with the HMD to eyes of the user; calculating an interpupillary distance between the eyes of the user; determining a relative position between the HMD and the eyes of the user; determining an asymmetry of the eyes of the user; or determining a tilt of the HMD, wherein the tilt comprises at least one of a forward tilt or a side tilt.

In a 106th aspect, the method of any one of aspects 104-105, wherein adjusting the display of the HMD to compensate for the relative position comprises: determining a normal resting position of the user's eye and a normal rendering position of the virtual object which corresponds to the normal resting position of the user's eye; calculating an adjustment to the normal rendering position of the virtual object based at least partly on the relative position between the HMD and the head of the user; and determining the rendering location of the virtual object based on the adjustment to the normal rendering position.

In a 107th aspect, the method of any one of aspects 104-106, wherein determining the degree of fit comprises: accessing the image of the periocular region of the user; accessing a mapping between images of the periocular region and the degree of fit of the HMD on the user; and applying the mapping to determine the degree of fit of the HMD.

In a 108th aspect, the method of any one of aspects 104-107, wherein the indication to the user associated with the degree of fit comprises: providing instructions to the user on improving the degree of fit; accessing an additional eye image; applying the mapping to the additional eye image to determine an updated degree of fit; and accessing additional eye images and determine updated degrees of fit until an updated degree of fit passes a threshold.

In a 109th aspect, the method of any one of aspects 104-109, wherein determining the relative position comprises: receiving a first image and a second image from the inward-facing imaging system, wherein the first image and the second image are acquired in sequence; analyzing the first image and the second image to identify periocular features specific to the user of the periocular region in the first image and the second image; determining whether the periocular region is in the first image or the second image based at least partly on the periocular features; determining the relative position based at least partly on the appearance of the periocular features in the first and the second image; and wherein the method further comprises: in response to a determination that the periocular region is in neither the first image nor the second image, providing an indication that the HMD has been removed from the head of the user; and in response to a determination that the periocular features is either the first image or the second image, indicating a change of a state for the HMD.

In a 110th aspect, an HMD comprising: an inward-facing imaging system configured to image a periocular region of a user's face, wherein the inward-facing imaging system is configured to acquire at least a first image of the periocular region and is further configured to mask a portion of the periocular region captured in the first image; and a hardware processor programmed to: receive an image from the inward-facing imaging system; analyze the image to identify periocular features of the user by an object recognizer; determine a relative position between the HMD and the head of the user based at least partly on the periocular features; and determine a degree of fit by comparing the relative position with a threshold condition.

In a 111th aspect, the HMD of aspect 110, wherein to determine the degree of fit, the hardware processor is programmed to: access the image of the periocular region of the user; access a mapping between images of the periocular region and the degree of fit of the HMD on the user, wherein the mapping was trained using a machine learning model; and apply the mapping to determine the degree of fit of the HMD.

In a 112th aspect, the HMD of any one of aspects 110-111, wherein the degree of fit comprises at least one of: fit well, fit adequately, or fit poorly.

In a 113th aspect, the HMD of any one of aspects 110-112, wherein the hardware processor is further programmed to adjust a rendering location of a virtual object based on the degree of fit.

In a 114th aspect, the HMD of any one of aspects 110-113, wherein the hardware processor is further programmed to provide an indication to the user on the degree of fit at an initialization phase of the HMD.

In a 115th aspect, the HMD of aspect 114, wherein the hardware processor is further programmed to: provide instructions to the user on improving the degree of fit; access an additional eye image; apply the mapping to the additional eye image to determine an updated degree of fit; and access additional eye images and determine updated degrees of fit until an updated degree of fit passes a threshold.

In a 116th aspect, the HMD of any one of aspects 110-115, wherein to determine the relative position, the hardware processor is programmed to: receive a first image and a second image from the inward-facing imaging system, wherein the first image and the second image are acquired in sequence; analyze the first image and the second image to identify periocular features specific to the user of the periocular region in the first image and the second image; determine whether the periocular region is in the first image or the second image based at least partly on the periocular features; determine the relative position based at least partly on the appearance of the periocular features in the first and the second image.

Examples of Wearable Devices with Power Saving Functionality

Head-mounted display systems can be configured to implement one or more of the example methods and processes described herein (e.g., determining relative distance between a HMD and the user, determining whether the user is removing the HMD, determining whether the user is putting on the HMD, etc.) to save power. Some example wearable devices that can be configured to save power are described herein.

Examples to Save Power by Determining a Certain Position

In addition to or in alternative to determining removal of the wearable device (or a wearable device system), the wearable device can be configured to have power saving functionality when the device is in a certain position. For example, the wearable device can be configured to have a power saving mode when the device is in a position of low activity. The wearable device can be configured to have certain power saving positions such that the user can expect to save power when the device is placed in such a position.

One example is placing the device in an upside-down position. When a user wears the device with the frame supported on his or her head in a normal resting position and facing forward (e.g., as shown in FIG. 2), the wearable device can be in an upright position. When the device is flipped over with respect to the upright position, the device can be in an upside-down position. For instance, the user may remove the device and place it on a surface in the upside-down position. When placing the device on a flat surface such as on top of a table or desk, the frame of the device can be rotated about 180 degrees with respect to the upright position. When placing the device on an unlevel or angled surface (e.g., angled with respect to the horizontal plane) such as on top of an opened book, the frame of the device can be rotated by an angle in a range from about 160 degrees to about 200 degrees with respect to the upright position (e.g., 160 degrees, 165 degrees, 170 degrees, 175 degrees, 180 degrees, 185 degrees, 190 degrees, 195 degrees, 200 degrees, etc. or in any range formed by such values). Other ranges are possible.

Figure 17A:
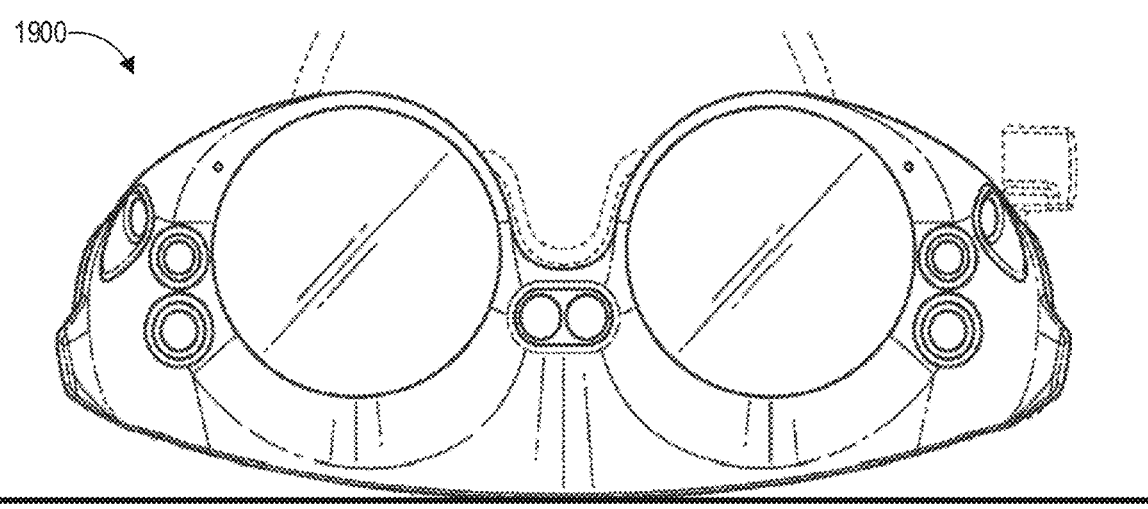
FIGS. 17A and 17B show a front view and a side view respectively of an example wearable device in an upside-down position.
Figure 17B:
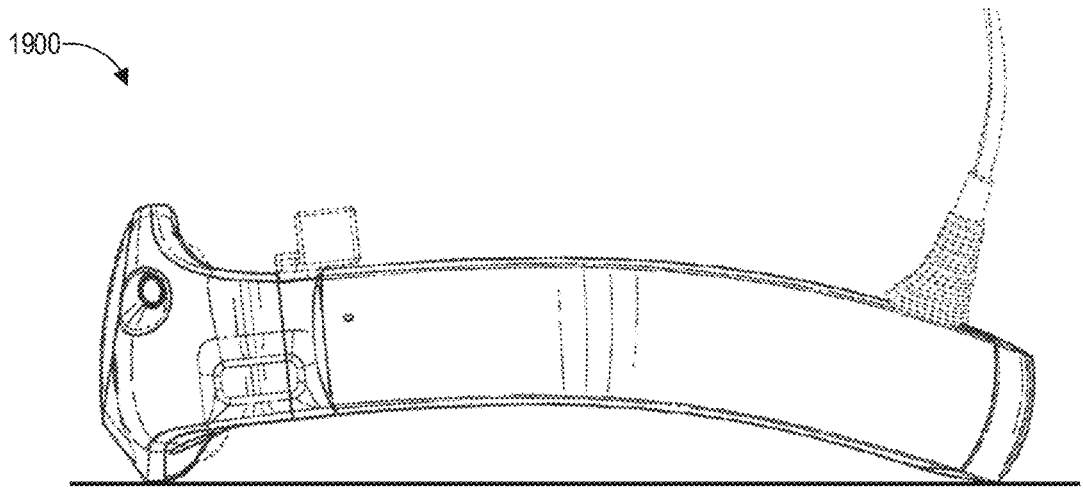
Figure 17C:
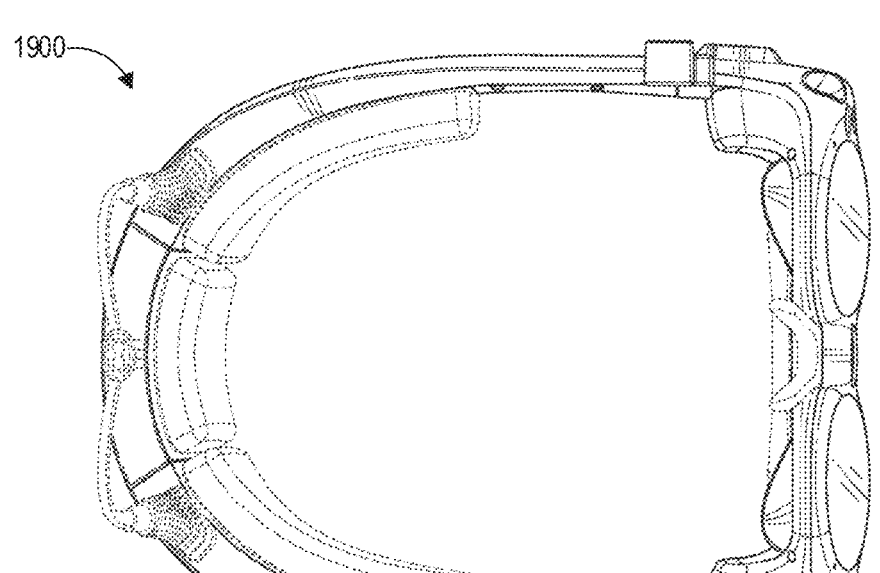
FIGS. 17C and 17D show bottom views of the example wearable device shown in FIGS. 17A and 17B in a closed configuration and an open configuration respectively.
Figure 17D:
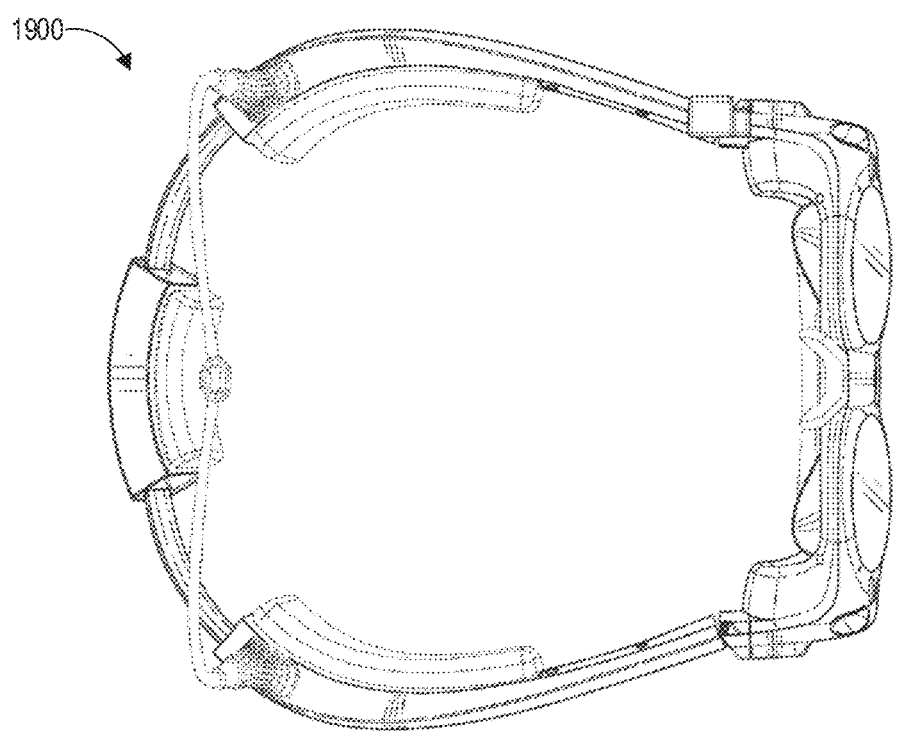

FIGS. 17A and 17B show a front view and a side view respectively of an example wearable device 1900 in an upside-down position. FIGS. 17C and 17D show bottom views of the example wearable device 1900 shown in FIGS. 17A and 17B in a closed position/configuration and an open position/configuration respectively. The user can put the band in an open configuration to put on or take off the device. The user can put the band in a closed configuration when wearing the device. The user can put the band in a closed configuration to store the device away. The user can also put the band in an open configuration to store the device away.

Figure 18:
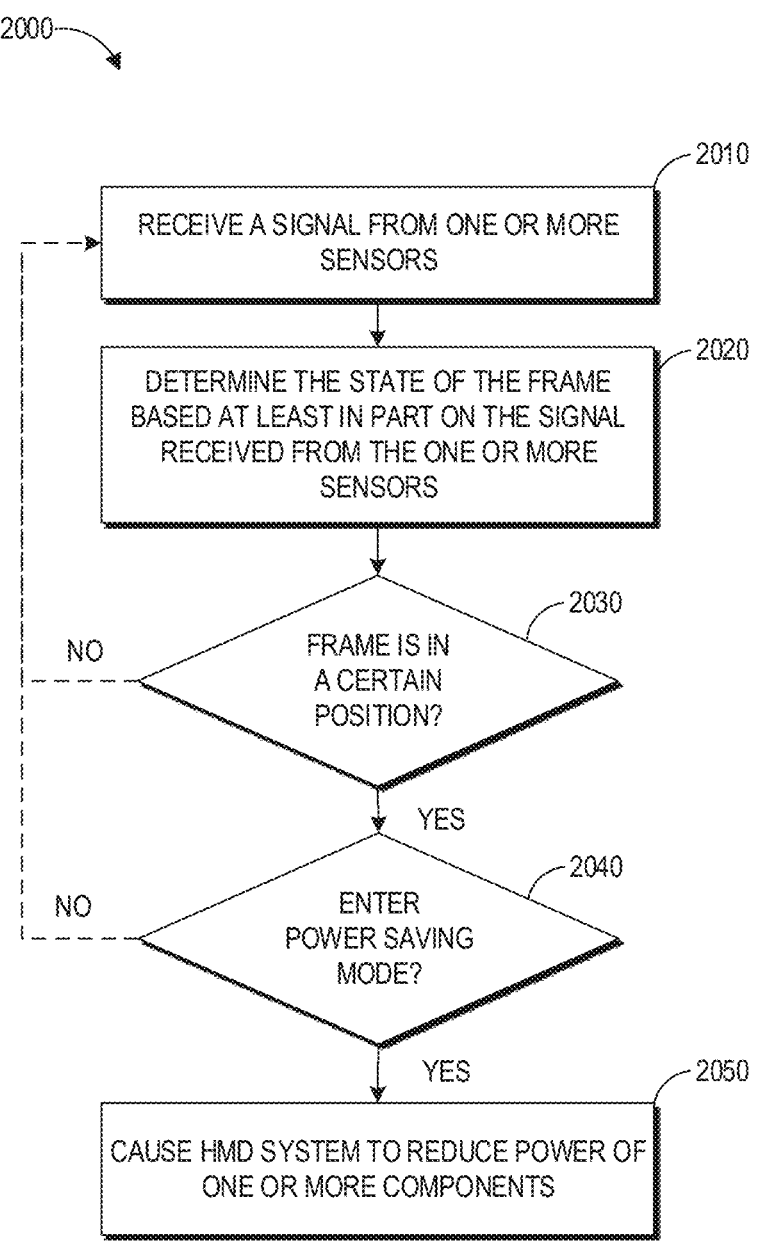
FIG. 18 illustrates an example method that may be implemented by a wearable device to save power by determining a certain position.

In some implementations, determining that the wearable device is in an upside-down position can trigger the device to send a signal to consider entering a power saving mode. FIG. 18 illustrates an example method that may be implemented by a wearable device system (e.g., comprising a HMD) with power saving functionality. The process 2000 may be performed (e.g., via processing electronics) by any wearable device system described herein such as the wearable device system described with reference to FIGS. 2 and 4. As shown in block 2010, the system can be configured to receive a signal from one or more sensors. As shown in block 2020, the system can be configured to determine the state of the frame, for example, whether the frame is in an upside-down position, based at least in part on the signal received from the one or more sensors.

In some implementations, the signal received from one or more sensors may be a signal that the frame is in an upside-down position. In some designs, the signal may include data relating to an orientation of the frame with respect to the upright position; and the system may be configured to determine the state of the frame, for example, whether the frame is in an upside-down position, based at least in part on the received data.

In some implementations, the system can receive data from one or more inertial measurement units (IMUs). The IMUs can be any of those known in the art or yet to be developed. The IMUs can be configured to measure change in the orientation of the frame. The IMUs can include at least one gyroscope and/or accelerometer. The system can analyze the measurements received from the IMUs to determine whether the frame has been flipped over to an upside-down position (e.g., rotated from 160 degrees to 200 degrees with respect to the upright position).

Additionally or alternatively, the system can receive data from an inward-facing imaging system and/or an outward-facing imaging system. The imaging systems can be any of those known in the art or yet to be developed. The imaging systems can include, for example, the inward-facing imaging system 462 and/or the outward-facing imaging system 464 described with reference to FIG. 4. In some implementations, the inward-facing imaging system can include an inward-facing camera. In some implementations, the outward-facing imaging system can include an outward-facing camera. The system can analyze the images from the inward-facing imaging system and/or the outward-facing imaging system to determine whether the frame is in the upside-down position (e.g., flipped over from the upright position). For instance, the frame may be in the upside-down position if the images comprise image content oriented as if the frame is flipped over with respect to the upright position (e.g., rotated from 160 degrees to 200 degrees). In some examples, the images can be compared with images previously captured when the device was worn in the upright position.

In some implementations, the wearable device can be configured to analyze a series of images to determine whether the user is removing or putting on the device. The inward-facing imaging system and/or the outward-facing imaging system may provide images in sequence. For example, a first image can be provided and a second image can be provided after the first image. The system can analyze the images to determine whether the user is putting the device in an upside-down position (e.g., flipping over the device). For instance, the user may be putting the device in the upside-down position if the first image comprises image content oriented as if the frame is in an upright position and if the second image comprises image content oriented as if the frame has been flipped over with respect to the upright position. In some examples, the first and/or the second image can be compared with images previously captured when the device was worn in the upright position.

Additionally or alternatively, the system can receive data from one or more pressure sensors configured to sense pressure. The pressure sensors can include any of those known in the art or yet to be developed. In some implementations, for example, the one or more pressure sensors can be configured to sense pressure exerted on at least a portion of a top edge of the frame. The system can analyze the sensed pressure to determine whether there is pressure exerted on a top edge of the frame, such as exerted by a table, desk, or book.

In some implementations, an upside-down position of the device can be detected by one or more sensors placed on the top of the device. For example, one or more proximity sensors or light sensors can be disposed on a top portion of the device such that setting the device on a surface in an upside-down position can cause a sensor to approach or contact the surface. The sensor can then send a signal indicating that the device is in an upside-down position. In some embodiments, the device can include one or more sensors on one or more portions of the device (e.g., on an arm/temple and on a front frame). In some designs, the device can have one sensor per arm/temple, two sensors per arm/temple, or more. The use of multiple sensors on different areas of the device can help to reduce or minimize the likelihood of a false positive reading indicating that the device is upside-down.

As shown in block 2030 of FIG. 18, if the system determines that the frame is not in a certain position (e.g., not in the upside-down position), the system can in some instances continue to receive data from the one or more sensors and determine whether it is in the upside-down position. After a determination that the frame is in an upside-down position, the system can consider whether to enter a power saving mode as shown in block 2040.

In addition to being in an upside-down position, the system can consider one or more other factors before entering a power saving mode. For example, the system can implement any one or more methods described in U.S. Publication No. 2018/0096503, titled "PERIOCULAR TEST FOR MIXED REALITY CALIBRATION," which is incorporated by reference herein in its entirety, and/or any one or more methods described herein. As an example, the system can consider whether the user is wearing the device and/or whether the wearable device has been removed from the user's head. The system can be configured to enter a power saving mode if the wearable device is in an upside-down position and if the user is not wearing the device. For instance, when riding a roller coaster ride or hanging upside-down from a tree, the user may wish to continue using the AR/VR/MR functionality. Alternatively, the system can be configured to enter a power saving mode if the wearable device is in an upside-down position regardless of whether the user is wearing the device (e.g., to save power or power off as a safety precaution).

In some implementations, the system may be configured to enter a power saving mode if the frame has been in the upside-down position for a certain period of time (e.g., for at least a threshold period of time). In some instances, the system may be configured to enter a first power saving mode after a first period of time (e.g., 1 minute, 1.5 minutes, 2 minutes, etc.) and a second power saving mode after a second longer period of time (e.g., 5 minutes, 7 minutes, 10 minutes, etc.). In some designs, the first power saving mode may be a standby mode with a quick recovery time to an active state. The first power saving mode may be configured to recover to an active state within a certain period of time (e.g., a predetermined time). For example, the time may be less than or equal to an amount of time required for a user to don the device so that the reduced power saving mode is hidden from the user's experience. After a second longer period of time, the system may reduce more power than reduced after the first period of time and/or to power off completely (e.g., enter a sleep mode or turn off the device).

In some implementations, the wearable device can be configured to have certain power saving positions provided in the device and/or set up by the user. For example, the device may be configured to enter a power saving mode when removed from the user's head and placed in an upside-down position on a surface, e.g., indicating non-use (such as indicated by a pressure exerted on a top edge of the frame).

Some implementations may be configured to consider whether the temples of the device are folded together or extended in an open configuration (or whether the band of the device is in an open or closed position). A device placed on a surface in the upside-down position with the temples folded together (or with the band placed in a closed position as shown in FIG. 17C) may indicate that the user is done using the device and to power off completely. A device on a surface in the upside-down position with the temples extended in an open configuration (or with the band placed in an open position as shown in FIG. 17D) may indicate that the user intends to continue using the device after a break and to enter a power saving mode (e.g., to reduce power of one or more components or to enter a sleep mode) but not to completely power off. Other examples are possible.

As shown in block 2040 of FIG. 18, if the system determines not to enter a power saving mode (e.g., if the device determines that it is in an upside-down position, but that the user is wearing the device), the system can optionally continue to receive data from one or more sensors and determine whether it continues to stay in the upside-down position (e.g., and possibly in consideration with other factors). After a determination to enter a power saving mode, as shown in block 2050, the system can be configured to reduce power of or turn off one more components in response to at least in part on a determination that the frame is in a certain position (e.g., in an upside-down position). In some implementations, the system can enter the power saving mode without powering off completely.

In some instances, the power saving mode can include dimming (without turning off) or turning off a light source of a display. In some instances, the power saving mode can include reducing a refresh rate associated with the display (without turning off the display) or turning off the display. In some instances, the power saving mode can include reducing (without turning off the power of one or more other components) or turning off the power of one or more other components (e.g., one or more sensors). In some implementations, the system can be configured to provide an alert (e.g., audible or visible) to the user indicating that the display system is reducing power of or turning off one or more components. The system can allow the user an opportunity to cancel entering the power saving mode.

In some implementations, after the device has entered a power saving mode (e.g., a sleep mode), one or more sensors (e.g., IMUs, imaging systems, any combination thereof, etc.) can continue to sense the user and/or surroundings. In response to at least in part on a determination that the frame is no longer in a certain position (e.g., in an upside-down position), a signal can be emitted to exit the power saving mode and to increase the power of one or more components (e.g., one or more components that were previously reduced in power). In some instances, by continuing to monitor the surroundings, the user may not lose head pose after putting the device back on.

Another example position is being on the top of the user's head. In some implementations, the wearable device can be configured to determine whether the device is on the top of the user's head. In some implementations, the wearable device can be configured to determine whether the user is putting the device on top of his or her head. For example, the device may be configured to detect motion of the user pushing the device up onto the forehead (e.g., similar to moving sunglasses to the top of the user's head when going indoors). In some implementations, the device (e.g., via processing electronics) can be configured to receive data from one or more sensors such as one or more IMUs, an outward-facing imaging system (e.g., a world camera), and/or an inward-facing imaging system (e.g., an eye camera) and determine whether the user has placed the device on his or her head. For example, data from an IMU or world camera relating to the frame's position can be combined with an eye detection signal to confirm that the user is not viewing content through the display. Based at least in part on such a determination, the device can be configured to reduce the power of one or more components and/or to enter a sleep mode. In some implementations, the device can enter the power saving mode without powering off completely. Other positions are possible.

Examples to Save Power by Determining Being Stationary

In addition to or in alternative to determining removal and/or an upside-down position of the wearable device (or a wearable device system), the wearable device can be configured to have power saving functionality when the device has been stationary for a certain period of time (e.g., greater than or equal to a threshold period of time). A frame that has been stationary for a period of time can be an indication of low activity and an opportunity to save power.

In some implementations, determining that the wearable device has been stationary for a certain period of time can trigger the device to send a signal to consider entering a power saving mode. FIG. 19 illustrates an example method that may be implemented by a wearable device system (e.g., comprising a HMD) with power saving functionality. The process 2100 may be performed (e.g., via processing electronics) by any wearable device system described herein such as the wearable device system described with reference to FIGS. 2 and 4. As shown in block 2110, the system can be configured to receive from one or more sensors data relating to movement of the frame. As shown in block 2120, the system can be configured to determine whether the frame has been stationary for a period of time greater than or equal to a threshold period of time based at least in part on the received data.

In some implementations, the system can receive data from one or more motion sensors. The motion sensors can include any of those known in the art or yet to be developed. The one or more motion sensors can be configured to measure change in the position of the frame. The motion sensors can include inertial measurement units (IMUs) (e.g., including accelerometers and/or gyroscopes). The system can analyze the measurements received from one or more motion sensors to determine whether the frame has not moved for a period of time greater than or equal to a threshold period of time. Any threshold period of time can be used such as any based on user preference. For example, the threshold period of time can be in a range from 1 minute to 10 minutes (e.g., 1 minute, 1.5 minutes, 2 minutes, 2.5 minutes, 3 minutes, 3.5 minutes, 4 minutes, 4.5 minutes, 5 minutes, 5.5 minutes, 6 minutes, 6.5 minutes, 7 minutes, 7.5 minutes, 8 minutes, 8.5 minutes, 9 minutes, 9.5 minutes, 10 minutes, etc., or in any range formed by such values). In some implementations, the frame has been stationary for the period of time greater than the threshold period of time if the frame has not changed position for at least the threshold period of time.

Additionally or alternatively, the system can receive data from an inward-facing imaging system and/or an outward-facing imaging system. The imaging systems can be any of those known in the art or yet to be developed. The imaging systems can include for example, the inward-facing imaging system 462 and/or the outward-facing imaging system 464 described with reference to FIG. 4. In some implementations, the inward-facing imaging system can include an inward-facing camera. In some implementations, the outward-facing imaging system can include an outward-facing camera. The inward-facing imaging system and/or the outward-facing imaging system may provide images acquired in sequence. The system can analyze the images to determine whether the frame has not moved for the period of time greater than or equal to the threshold period of time. For instance, the frame may be stationary for the period of time greater than or equal to the threshold period of time if the images have not changed for at least the threshold period of time. In some implementations, the system can include one or more clocks on a chip to monitor the period of time (e.g., in processing electronics and/or an imaging system).

As shown in block 2130 of FIG. 19, if the system determines that the frame has not been stationary, the system can continue to receive data relating to movement of the frame from one or more sensors and determine whether the frame has been stationary based on the data. As shown in block 2140, if the system determines that the frame has been stationary, but not for a period of time greater than or equal to the threshold period of time, the system can continue to receive data relating to movement of the frame from one or more sensors and determine whether the frame has been stationary for at least the threshold period of time.

As shown in block 2150, after a determination that the frame has been stationary for at least the threshold period of time, the system can consider whether to enter a power saving mode. As described with respect to the method in FIG. 18, in addition to being stationary for a certain period of time, the system can consider one or more other factors before entering a power saving mode (e.g., whether the user is wearing the device, whether the frame is in the upside-down position, etc.). As an example, the system may enter the power saving mode if the device has been stationary for at least a threshold period of time in combination with being removed from the user's head and/or being in an upside-down position.

In some implementations, if the frame has been stationary for at least a certain period of time, but the device has not been removed from the user's head, the system can consider other factors. For example, the system can implement any one or more methods described in U.S. Publication No. 2017/0255259, titled "CURRENT DRAIN REDUCTION IN AR/VR DISPLAY SYSTEMS," which is incorporated by reference herein in its entirety. One example of consideration includes eye tracking, eye pose data, and/or tracking of one or more objects in the environment. If the frame has been stationary for a period of time and the user's eyes have been fixed in a certain direction with occasionally blinking (e.g., focused on a lecture, a movie in a theater, or a movie presented on the wearable device), the system may enter a power saving mode to reduce the refresh rate associated with the display or at least reduce the refresh rate in a direction not viewed by the user. Alternatively, if the frame has been stationary, but the user's eyes have been moving around in various directions, the system may decide not to enter a power saving mode.

In some instances, the system may be configured to enter a first power saving mode after being stationary for a first period of time (e.g., 1 minute, 1.5 minutes, 2 minutes, etc.) and a second power saving mode after being stationary for a second longer period of time (e.g., 5 minutes, 7 minutes, 10 minutes, etc.). For example, after a second longer period of time, the system may reduce more power than reduced after the first period of time and/or to power off completely (e.g., turn off the device).

As shown in block 2150 of FIG. 19, if the system determines not to enter a power saving mode (e.g., if the device determines that it has been stationary for at least the threshold period of time, but that the user is wearing the device), the system can optionally continue to receive data from one or more sensors and determine whether it continues to be stationary (e.g., and possibly in consideration with other factors). After a determination to enter a power saving mode, as shown in block 2160, the system can be configured to reduce power of or turn off one more components in response to at least in part on a determination that the frame has been stationary for at least the threshold period of time. In some implementations, the system can enter the power saving mode without powering off completely In some instances, the power saving mode can include dimming (without turning off) or turning off a light source of a display. In some instances, the power saving mode can include reducing a refresh rate associated with the display (without turning off the display) or turning off the display. In some instances, the power saving mode can include reducing (without turning off the power of one or more other components) or turning off the power of one or more other components (e.g., one or more sensors). In some implementations, the system can be configured to provide an alert (e.g., audible or visible) to the user indicating that the display system is reducing power of or turning off one or more components. The system can allow the user an opportunity to cancel entering the power saving mode.

In some implementations, after the device has entered a power saving mode (e.g., a sleep mode), one or more sensors (e.g., motion sensors, imaging systems, any combination thereof, etc.) can continue to sense the user and/or surroundings. In response to a determination that the frame is no longer stationary, a signal can be emitted to exit the power saving mode and to increase the power of one or more components (e.g., one or more components that were previously reduced in power).

OTHER CONSIDERATIONS

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, animations or video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A head-mounted display system configured to project light to an eye of a user to display augmented reality image content in a vision field of said user, said head-mounted display system comprising:

a frame configured to be supported on a head of the user in an upright position;

a head-mounted display disposed on the frame, said display configured to project light into said user's eye to display augmented reality image content to the user's vision field, at least a portion of said display being transparent and disposed at a location in front of the user's eye when the user wears the frame in the upright position such that said transparent portion transmits light from a portion of the environment in front of the user and said head-mounted display to the user's eye to provide a view of said portion of the environment in front of the user and said head-mounted display;

one or more sensors that comprise one or more inertial measurement units (IMUs) configured to measure change in the orientation of the frame; and processing electronics in communication with the display and the one or more sensors, the processing electronics configured to:

receive a signal from the one or more sensors;

determine whether the frame is in an upside-down position based at least in part on the signal received from the one or more sensors by:

receiving measurements from the one or more IMUs; and analyzing the received measurements to determine whether the frame has been flipped over with respect to the upright position based at least in part on the measurements from the one or more IMUs, wherein the frame is in the upside-down position if the frame has been flipped over with respect to the upright position, and wherein the frame has been flipped over when the frame has been rotated from 160 degrees to 200 degrees with respect to the upright position; and cause the head-mounted display system to reduce power of one or more components of the head-mounted display system in response to at least in part on a determination that the frame is in the upside-down position.

2. A head-mounted display system configured to project light to an eye of a user to display augmented reality image content in a vision field of said user, said head-mounted display system comprising:

a frame configured to be supported on a head of the user in an upright position;

a head-mounted display disposed on the frame, said display configured to project light into said user's eye to display augmented reality image content to the user's vision field, at least a portion of said display being transparent and disposed at a location in front of the user's eye when the user wears the frame in the upright position such that said transparent portion transmits light from a portion of the environment in front of the user and said head-mounted display to the user's eye to provide a view of said portion of the environment in front of the user and said head-mounted display;

one or more sensors that comprise an inward-facing imaging system and/or an outward-facing imaging system; and processing electronics in communication with the display and the one or more sensors, the processing electronics configured to:

receive a signal from the one or more sensors;

determine whether the frame is in the upside-down position by:

receiving images from the inward-facing imaging system and/or the outward-facing imaging system; and analyzing the images to determine whether the frame has been flipped over with respect to the upright position, wherein the frame is in the upside-down position if the images comprise image content oriented as if the frame has been flipped over with respect to the upright position; and cause the head-mounted display system to reduce power of one or more components of the head-mounted display system in response to at least in part on a determination that the frame is in the upside-down position.

3. The display system of claim 2, wherein the frame has been flipped over when the frame has been rotated from 160 degrees to 200 degrees with respect to the upright position.

4. A head-mounted display system configured to project light to an eye of a user to display augmented reality image content in a vision field of said user, said head-mounted display system comprising:

a frame configured to be supported on a head of the user in an upright position;

a head-mounted display disposed on the frame, said display configured to project light into said user's eye to display augmented reality image content to the user's vision field, at least a portion of said display being transparent and disposed at a location in front of the user's eye when the user wears the frame in the upright position such that said transparent portion transmits light from a portion of the environment in front of the user and said head-mounted display to the user's eye to provide a view of said portion of the environment in front of the user and said head-mounted display;

one or more sensors that comprise one or more pressure sensors configured to sense pressure exerted on at least a portion of a top edge of the frame by a support surface as the frame is positioned in an upside-down position on the support surface; and processing electronics in communication with the display and the one or more sensors, the processing electronics configured to:

receive a signal from the one or more pressure sensors;

determine whether the frame is in the upside-down position on the support surface based at least in part on the signal received from the one or more pressure sensors by sensing the pressure exerted by the support surface on the at least a portion of the top edge of the frame; and cause the head-mounted display system to reduce power of one or more components of the head-mounted display system in response to at least in part on a determination that the frame is in the upside-down position.

5. The display system of claim 1, wherein processing electronics is configured to cause the display system to reduce the power of the one or more components by dimming or turning off a light source of the display.

6. The display system of claim 1, wherein processing electronics is configured to cause the display system to reduce the power of the one or more components by reducing a refresh rate associated with the display.

7. The display system of claim 1, wherein processing electronics is configured to cause the display system to reduce the power of the one or more components by reducing the power of the one or more sensors.

8. The display system of claim 1, wherein processing electronics is configured to cause the display system to reduce the power of the one or more components by causing the display system to enter a sleep mode.

9. The display system of claim 1, wherein the display system is configured to provide an alert to the user indicating that the display system is reducing the power of the one or more components of the display system.

10. The display system of claim 1, wherein the processor is further configured to cause the display system to increase the power of the one or more components in response to at least in part on a determination that the frame is no longer in the upside-down position.

11. A head-mounted display system configured to project light to an eye of a user to display augmented reality image content in a vision field of said user, said head-mounted display system comprising:

a frame configured to be supported on a head of the user in an upright position;

a head-mounted display disposed on the frame, said display configured to project light into said user's eye to display augmented reality image content to the user's vision field, at least a portion of said display being transparent and disposed at a location in front of the user's eye when the user wears the frame in the upright position such that said transparent portion transmits light from a portion of the environment in front of the user and said head-mounted display to the user's eye to provide a view of said portion of the environment in front of the user and said head-mounted display;

one or more sensors; and processing electronics in communication with the display and the one or more sensors, the processing electronics configured to:

receive a signal from the one or more sensors;

determine whether the frame is in an upside-down position based at least in part on the signal received from the one or more sensors;

cause the head-mounted display system to reduce power of one or more components of the head-mounted display system in response to at least in part on a determination that the frame is in the upside-down position; and cause the display system to increase the power of the one or more components in response to at least in part on a determination that the frame is no longer in the upside-down position by determining that the frame is supported on the head of the user such that said display is configured to project light into said user's eye to display augmented reality image content to the user's vision field.

12. The display system of claim 1, comprising one or more inward-facing cameras and/or one or more outward-facing cameras, said one or more inward-facing cameras and/or one or more outward-facing cameras being configured to sense the user and/or the surroundings of the user even when the power of the one or more components has been reduced.

13. The display system of claim 1, wherein the display is configured to project light into said user's eye to display augmented reality image content to the user's vision field at different amounts of divergences as if projected from different distances from the user's eye.

14. A head-mounted display system configured to project light to an eye of a user to display augmented reality image content in a vision field of said user, said head-mounted display system comprising:

a frame configured to be supported on a head of the user in an upright position;

a head-mounted display disposed on the frame, said display configured to project light into said user's eye to display augmented reality image content to the user's vision field, at least a portion of said display being transparent and disposed at a location in front of the user's eye when the user wears the frame in the upright position such that said transparent portion transmits light from a portion of the environment in front of the user and said head-mounted display to the user's eye to provide a view of said portion of the environment in front of the user and said head-mounted display;

one or more sensors that comprise one or more proximity sensors configured to sense the frame approach or contact a support surface as the frame is positioned in an upside-down position on the support surface; and processing electronics in communication with the display and the one or more sensors, the processing electronics configured to:

receive a signal from the one or more proximity sensors;

determine whether the frame is in the upside-down position based at least in part on the signal received from the one or more proximity sensors by sensing the frame approach or contact the support surface using the one or more proximity sensors; and cause the head-mounted display system to reduce power of one or more components of the head-mounted display system in response to at least in part on a determination that the frame is in the upside-down position.

15. A head-mounted display system configured to project light to an eye of a user to display augmented reality image content in a vision field of said user, said head-mounted display system comprising:

a frame configured to be supported on a head of the user in an upright position;

a head-mounted display disposed on the frame, said display configured to project light into said user's eye to display augmented reality image content to the user's vision field, at least a portion of said display being transparent and disposed at a location in front of the user's eye when the user wears the frame in the upright position such that said transparent portion transmits light from a portion of the environment in front of the user and said head-mounted display to the user's eye to provide a view of said portion of the environment in front of the user and said head-mounted display;

one or more sensors comprise one or more light sensors configured to sense the frame approach or contact a support surface as the frame is positioned in an upside-down position on the support surface; and processing electronics in communication with the display and the one or more sensors, the processing electronics configured to:

receive a signal from the one or more light sensors;

determine whether the frame is in the upside-down position based at least in part on the signal received from the one or more light sensors by sensing the frame approach or contact the support surface using the one or more light sensors; and cause the head-mounted display system to reduce power of one or more components of the head-mounted display system in response to at least in part on a determination that the frame is in the upside-down position.

16. The display system of claim 1, wherein the one or more sensors comprise multiple sensors on different portions of the frame.

* * * * *